(12) United States Patent
Boston et al.

(10) Patent No.: US 8,412,783 B2
(45) Date of Patent: *Apr. 2, 2013

(54) PERSONAL VIDEO RECORDING WITH MACHINE LEARNING FOR MESSAGING

(75) Inventors: Stephen B. Boston, Cedar Park, TX (US); Michael W. Brown, Georgetown, TX (US); Andrew D. Hately, Austin, TX (US); Michael A. Paolini, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1335 days.

This patent is subject to a terminal disclaimer.

(21) Appl. No.: 12/127,922

(22) Filed: May 28, 2008

(65) Prior Publication Data
US 2008/0232783 A1 Sep. 25, 2008

Related U.S. Application Data

(63) Continuation of application No. 10/180,361, filed on Jun. 25, 2002, now Pat. No. 7,433,582.

(51) Int. Cl.
*G06F 15/16* (2006.01)
*G06F 15/167* (2006.01)
*G06F 15/173* (2006.01)

(52) U.S. Cl. .......... 709/206; 709/225; 709/215; 725/51; 386/326; 386/248; 386/322

(58) Field of Classification Search .................. 386/326, 386/322; 725/51; 709/206, 225, 215
See application file for complete search history.

(56) References Cited

U.S. PATENT DOCUMENTS

| | | | |
|---|---|---|---|
| 5,047,867 A | 9/1991 | Strubbe et al. |
| 6,167,091 A | 12/2000 | Okada et al. |
| 6,240,288 B1 | 5/2001 | Wan et al. |
| 6,411,770 B1 | 6/2002 | Ito et al. |
| 6,678,462 B1 | 1/2004 | Chihara |
| 6,758,802 B2 | 7/2004 | Fitzgerald et al. |
| 6,782,550 B1 | 8/2004 | Cao |
| 6,945,652 B2 | 9/2005 | Sakata et al. |
| 7,017,016 B2 | 3/2006 | Chujo et al. |
| 7,065,778 B1 | 6/2006 | Lu |
| 7,143,430 B1 | 11/2006 | Fingerman et al. |

(Continued)

FOREIGN PATENT DOCUMENTS

| JP | 11355707 A | 12/1999 |
|---|---|---|
| JP | 200285598 A1 | 10/2000 |

OTHER PUBLICATIONS

"U.S. Appl. No. 11/771,616 Office Action", Jan. 26, 2012, 14 pages.

(Continued)

*Primary Examiner* — Helen Shibru
(74) *Attorney, Agent, or Firm* — DeLizio Gilliam, PLLC

(57) ABSTRACT

Machine learning for control of a personal video recorder ("PVR"), including providing records of transmissions of messages; identifying a message point in operation of a PVR; selecting, in dependence upon the message point, a message to be transmitted; and determining in dependence upon the records of transmissions of messages whether to transmit the selected message. Embodiments include determining whether to transmit the selected message in dependence upon a frequency with which the message is transmitted to a user. Embodiments include transmitting to users messages prompting for responses identifying commands; storing records of transmissions of messages, including storing records of responses; and selecting a message to be transmitted in dependence upon the records of responses to messages. Embodiments include structuring the selected message in dependence upon the records of responses to messages, including inserting in the selected message choices for a set of sequenced commands.

2 Claims, 51 Drawing Sheets

U.S. PATENT DOCUMENTS

| | | | |
|---|---|---|---|
| 7,248,776 | B2 | 7/2007 | Boston et al. |
| 7,366,398 | B2 | 4/2008 | Boston et al. |
| 7,474,832 | B2 | 1/2009 | Boston et al. |
| 7,672,998 | B1 | 3/2010 | Haskins et al. |
| 7,856,477 | B2* | 12/2010 | Libbey et al. ............... 709/206 |
| 7,941,534 | B2 | 5/2011 | De La Huerga |
| 7,979,881 | B1* | 7/2011 | Wong et al. ................. 725/51 |
| 2002/0013940 | A1 | 1/2002 | Tsukamoto et al. |
| 2002/0040475 | A1 | 4/2002 | Yap et al. |
| 2002/0057894 | A1 | 5/2002 | Ishige |
| 2002/0059621 | A1 | 5/2002 | Thomas et al. |
| 2002/0174430 | A1 | 11/2002 | Ellis et al. |
| 2003/0110504 | A1 | 6/2003 | Plourde, Jr. et al. |
| 2003/0147631 | A1 | 8/2003 | Zimmermann |
| 2003/0154485 | A1 | 8/2003 | Johnson et al. |
| 2003/0156827 | A1 | 8/2003 | Janevski |
| 2003/0187825 | A1 | 10/2003 | Tabata |
| 2003/0233420 | A1* | 12/2003 | Stark et al. .................. 709/206 |
| 2003/0235392 | A1 | 12/2003 | Boston et al. |
| 2003/0235393 | A1 | 12/2003 | Boston et al. |
| 2003/0235394 | A1 | 12/2003 | Boston et al. |
| 2003/0235395 | A1 | 12/2003 | Boston et al. |
| 2003/0235396 | A1 | 12/2003 | Boston et al. |
| 2003/0237085 | A1 | 12/2003 | Boston et al. |
| 2003/0237086 | A1 | 12/2003 | Boston et al. |
| 2003/0237090 | A1 | 12/2003 | Boston et al. |
| 2004/0101272 | A1 | 5/2004 | Boston et al. |
| 2005/0278741 | A1 | 12/2005 | Robarts et al. |
| 2007/0280631 | A1 | 12/2007 | Boston et al. |
| 2007/0283382 | A1 | 12/2007 | Boston et al. |
| 2007/0286566 | A1 | 12/2007 | Boston et al. |
| 2007/0286581 | A1 | 12/2007 | Boston et al. |
| 2008/0013919 | A1 | 1/2008 | Boston et al. |
| 2008/0172688 | A1 | 7/2008 | Boston et al. |
| 2008/0212946 | A1 | 9/2008 | Boston et al. |
| 2008/0232783 | A1 | 9/2008 | Boston et al. |
| 2009/0074380 | A1 | 3/2009 | Boston et al. |

OTHER PUBLICATIONS

Notice of Allowance Dated Dec. 30, 2008 in U.S. Appl. No. 10/180,143.
Office Action Dated Nov. 15, 2006 in U.S. Appl. No. 10/180,362.
Notice of Allowance Dated Mar. 26, 2007 in U.S. Appl. No. 10/180,362.
Office Action Dated Nov. 16, 2006 in U.S. Appl. No. 10/180,144.
Office Action Dated Mar. 23, 2007 in U.S. Appl. No. 10/180,144.
Notice of Allowance Dated Jul. 11, 2007 in U.S. Appl. No. 10/180,144.
Office Action Dated Jan. 12, 2007 in U.S. Appl. No. 10/180,617.
Final Office Action Dated Sep. 13, 2007 in U.S. Appl. No. 10/180,617.
Office Action Dated Jan. 28, 2008 in U.S. Appl. No. 10/180,617.
Final Office Action Dated Jun. 26, 2008 in U.S. Appl. No. 10/180,167.
Notice of Allowance Dated Dec. 30, 2008 in U.S. Appl. No. 10/180,145.
Office Action Dated Nov. 15, 2006 in U.S. Appl. No. 10/180,164.
Office Action Dated Mar. 23, 2007 in U.S. Appl. No. 10/180,164.
Notice of Allowance Dated Jul. 11, 2007 in U.S. Appl. No. 10/180,164.
Office Action Dated Nov. 15, 2006 in U.S. Appl. No. 10/180,591.
Final Office Action Dated Apr. 18, 2007 in U.S. Appl. No. 10/180,591.
Office Action Dated Dec. 13, 2007 in U.S. Appl. No. 10/180,591.
Final Office Action Dated May 28, 2008 in U.S. Appl. No. 10/180,591.
Office Action Dated Jan. 12, 2007 in U.S. Appl. No. 10/180,361.
Final Office Action Dated Jul. 9, 2007 in U.S. Appl. No. 10/180,361.
Office Action Dated Nov. 28, 2007 in U.S. Appl. No. 10/180,361.
Notice of Allowance Dated Apr. 3, 2008 in U.S. Appl. No. 10/180,361.
Office Action Dated Jan. 4, 2007 in U.S. Appl. No. 10/302,399.
Office Action Dated Jun. 15, 2007 in U.S. Appl. No. 10/302,399.
Final Office Action Dated Sep. 25, 2007 in U.S. Appl. No. 10/302,399.
Office Action Dated Mar. 24, 2008 in U.S. Appl. No. 10/302,399.
Notice of Allowance Dated Aug. 22, 2008 in U.S. Appl. No. 10/302,399.
Office Action Dated Dec. 29, 2006 in U.S. Appl. No. 10/302,499.
Office Action Dated May 4, 2007 in U.S. Appl. No. 10/302,499.
Final Office Action Dated Oct. 22, 2007 in U.S. Appl. No. 10/302,499.
Office Action Dated Mar. 26, 2008 in U.S. Appl. No. 10/302,499.
Office Action Dated Oct. 16, 2008 in U.S. Appl. No. 10/302,499.
Office Action Dated May 27, 2009 in U.S. Appl. No. 10/302,499.
White; 'How It Works: Person TV'; PC/Computing; Nov. 1999; ; p. 272.
Conley; 'The Future of TV is Here'; Ziff Davis Smart Business for The New Economy; Feb. 12, 2001; p. 152.
Brown; 'TiVo PTV 100'; PC Magazine; Jun. 22, 1999; p. 60.
"U.S. Appl. No. 11/771,641 Office Action", Oct. 7, 2011, 14 pages.
"U.S. Appl. No. 11/771,697 Office Action", Oct. 11, 2011, 15 pages.
White; 'How it Works: Person TV'; PC/Computing; Nov. 1999; p. 272.
Conley; 'The Future of TV is Here'; Ziff Davis Smart Business for The New Economy; Feb. 2001; p. 152.
Brown; 'TiVo PTV 100'; PC Magazine; Jun. 1999; p. 60.
"U.S. Appl. No. 11/771,697 Final Office Action", May 10, 2012, 24 pages.
"U.S. Appl. No. 11/771,616 Final Office Action", Jul. 17, 2012, 10 pages.

* cited by examiner

Compression Level Table

| | Level (Rel) | Encoding | Color-space Size | Frame Rate | Resolution | Audio Quality | |
|---|---|---|---|---|---|---|---|
| Source | 80:1 (1) | MPEG-2 | 48 | 30 | 1930x1080 | High | 440 |
| Target | 480:1 (6) | MPEG-2 | 48 | 30 | 720x480 | High | 442 |
| | 960:1 (12) | MPEG-2 | 24 | 30 | 720x480 | High | 444 |
| | 3840:1 (48) | MPEG-2 | 24 | 30 | 352x240 | High | 446 |
| | 8500:1 (100) | MPEG-1 | 24 | 30 | 352x240 | Med | 448 |
| | 12000:1 (140) | MJPEG | 24 | 30 | 352x240 | Low | 450 |

Figure 10a

Compression Level Table — 602

| | Level (Rel) | Encoding | Color-space Size | Frame Rate | Resolution | Audio Quality | |
|---|---|---|---|---|---|---|---|
| | 422 | 424 | 426 | 428 | 430 | 432 | |
| Source | 80:1 (1) | MPEG-2 | 48 | 30 | 720x480 | High | 604 |
| Target | 320:1 (4) | MPEG-2 | 48 | 30 | 352x240 | High | 606 |
| | 1280:1 (16) | MPEG-2 | 48 | 30 | 180x120 | High | 608 |
| | 2560:1 (32) | MPEG-2 | 24 | 30 | 180x120 | High | 610 |
| | 10240:1 (128) | MPEG-1 | 24 | 15 | 180x120 | Med | 612 |
| | 20480:1 (256) | MJPEG | 24 | 15 | 180x120 | Low | 614 |

Figure 10b

PERSONAL VIDEO RECORDING WITH MACHINE LEARNING FOR MESSAGING

CROSS-REFERENCE TO RELATED APPLICATION

This application is a continuation application of and claims priority from U.S. patent application Ser. No. 10/180,361, filed on Jun. 25, 2002.

BACKGROUND OF THE INVENTION

1. Field of the Invention

The field of the invention is data processing, or, more specifically, methods, systems, and products for automated personal video recording.

2. Description of Related Art

In the current art of the personal video recorder ("PVR"), the storage space available upon which to record television shows or other video content ("shows") is a limited resource. PVRs are relatively expensive and therefore are typically shared by more than one user. The Tivo™ system is an example of such a PVR, and today the Tivo™ system is marketed by the number of hours of video content it can record, typically 20, 30, or 50 hours. In a setting with more than one user, the recording time available on typical PVRs is not configured or controlled by user allocation, which causes problems. One user may use a disproportional share of the storage space available for recording video content, leaving little or none for other users of the recorder. It would be advantageous if there were ways to configure or control storage space to facilitate use by multiple users, allowing for multiple users to share the storage resources collision-free, with little risk of erasing or overwriting someone else's recorded shows.

In addition, it is useful to note that estimates of storage space required for recording a particular show are made in dependence upon an estimated compression level. It would be advantageous, therefore, to have means and methods of administering the risk that an estimate of compression level and therefore an estimate of storage space requirement will be too small. Moreover, although such provisions are substantially lacking in the prior art, it would be advantageous also to provide various ways for users to aggregate their abilities to lend, borrow, and record shows. In addition, although such provisions are substantially lacking in the prior art, it would be advantageous also to provide various ways for users to lend storage space to other users and to groups of users. It would also be useful, particularly when free space for lending is scarce, for users to be able to recover used space so that it could be used in recording additional shows.

Users will operate the PVR controls to control a PVR and to track the operations of a PVR. PVR operations can be so complex, however, that it would be advantageous for users to have improved ways of tracking and controlling PVR operations. It would particularly useful if there were ways for PVRs to utilize means of sending and receiving messages to and from users regarding PVR operations.

SUMMARY OF THE INVENTION

Exemplary embodiments comprise methods of machine learning for control of a personal video recorder ("PVR") that include providing records of transmissions of messages; identifying a message point in operation of a PVR; selecting, in dependence upon the message point, a message to be transmitted; and determining in dependence upon the records of transmissions of messages whether to transmit a selected message. In such embodiments, providing records of transmissions of messages includes transmitting messages to users, and storing records of transmissions of messages.

In PVRs according to embodiments of the present invention, determining whether to transmit a selected message typically includes determining whether to transmit the selected message in dependence upon a frequency with which the message is transmitted to a user. In such embodiments, the frequency is often defined with respect to the number of times an associated message point is encountered in PVR operations. PVRs according to such embodiments typically record a result of determining whether to transmit the selected message.

PVRs according to embodiments of the present invention transmit to a user a selected message and store in records of transmissions of messages a record representing the transmission of the transmitted message. In typical embodiments, the records of transmissions of messages include messaging inputs and messaging outputs. Such embodiments include creating mappings from messaging inputs to messaging outputs. In such embodiments, messaging inputs include message identifications, message point identifications, user identifications for a user to whom messages are transmitted, indications whether messages are sends or posts, and command identifications for commands associated with prompts for choices in messages. In such embodiments, messaging outputs include message point counts, message counts, and indications of users' responses to messages. In such embodiments, mappings include confidence ratings, messaging counts, messaging frequencies, and indications whether to transmit sends or posts at message points.

In exemplary embodiments of the invention, providing records of transmissions of messages typically includes transmitting users messages prompting for responses identifying commands, storing records of transmissions of messages, including storing records of responses, and selecting a message to be transmitted further comprises selecting a message to be transmitted in dependence upon the records of responses to messages. Such embodiments include structuring the selected message in dependence upon the records of responses to messages. In such embodiments, structuring the selected message includes inserting in the selected message choices for a set of sequenced commands.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

BRIEF DESCRIPTION OF THE DRAWINGS

FIG. 10a depicts data structures in records representing examples of approximate compression levels, organized with reference to an HDTV source.

FIG. 10b depicts data structures in records representing examples of approximate compression levels, organized with reference to an NTSC source.

DETAILED DESCRIPTION OF EXEMPLARY EMBODIMENTS

Introduction

Figure 1A:
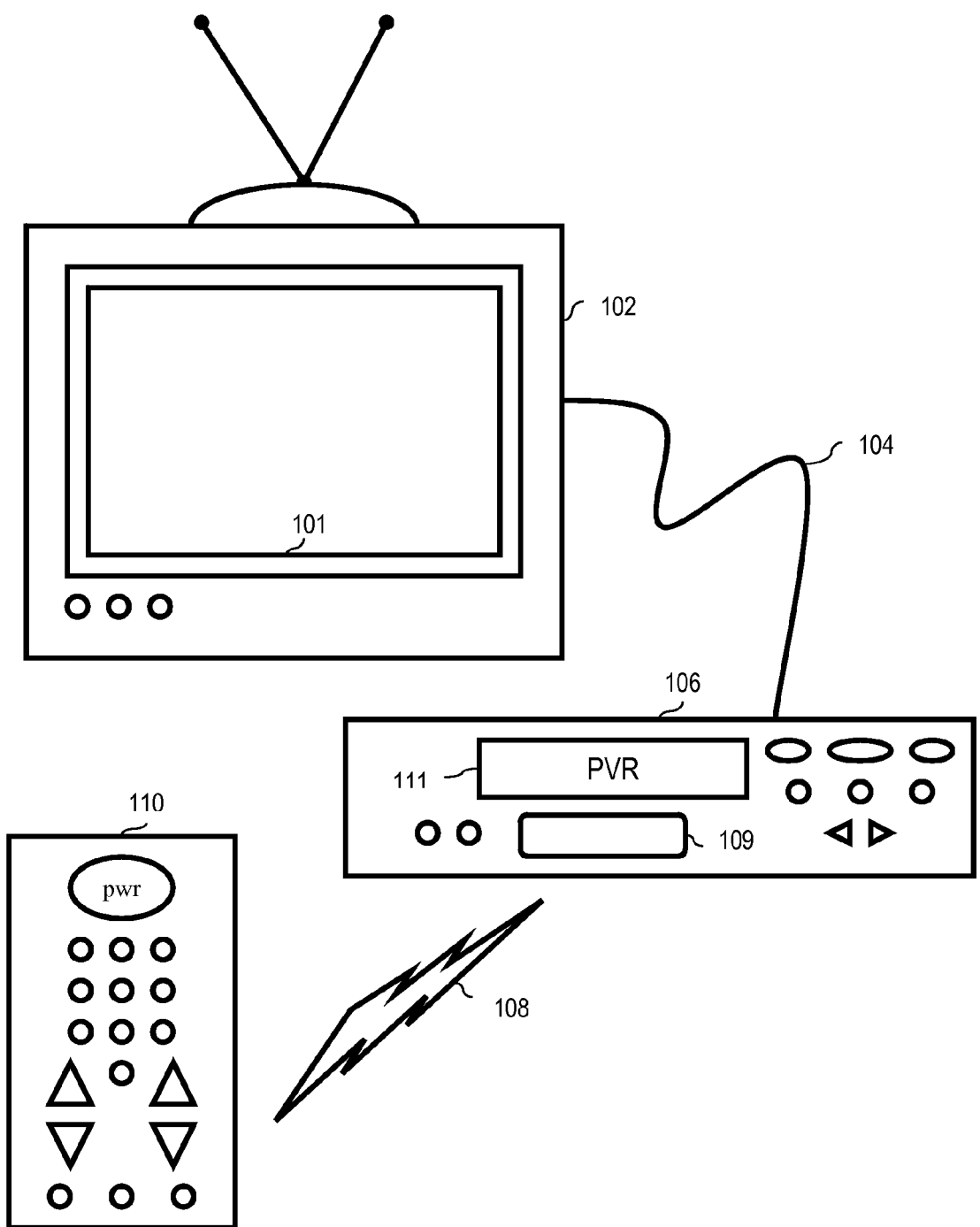
FIGS. 1a and 1b are pictorial representations of aspects of information handling systems in which exemplary embodiments of the present invention may be implemented.

The present invention is described to a large extent in this specification in terms of methods for automated personal video recording. Persons skilled in the art, however, will recognize that any computer system that includes suitable programming means for operating in accordance with the disclosed methods also falls well within the scope of the present invention.

Suitable programming means include any means for directing a computer system to execute the steps of the method of the invention, including for example, systems comprised of processing units and arithmetic-logic circuits coupled to computer memory, which systems have the capability of storing in computer memory, which computer memory includes electronic circuits configured to store data and program instructions, programmed steps of the method of the invention for execution by a processing unit. The invention also may be embodied in a computer program product, such as a diskette or other recording medium, for use with any suitable data processing system.

Embodiments of a computer program product may be implemented by use of any recording medium for machine-readable information, including magnetic media, optical media, or other suitable media. Persons skilled in the art will immediately recognize that any computer system having suitable programming means will be capable of executing the steps of the method of the invention as embodied in a program product. Persons skilled in the art will recognize immediately that, although most of the exemplary embodiments described in this specification are oriented to software installed and executing on computer hardware, nevertheless, alternative embodiments implemented as firmware or as hardware are well within the scope of the present invention.

DEFINITIONS

In this specification, the terms "field" and "data element," unless the context indicates otherwise, generally are used as synonyms, referring to individual elements of digital data. Aggregates of data elements are referred to as "records" or "data structures." Aggregates of records are referred to as "tables" or "files." Aggregates of files or tables are referred to as "databases." Complex data structures that include member methods, functions, or software routines as well as data elements are referred to as "classes." Instances of classes are referred to as "objects" or "class objects."

The terms "borrow," "lend," and "loan," subject to context, generally imply a relatively shorter term rearrangement of storage space effected under automated control of a PVR. The term "allocate," subject to context, generally implies a relatively longer term rearrangement of storage space effected by users' manual inputs through user interfaces. An example of borrowing is a PVR's determination at record time that a deficit of storage space exists that needs to be cured before recording proceeds. If the cure is a rearrangement of storage space to be reversed after users view a show, then the cure is said to be a 'borrowing' or a 'loan.' An example of an allocation is a user's manual instruction through a keyboard or a remote control device, in response to prompt screens, and by use of data input screens on a display device, to assign a portion of unallocated storage space to a user or to a pool.

"Cinepak" is a popular codec originally developed by SuperMac, Inc.

Figure 2A:
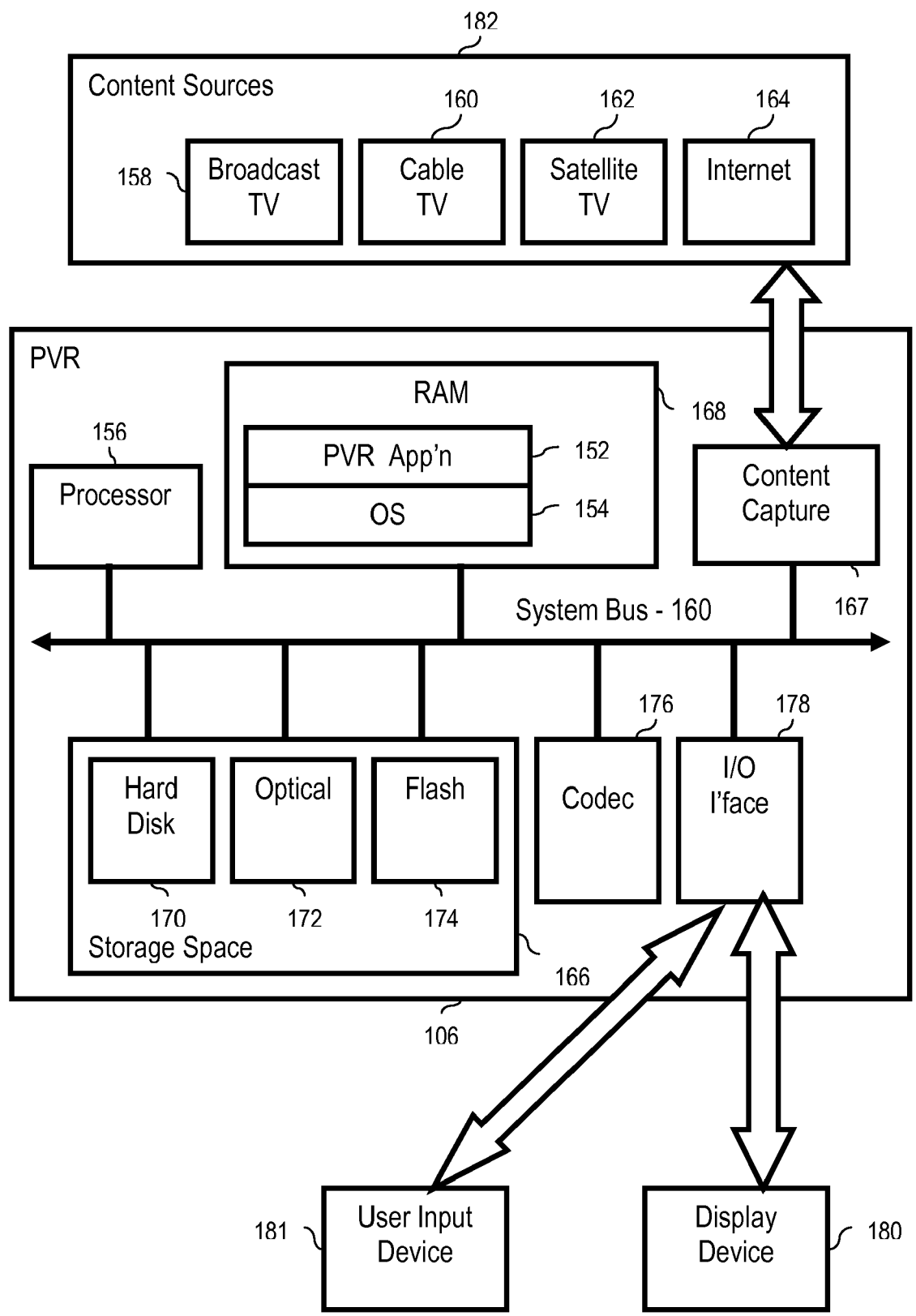
FIG. 2a is a block diagram of an example embodiment of a PVR according to the present invention.

"Codec" is an industry-standard term referring to "encoder/decoder," or perhaps more legibly, "coder/decoder". Codecs are means and methods for encoding and decoding video with audio. Codecs are implemented in hardware or in software. The codec illustrated at reference 176 in FIG. 2a, shown in a system or apparatus diagram, is implicitly a hardware codec. Hardware codecs, like other co-processors, tend to offload CPU burden and render overall PVR operation more efficient. Software-only codecs are freely available for downloading from various sources on the Internet. It is probably an accurate general description that software codecs tend to be less expensive than hardware codecs, while hardware codecs tend to be more efficient. There are many codecs, including, for example, Cinepak, Motion JPEG, and, of course, MPEG. PVR operations are video-intensive, so that hardware codecs will be common in PVRs according to embodiments of the present invention, although the use of software codecs is also well within the scope of the present inventions and actually quite likely in a variety of cost-conscious embodiments.

Codec functions include compression and decompression. When show is encoded, it is converted to a compressed format suitable for storage or transmission; when it is decoded it is converted to a non-compressed (raw) format suitable for presentation. Each codec has certain input formats that it can handle and certain output formats that it can generate. In some situations, a series of codecs are used to convert from one format or compression level to another.

"DVD" stands for 'Digital Versatile Disc' or 'Digital Video Disc,' an improved storage standard that holds at least of 4.7 gigabytes, enough for a full-length movie. DVD storage, like CD-ROM storage, is typically eventually optical, although the format does not strictly required optical storage and is often implemented in other kinds of storage, magnetic or electronic, at least as interim measures. The DVD specification supports disks with capacities of from 4.7 gigabytes to 17 gigabytes and access rates of 600 KBps to 1.3 MBps. DVD drives are backward-compatible with CD-ROMs. That is, DVD players can play old CD-ROMs, CD-I disks, and video CDs, as well as DVD-ROMs. DVD players can also read CD-R disks. DVD may be pertinent to PVRs according to embodiments of the present invention because DVD, like HDTC, uses MPEG-2 to compress video data.

"Compression" as the term is used in this disclosure refers to the overall effect of all applicable techniques for video file size reduction, including, for example, reduction of color space, reduction of frame rate, reduction of resolution, reduction of audio quality, and changes in compression algorithms or compression algorithm parameters as such. There are many ways, as will occur to those of skill in the art, to reduce file size by manipulation of compression algorithms and the parameters of compression algorithms. The use of the term "compression" in this disclosure, however, subject to context, of course, is generally broader than mere manipulation of compression algorithms.

"Compression level" refers to an estimated compression level calculated on the basis of a show's duration and an estimated compression level for the recorded content of the show. Unless the context requires otherwise, the term "compression level" means "estimated compression level."

"Compression algorithm" refers to a particular type of compression technique, including lossy as well as lossless compression, including for example, Lempel-Zif-Welch compression, which is the compression technique used in the popular graphics file format known as "GIF"; various flavors of Lempel-Zif compression such as LS-77 and LZ-78, LZ-78 being a 'dictionary' compression technique used in many popular applications such as the well-known 'zip' utilities; run-length encoding; and Huffman encoding.

"ID" abbreviates "identification," meaning 'identification code' or identification field. It is a style of reference in this disclosure to refer to user identification codes as "user IDs." By convention in this disclosure, the field name "UserID" is used to store a user ID. That is, for example, the UserID field 190 in the example user profile 202 in FIG. 3 contains a user ID of a registered user on a PVR. When a user ID for a borrower is stored in a data element in computer memory, it is a convention in this disclosure to refer to that user ID, a borrower's identification, that is, as a "borrower ID." Similarly, lenders identifications are often termed "lender IDs." "Borrower IDs" and "lender IDs" are user IDs for roles of users as lenders, borrowers, owners, viewers, and so on. That is, for example, borrowers and lenders are users having user IDs. When a user acts as a borrower, depending on the context, the user is generally said then to have a borrower ID. When we name a field to store a borrower ID, we adopt the convention of naming the field "BorrowerID." The lending authorization records at reference 220 in FIG. 3, for example, include a LenderID field 222 which contains a user ID of a user authorizing lending.

"IMAP" means 'Internet Message Access Protocol.' IMAP is a protocol for retrieving email message from an Internet email server. In "offline" operation, an email client fetches messages from an email server to the client machine where the email client program is running, and then deletes the email messages from the server. In "online" operation, messages can be left on the email server and manipulated remotely by email client programs. In online mode, mail is left on the server, which is useful when users access different computers at different times to read their email. POP support offline email operations. IMAP supports both offline and online email operations. That is, IMAP, the newer protocol, is currently similar to POP3 with some additional features. With IMAP, for example, clients can search through email messages for keywords while the messages are still on the email servers. Email clients can then choose which messages to download, leaving others resident on a server.

"JPEG" stands for Joint Photographic Experts Group, the original name of the committee that developed the standard. JPEG is a data compression standard for graphic images. JPEG can reduce files sizes to about 5% of their uncompressed size, although some detail is lost in the compression.

"Motion JPEG" or "MJPEG" extends the JPEG standard by supporting video. In Motion JPEG, each video frame is stored using the JPEG format. In this regard, note that the 5% compression estimate for JPEG is the effect of the compression algorithm alone, without regard to frame rate, resolution, and so on.

"MPEG" stands for 'Moving Picture Expert Group,' a working group under "ISO," the International Organization for Standardization and "IEC," the International Electrotechnical Commission. What is commonly referred to as "MPEG video" actually includes three standards, MPEG-1, MPEG-2, and MPEG-4. MPEG-1 and MPEG-2 are similar. They both work on motion compensated block-based transform coding techniques. MPEG-4 differs in its use of software image construct descriptors for target bit-rates in the very low range, less than 64 Kb/sec.

"MPEG-1" was originally optimized to work at video resolutions of 352×240 pixels at 30 frames/sec (NTSC based) or 352×288 pixels at 25 frames/sec (PAL based), commonly referred to as Source Input Format (SIF) video. The MPEG-1 resolution is not limited to the above sizes and in fact may go as high as 4095×4095 at 60 frames per second. MPEG-1's bit-rate is optimized for applications of around 1.5 megabits per second, although MPEG-1 can be used at higher rates if required. MPEG-1 is defined for progressive frames only, and has no direct provision for interlaced video applications, such as are used in broadcast television applications.

"MPEG-2" addresses issues directly related to digital television broadcasting, such as the efficient coding of field-interlaced video and scalability. MPEG-2's target bit-rate is higher than MPEG-1's, between 4 and 9 Mb/sec, resulting in potentially very high video quality. MPEG-2 is based upon 'profiles' and 'levels.' The profile defines bitstream scalability and colorspace resolution, while the level defines image resolution and maximum bit-rate per profile. Probably the most common descriptor in use currently is 'Main Profile, Main Level' (MP@ML), which refers to 720×480 resolution video at 30 frames/sec, at bit-rates up to 15 Mb/sec for NTSC video.

Another example of an MPEG-2 descriptor in common use is the HDTV resolution of 1920×1080 pixels at 30 frames per second, at bit-rates up to 80 megabits per second. This HDTV example is a 'Main Profile, High Level' (MP@HL) descriptor. A complete table of the various legal combinations can be found in reference[2].

"NTSC" stands for a video standard promulgated by the National Television Standards Committee. The Committee is responsible for setting television and video standards in the United States. In Europe and the rest of the world, the dominant television standards are PAL and SECAM. The NTSC video standard defines a composite video signal with a frame rate of 30 frames/second implemented as 60 interlaced half-frames per second. Each frame contains 525 lines and can contain 16 million different colors. A newer digital television standard is called "HDTV" for High Definition Television, supporting higher resolutions than NTSC.

"POP" means 'Post Office Protocol.' POP is a protocol used by an email client to retrieve email from a mail server. POP is in very common usage among email clients, although the new IMAP protocol is becoming popular also. There are two versions of POP. POP2 requires SMTP to receive email messages from clients or other servers. The newer version, POP3, can be used with or without SMTP.

"Show" means any recordable or distributable electronic or digital content including television broadcasts, movies, CD contents, DVD recordings, cable transmission, satellite transmissions, commercial video clips, audio, multi-media programming, and the like. Shows include any image or series of images delivered to users through any mechanism or means, including associated audio or other multi-media content.

"SMTP" means 'Simple Message Transfer Protocol.' SMTP is a protocol for sending e-mail messages between servers. Internet email traffic largely travels over SMTP from server to server. After email arrives at a target server, email messages are then retrieved from the server with an e-mail client using either POP or IMAP. SMTP also is used to send messages from mail clients to mail servers. This is why users generally must specify both a POP or IMAP server and an SMTP server when configuring an email client. 'Email client' means an email application program such as, for example, Microsoft's Outlook™.

Figure 3:
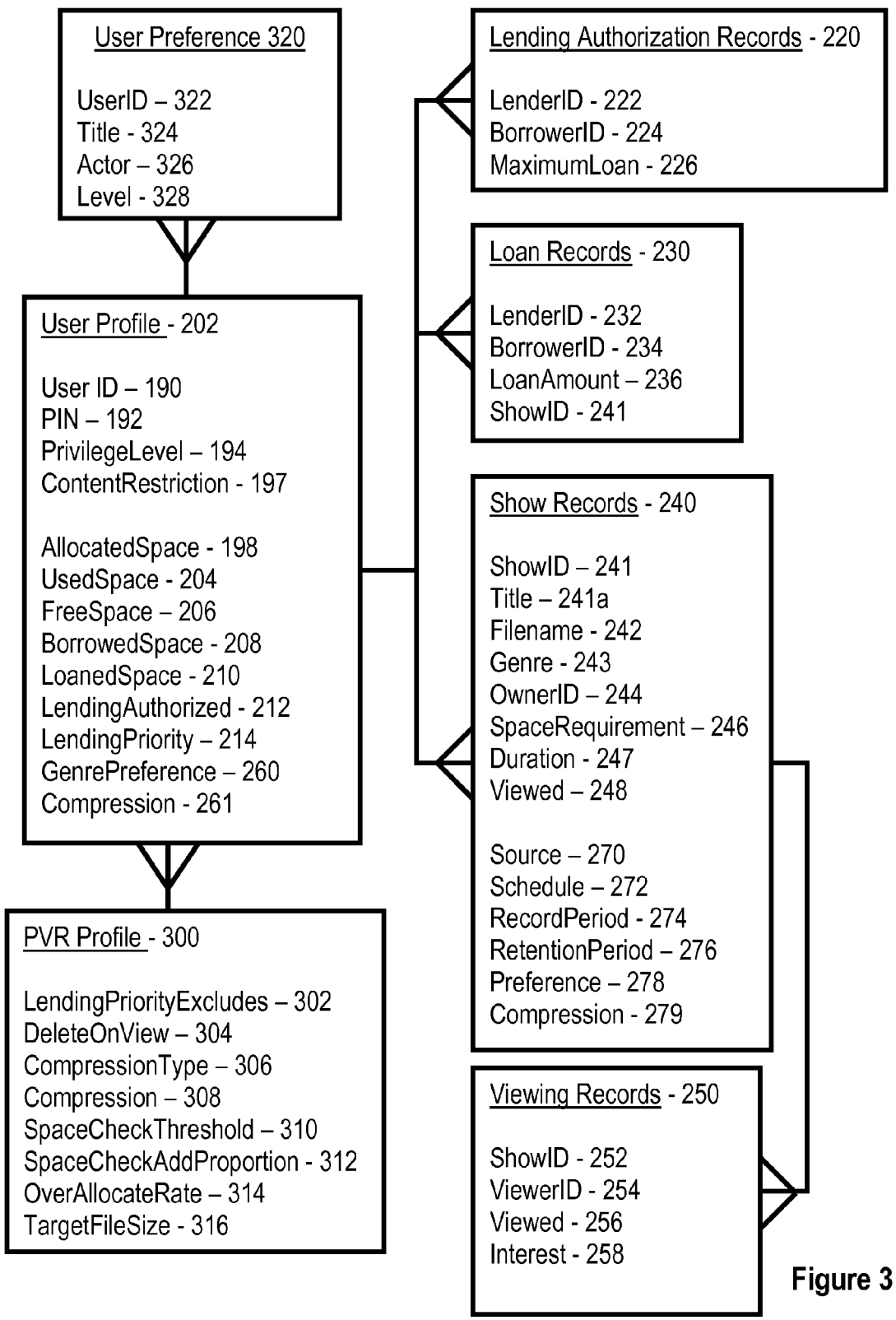
FIG. 3 depicts data structures as related records useful in exemplary embodiments of the present invention.

Unless the context requires otherwise, "user" means 'registered user,' that is, a user having within a PVR a representative user profile such as those illustrated by the record structure at reference 202 on FIG. 3. Readers will notice that there are no logons required within the scope of the present invention, although logons are permitted. Unregistered users therefore are permitted in many embodiments to view shows recorded by other users. The benefit of allowing viewing by unregistered viewers is that visiting relatives do not need to have user profiles installed for them. The can just sit down and watch TV. In many embodiments, however, access controls are installed that do as a practical matter require logons, despite the fact that logons are optional within the invention itself. Examples of configurations of PVRs, according to embodiments of the present invention, that require logons for access control are PVRs that control children's viewing hours and PVRs that control access to mature content by younger viewers.

"Video" as the term is used in this disclosure, and according to context, generally includes audio.

Borrowing Storage Space

Figure 1B:
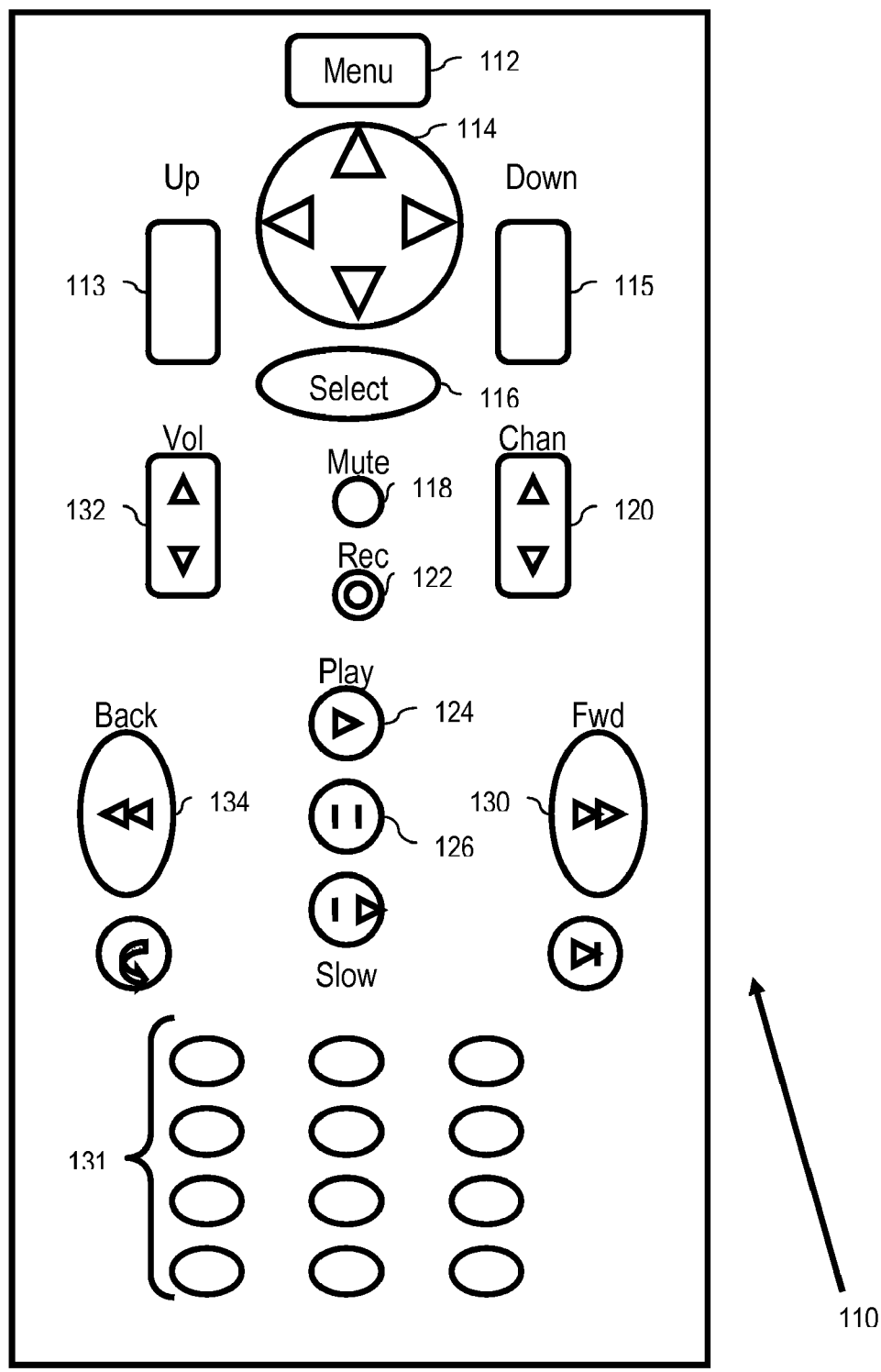

With reference now to the figures, and in particular with reference to FIGS. 1a and 1b, pictorial representations of an information handling system in which an exemplary embodiment of the present invention may be implemented are depicted. Embodiments of the present invention generally are implemented as information handling systems that include automated computing machinery. For simplicity, however, and because such information handling systems with automated computing machinery will often in fact comprise personal video recorders of one form or another, this disclosure refers generally to implementations of embodiments of the present invention as personal video recorders or "PVRs."

FIG. 1a is a pictorial representation of a typical context of installation of one kind of PVR according to the present invention. The PVR 106 of FIG. 1a is a set top box, similar in size and shape to a cable television box or a video cassette recorder ("VCR"). PVR 106 is connected to a television 102 for display on display screen 101 of television shows, movies, or other content, as well as display of operational information regarding the PVR itself and its stored or recorded content. By "stored content" or "recorded content" is meant any information or entertainment content capable of being recorded in an environment comprising automated computing machinery, including, for example, broadcast television shows, cable television shows, motion pictures, personal video clips from video recorders, audio and music pieces, video/audio downloaded from Internet locations, and material sourced from optical storage such as compact discs. In fact, the example PVR 106 shown in FIG. 1a includes a read/write compact disc drive supporting removable media. Again for simplicity of reference, "stored content" is often referred to in this disclosure as "shows."

The PVR 106 is connected to the television 102 by cable 104. The cable connection 104 can be for video and audio through a standard video cable, or for television broadcast frequencies through a standard coaxial cable. A remote control unit 110 allows users to interact with and control the PVR 106. Remote control unit 110 emits infrared ("IR") signals, although other kinds of remote control emissions are within the scope of the invention, including for example radio control. The example PVR 106 includes an IR window 109 for receipt of information and instructions from remote control unit 110. Functions provided by use of the remote control unit 110 include the ability to move a cursor on a display and select items shown on a display.

FIG. 1b is a more detailed depiction of a remote control unit 110 useful with various embodiments of the present invention. Similar to a standard remote control for a television set or a VCR, remote control unit 110 includes a "Menu" button for access to a central set of menus and data entry screens for configuring the PVR, configuring user profiles on the PVR, and scheduling shows. The "Up" and "Down" buttons 113 and 115 allow users to change displays page-by-page rather than by scrolling line-by-line or item-by-item. Navigation buttons 114 support scrolling. The "Select" button 116 is used to select a display item after paging and scrolling have located the item.

The remote control unit includes conventional numeric keys 131 as well as buttons associated with television and recorded playback control including a "Volume" control 132, a "Channel" selector 120, a "Mute" button 118, and buttons for "Play" 124, a rewind button called "Back" 134, a fast forward button labeled "Fwd" 130, and a pause button 126. The "Record" button 122 is used to instruct the PVR to record a show typically when the show has been selected, for example, through navigation through a series of display screens depicting television broadcast schedules for televisions shows.

In the previous few paragraphs, we described an embodiment of the present invention as an information handling system with automated computing machinery configured as a PVR, a set top box coupled to a television for display and user interaction and controlled by a remote control unit. It is useful to understand that the set top box configuration is not at all the only configuration of a PVR within the scope of the present invention, and to clarify this point, we ask the reader to consider PVRs implemented as software installed upon general purpose computers. In the case of a PVR embodied upon a general purpose computer, the PVR is implemented as software installed in computer memory in a conventional fashion to embody the inventive steps of the present invention.

Although a PVR implemented as a set top box will include by special design within the set top box all the hardware resources needed to implement the steps of the invention and store content in accordance with the invention, not all computers will possess such hardware. To the extent that any general purpose computer, however, and today many of them do, possesses sufficient resources to download, read from a compact disc, receive cable television, or otherwise access recordable content, and sufficient resources to store such recordable content on hard disk, writable optical drives, or other storage media, then any general purpose computer can be configured as a PVR according to an embodiment of the present invention.

For PVRs embodied in general purpose computers according to the present invention, PVR controls are implemented through the usual user interface as provided in connection with any particular computer terminal, computer screen, computer keyboard, computer mouse, and so on. In this sense, general purpose computers include personal computers, portable computers, minicomputers, mainframes, laptop computers, handheld computers, personal digital assistants, wireless Internet-enabled cell phones, and so on.

FIG. 2a sets forth a block diagram of automated computing machinery comprising a PVR 106 according to an exemplary embodiment of the present invention. The PVR 106 of FIG. 2a includes at least one computer processor 156 as well as random access memory 152 ("RAM"). Stored in RAM 168 is a PVR application program 152 implementing inventive steps of the present invention.

Also stored in RAM 168 is an operating system 154. Embodiments of the present invention are directed towards personal video recording for multiple users. It will occur to readers skilled in the art that much of the work of administering user accounts for many users may be downshifted to a multi-user operating system such as Unix, Linux, or Microsoft NT™. The multi-user features of typical embodiments of the present invention, however, tend to be features of application software. PVRs according to embodiments of the present invention, therefore, may use single-user operating systems, such as Microsoft's Disk Operating System or "DOS," as well as multi-user operating systems, or even operating systems developed as special purpose systems just for use in PVR according to this invention. In this disclosure, we speak of administration of multiple users in terms of "user profiles," to distinguish our application-level user administration from any operating system's administration of 'user accounts.'

The PVR 106 of FIG. 2a includes storage space 166 for shows. Storage space 166 can be implemented as hard disk space 170, optical drive space 172, electrically erasable programmable read-only memory space (so-called 'EEPROM' or 'Flash' memory) 174, RAM drives (not shown), or as any other kind of computer memory capable of receiving and storing recorded content as will occur to those of skill in the art.

The example PVR 106 of FIG. 2a includes a subsystem for content capture 167. This subsystem for content capture 167 is implemented in typical embodiments according to content sources 182 and can include in various embodiments a broadcast television tuner for receipt of broadcast television 158, a cable box for receipt of cable television 160, a satellite receiver for receipt of satellite television 162, and an Internet connection for downloading recordable content from the Internet 164.

The example PVR of FIG. 2a includes a codec 176, which can take the form of a video card plugged into the system bus of a personal computer, or other forms as will occur to those of skill in the art. The codec 176 provides video and audio output from recorded shows in storage space 166 to an input/output interface 178. The codec 176 can also provide changes in video compression or video quality as needed in particular instances. The input/output interface provides video and audio output to a display device 180. In the case of PVRs implemented with connection to televisions, the display device 180 is a television. In the case of PVRs implemented as general purpose computers, the display device is often implemented as a computer screen. The display device 180 is any device, as will occur to those of skill in the art, capable of displaying video and audio content.

The example PVR of FIG. 2a includes an input/output interface 178. The input/output interface 178 in PVRs implemented as general purpose computers is a computer interface including, for example, conventional software drivers and computer hardware for controlling output to display devices 180 such as computer screens, as well as user input from user input devices 181 such as computer keyboards and computer mice. In the case of PVRs as set top boxes, an input/output interface 178 comprises, for example, software drivers and computer hardware for controlling displays on display devices 180 such as television screens and user input from user input devices 181 such as remote control devices (like the one illustrated at reference 110 in FIGS. 1a and 1b).

FIG. 3 illustrates several example data structures useful in various embodiments of the present invention. Such data structures are part of the PVR application software in typical embodiments (reference 152 on FIG. 2a) and are usually stored in RAM (168 on FIG. 2a) or, for longer-term or non-volatile storage, on a hard disk (170 on FIG. 2a) or other non-volatile storage as will occur to those of skill in the art. The example data structures of FIG. 3, for clarity of explanation, are shown related as records in a database, although other data storage arrangements as will occur to those of skill in the art are possible, all such arrangements being well within the scope of the present invention.

FIG. 3 depicts an example user profile 202, useful for registering multiple users on PVRs. The user profile 202 represents a user registered on the PVR in which the profile is installed and sets forth characteristics and limitations regarding the user and the user's privileges to operate the PVR. More specifically, the user profile 202 includes data elements for storing a user identification or "UserID" 190, a password or personal identification number called a "PIN" 192, a user privilege level 194, and content restrictions 196 on recordable content allowed for the user.

The PIN 192 is assigned to the user at registration time and is unique to the user. In PVRs implemented as set top boxes, it is common to utilize numeric PINs because they are easily entered through numeric keys on remote control units (reference 131 on FIG. 1b). Numeric PINs, of course, are not a requirement of the invention. Clearly PVRs implemented upon general purpose computers or any device having a keyboard, for example, would experience no particular benefit from numeric-only PINs or passwords.

The user privilege level 194 provides the capability of distinguishing privileges according to class of user. That is, the user privilege level 194 supports the establishment of classes of users having various levels of privilege. A common example is a class of administrative users or 'super users' who are privileged to edit the profiles of other users. In a home setting, therefore, parents would often be super users privileged to set content restrictions on children's profiles. In a business setting, system administrators in the Information Technology Services organization would often be privileged to create and administer profiles for users with normal usage privileges.

The example user profile 202 of FIG. 3 also provides several example data elements for recording characteristics of storage space available for recording shows on behalf of the user represented by the profile. The user profile 202 provides data elements for allocated space 198, used space 204, free space 206, borrowed space 208, loaned space 210, a Boolean indication whether the user authorizes lending to other users storage space allocated to the user 212, and a lending priority rating 214.

Figure 2B:
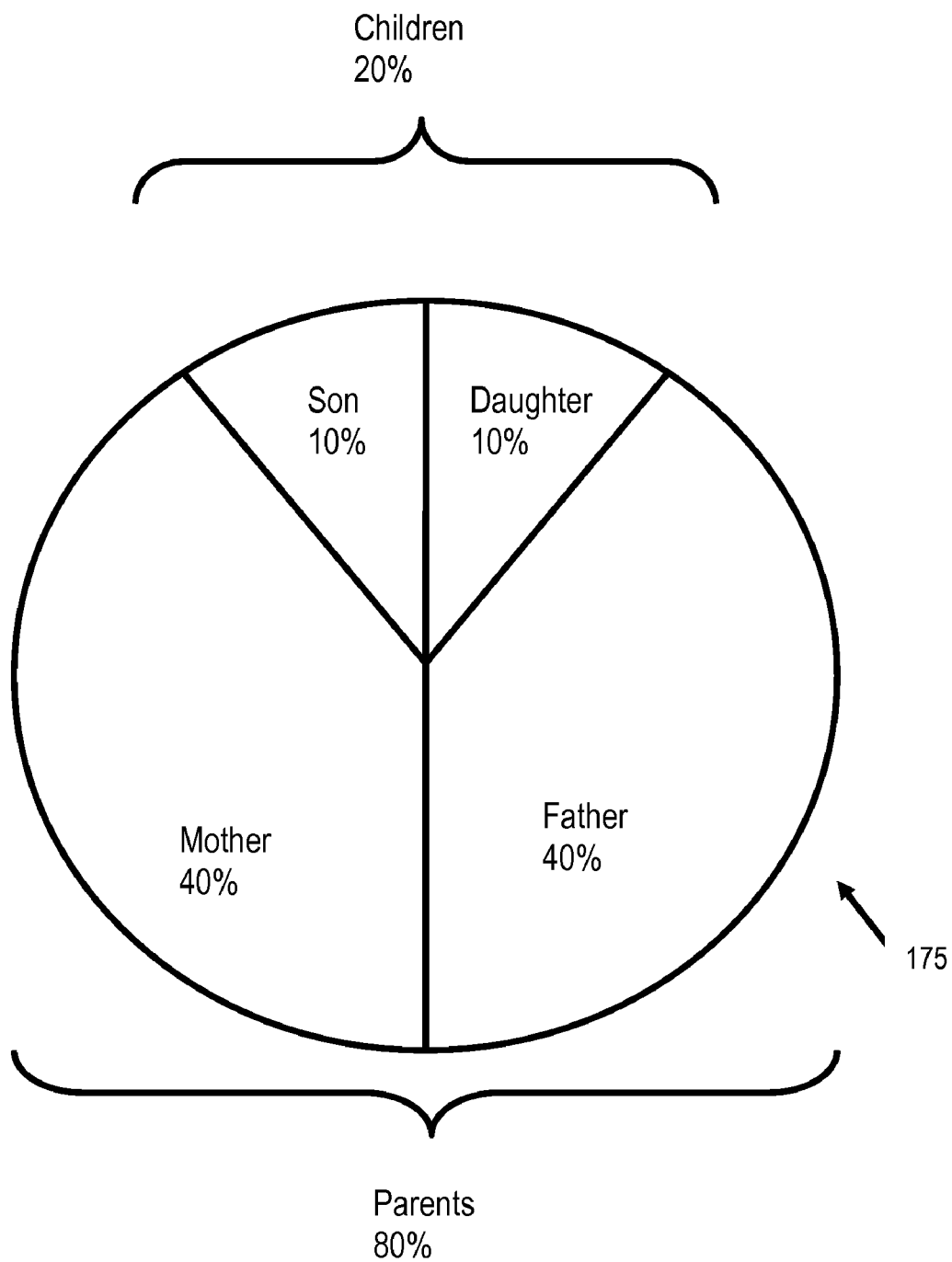
FIG. 2b is a pie chart illustrating an example of storage space allocation.

The allocated space field 198 records the amount of storage space presently allocated to the user. It is usual, although not a requirement of the invention, that the allocated space is altered only by super users, so that normal users avoid conflict risked by normal users changing their own storage space allocations. An initial quantity of allocated space is assigned to each user at registration time, when the user's user profile is created. FIG. 2b sets forth a pie chart 175 showing an example of allocation of storage space in a residential setting. In the example allocation of FIG. 2b, allocation of 100% of the storage space of a PVR within a family includes allocation of 80% of the storage space for parents (40% for father and 40% for mother) and allocation of 20% of the storage space for children (10% for a son and 10% for a daughter).

As the user records shows in the user's allocated space, when a show is recorded in a user's allocated storage space, some of the storage space, the space upon which the show is recorded, is said to be 'used.' Each show has a storage space requirement that uses some of a user's allocated storage. The current total of the used space of all the shows recorded for a user can be stored in the UsedSpace field 204. The free space field 206 is provided for storing the difference between allocated space 198 and used space 204. When a PVR records a show for a user, the PVR increments UsedSpace 204 by the amount of the show's storage requirement and decrements FreeSpace 206 by the same amount.

When the PVR records a show for a user whose FreeSpace is less than the show's storage space requirement, it is an aspect of PVRs according to embodiments of the present invention that the user, acting as a borrower, can borrow space from another user, a lender. The amount of storage space that the user represented by the user profile 202 has borrowed can be recorded in the BorrowedSpace field 208. Similarly, the amount of storage space that the user has loaned to other users can be recorded in LoanedSpace 210. Just as the PVR decrements FreeSpace 206 when the PVR records a show for the user, the PVR also can decrement FreeSpace 206 when the PVR loans a portion of the user's allocated space 198. In this example, therefore, the FreeSpace amount 206, that is, the amount of storage space available to a user for recording shows would be the user's allocated space 198 minus the user's used space 204 minus the user's loaned space 210. It will be discussed in more detail below, but it should be clear that when a user's free space is less than the storage space requirement for a show to be recorded for the user, an alternative process available to a PVR, in addition to borrowing space from a lender, is to repossess space that the user previously loaned to borrowers. In the present example, such repossession would reduce LoanedSpace 210 and increment FreeSpace 206 by the amount of space repossessed.

The example user profile 202 of FIG. 3 also provides a Boolean data element LendingAuthorized 212 for indicating whether the user represented by the profile authorizes borrowings from the user's allocated storage. A lending control such as the LendingAuthorization field 212 can be provided at the user level for users who may wish to, for example, exclude all lending from their allocated storage. Establishing a blanket lending authorization at the user level is a fairly coarse quality of control, and it is possible within the scope of the present invention to establish more fine-grained controls over lending authorization.

An example of a more finely-grained lending authorization is depicted in the lending authorization records 220 in FIG. 3. The example lending authorization records 220 are more finely-grained in that they represent authorizations to lend a specific maximum amount, identified in the MaximumLoan field 226, from a specific lender, identified by the lender's user ID in the LenderID field 222, to a specific borrower, identified by the borrower's user ID in the BorrowerID field 224. An example of a less finely-grained lending authorization is one in which a PVR is programmed to permit lending to any registered user. In terms of the example data structures of FIG. 3, lending to any user can be implemented by permitting a 'wild card' entry in the BorrowerID field 224 in the lending authorization records 220, such as, for example, an asterisk, '*,' which is treated by the PVR as an indication that the lender 222 identified in the lending authorization record 220 authorizes loans to any user.

Of course other granularities are possible within the scope of the present invention, including, for example, lending authorizations having validity periods with beginning dates and ending dates, or lending authorization for identified user groups or for users having certain lending priority levels. The possible settings are many, and any data structure, encoding method, or granularity of lending authorization as will occur to those of skill in the art is well within the scope of the present invention.

The example user profile 202 of FIG. 3 also provides a data element called LendingPriority 214 for establishing lending priority ratings for users. This data element can be used in algorithms to establish the sequence in which space otherwise authorized for lending will be borrowed or to exclude some loans on the basis of comparisons of priorities among users. By establishing two simple lending priorities, for example, lending priority rating '1' and lending priority rating '2,' in a home setting, super users (parents, for example) can assign themselves a higher lending priority rating than child users and either exclude all lending from parents to children or exclude lending to children as long as space is available for lending from children to children, so that children could only borrow from parents after using all space allocated to children. A further example data structure, a system-level profile, in this example called 'PVR Profile' 300, can be established to record PVR-level parameters. In this example, the PVR profile includes a Boolean indication, LendingPriorityExcludes 302, whether user's lending priority ratings are to be used by the PVR to exclude all lending to users having lower priority ratings or just sequence the lending by requiring loans first from users with lower priority ratings.

The example data structures of FIG. 3 include show records 240. A show record 240 is a data structure representing a segment or clip of recorded content, such as video and audio, for example, a television show or a motion picture. There are generally two sources of show records 240, user scheduling and preference recording. "User scheduling" is a user's entering through a user interface a title and recording schedule for the show. The user interface will vary from PVR to PVR. The user interface, in PVRs implemented as set top boxes, is typically a remote control unit maneuvering a pointer over a scrolling list of television shows on a television screen. The user interface, in PVRs implemented as personal computers, is typically a keyboard, a mouse, and a computer screen upon which is displayed a mouse pointer used to highlight and select from scrolling lists of television programs or web sites hosting video clips of interest.

"Preference recording" is a PVR's being programmed to select and record shows based upon previous indications of user preference. Previous indications of user preference are implemented, for example, as a genre preference 260 in a user profile 202, causing a PVR so programmed, when a user has sufficient free space to support such recording, reading the user's previously indicated preference for Comedy, Drama, Science Fiction, or Sports, for example, scanning presently available sources, selecting the first show that matches the user's genre preference for which the user has sufficient free space, and recording that show. In accordance with the present invention, the PVR can be programmed to borrow space from another user if the user has insufficient free space to store the show.

Alternatively, to achieve even greater power to express particular preferences, PVRs can support separate user preference records 320 linked to user profile 202 through a userID 322 as a foreign key. Such separate preference records 320 can support any indication of user preference including, for example, preferences for particular actors 326, preferences for particular title 324, and indications of a user's intensity of preference, encoded as preference Level 328. With respect to preference levels 328 in particular, the PVR can be programmed to record a range of preference levels, for example, 1 through 10, in which a preference level of '10' indicates that the user likes a particular show title very much, '5' indicates neutrality, and a '1' indicates dislike. The Boolean field 'Preference' 278 on the show record 240 indicates whether a recording is a preference recording. So that a user can know what has been recorded on the user's behalf without the user's prior knowledge, PVR screens showing a user's recorded shows typically indicate visually the recorded shows that are instances of preference recording.

The example show record of FIG. 3 includes data elements representing an identification code 241 for the show represented by the show record, a show title 241*a*, a filename for the show 242, the genre of the show 243 (comedy, drama, sports, and so on), an owner identification field called 'ownerID' 244 recording the user ID of the user on behalf of whom the show is recorded, the estimated storage space requirement for the show 246, the duration of the show 247, a Boolean indication whether the show has been viewed by the owner 248, an indication of the source of the show 270, the schedule data for the show 272, a record period for the show 274, and a retention period for the show 276.

Shows in the present example, however, are identified by identification codes 241, identification codes having no relationship to storage locations in storage space. There would be, for example, one identification code for a show titled 241*a* "Dukes of Hazzard," another identification code for the show titled 241*a* "Star Trek," and another for the show titled 241*a*

"Buffy The Vampire Slayer." Operating systems (154 on FIG. 2a) generally organize storage space (166 on FIG. 2a) in segments identified by filenames. Show records 240 according to FIG. 3 therefore provide a filename field 242 to record the location in storage space where a show is recorded so that shows can be located for viewing and later for deletion.

PVRs according to some embodiments of the present invention are programmed to utilize the ShowID field 241 as a completely unique key identifying a particular instance of a show to be recorded at a particular date and time, encoded in the Schedule field 272 in FIG. 3. Other embodiments are programmed to treat the ShowID 241 as a short identifier for a title such as "Star Trek" or "Buffy The Vampire Slayer." In embodiments that treat the ShowID 241 are a title identifier, PVRs can build a unique key for a particular instance of a show from the title 241a plus the date and time (Schedule 272) when the show is to be recorded.

The storage space requirement 246 and the duration 247 are related. The storage space requirement generally is expressed as some number of bytes, kilobytes, or megabytes of storage space. The duration 247 is generally expressed in minutes or hours, a half-hour show, a two-hour movie, and so on. Shows can be recorded in storage space using various kinds of compression ranging from no compression to lossless compression to quite lossy compression. For a show of a given duration, applying higher levels of compression reduces the storage space requirement for the show.

The source 270 can be encoded to indicate a channel number for capturing recorded content from broadcast television, cable television, or satellite television. The source 270 can be encoded with an Internet address identifying a source for downloading recordable content. Internet addresses can be encoded by use of dotted decimal addresses, Universal Resource Locators ("URLs"), or Universal Resource Identifiers ("URIs").

The schedule 272 is a data element for storing the broadcast schedule of the show represented by the show record 240. For example, the schedule field 272 can be encoded with a date and time when a television show is broadcast and therefore to be recorded. The record period 274 provides an indication of a period over which a show may be recorded many times. For example, schedule 272 can be encoded with a schedule indication of Wednesday, 7:00 p.m., and record period 274 can be encoded with 'January through June,' resulting in recording the indicated show weekly for six months.

The retention period 276 is a field indicating how long to retain the show before deleting it. The retention period 276 and indications of viewing 248 can work together in various PVR according to embodiments of the present invention. In FIG. 3, for example, the PVR Profile 300 includes a Boolean indication whether to delete shows only after they are viewed, DeleteOnView 304. In a PVR according to FIG. 3, if DeleteOnView 304 is set True, then the PVR will not delete a show from storage space until the show is viewed, even if the view time is later than the end of the retention period 276. The PVR will retain the show until the end of the retention period if the end of the retention period is later than the time when the show is viewed. Alternatively, DeleteOnView 304 is reset False, and then the PVR deletes the show at the end of the retention period regardless whether the show has been viewed.

The Viewed field 248 in the show records 240 indicates whether the owner of the show has viewed the show. In a multi-user environment, however, it may be useful to retain the show in storage until more than one user has viewed it. The viewing records 250 in FIG. 3 are an alternative or an expansion of the use of the Boolean Viewed field 248 in the show records 240 to allow more than one user to express an interest in viewing the show and retain the show in storage space until all users indicating interest have viewed the show. The ShowID 252 is a foreign key linking the viewing records 250 to a show record 240. The ViewerID 254 is a user ID of a user indicating an interest in viewing the show identified by the ShowID 252. Viewed 256 is a Boolean indication whether the user identified as ViewerID 254 has viewed the show. The fact that a viewing record 250 exists bearing a particular ViewerID 254 can be treated as an expression of interest, or a Boolean field such as Interest 258 can be added to viewing records 250 as an affirmative expression of interest in viewing the show identified in ShowID 252.

In lending and borrowing storage space among users, some method is needed to keep track of who has lent what to whom. The example data structures of FIG. 3 provide an example data structure, loan records 230, for recording which lending user, identified by LenderID 232, has lent what amount of storage space 236, to which borrowing user, identified by BorrowerID 234. In a common example, a user identified by a userID in a user profile 202 shall have outstanding several loans of storage space, each represented by loan record 230. In such an example, the user's BorrowedSpace field 208 in the user's user profile 202 will contain the sum of the amounts in the LoanAmount field 236 in the representative loan records 230.

Figure 4:
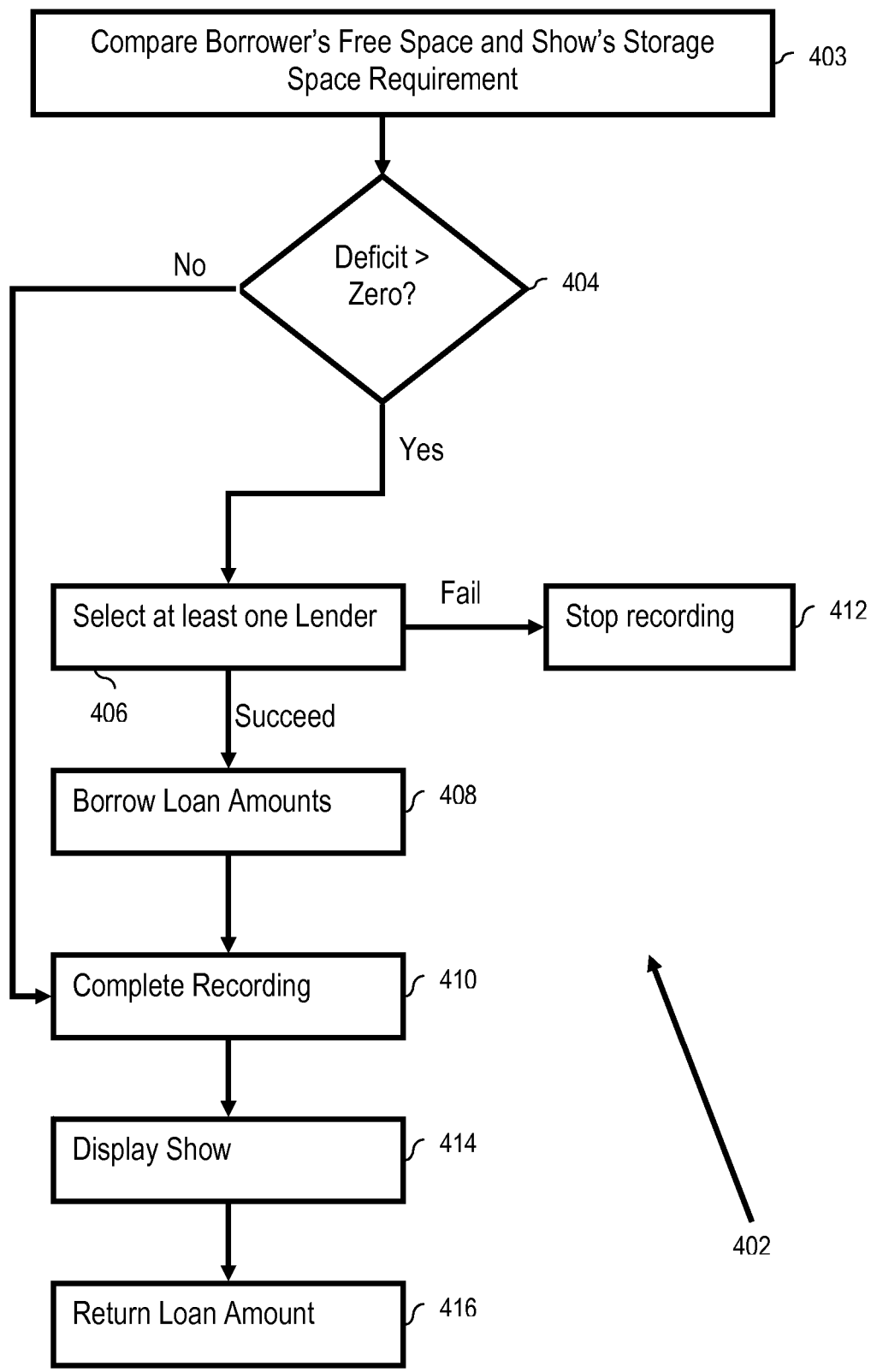
FIG. 4 is a flow chart depicting a method of personal video recording.

FIG. 4 sets forth a flow chart depicting an exemplary method for automated personal video recording 402. The method according to FIG. 4, described below also in terms of the example data structures of FIG. 3, is practiced upon a multi-user PVR having registered upon it a multiplicity of users, each user having allocated storage space on the PVR. Each user's allocated storage space includes storage space upon which shows are recorded ("used space") as well as storage space upon which shows have not been recorded ("free space"). As shown in FIG. 4, the method comprises recording 402 for a user a show owned by the user. The user who owns the show, in slight anticipation, is referred to as a 'borrower.' The borrower is a user registered on the PVR, that is, one of the several users registered on the PVR.

The method according to FIG. 4 includes comparing 403 a borrower's free space (206 in user profile 202 on FIG. 3) and the show's space requirement (246 in the show record 240). The comparison 403 supports determining 404 whether the show's storage space requirement exceeds the borrower's free space. As shown in the example of FIG. 4, the determination whether storage space requirement exceeds free space is done at the beginning of the overall recording process 402, that is, just prior to beginning actual recording, represented as step 410 on FIG. 4. If the show's storage space requirement does not exceed the borrower's free space, then recording continues to completion 410. If the show's storage space requirement does exceed the borrower's free space (the difference is referred to as 'a deficit amount'), then a PVR implementing the example method of FIG. 4 selects 406 a lender from whom to borrow some storage space.

A 'lender' in this sense is a user registered on the PVR having free storage space or "free space," that is, for example, a free storage space field in the lender's user profile having as its value an amount larger than zero and, reflected in the lender's user profile, free space larger than zero. All lenders may have MaximumLoan authorizations (226 on FIG. 3) less than the deficit amount. All lenders may have free space (206 on FIG. 3) less than the deficit amount. It may therefore be necessary to borrow loan amounts from more than one lender, the loan amounts each being less than the deficit amount but adding up in total to at least the deficit amount.

The PVR can fail to select one or more lenders having authorized and available storage space for lending. In such an eventuality, the PVR can be programmed to stop 412 the recording of the show.

The example method of FIG. 4 includes borrowing 408 a loan amount from a selected lender. Borrowing the loan amount from the selected lender can be carried out by use of the data structures of FIG. 3, for example, by adding the loan amount to the LoanedSpace field 210 in the lender's user profile, subtracting the loan amount from the FreeSpace field 206 in the lender's user profile, and adding the loan amount to the BorrowedSpace field 208 in the borrower's user profile. In addition to adjusting the LoanedSpace, FreeSpace, and BorrowedSpace as just described, in this example, the PVR also would create at least one loan record (230 on FIG. 3) identifying the lender in LenderID 232, the borrower in BorrowID 234 and the loan amount in LoanAmount 236. In this example, the borrowing is carried out in dependence upon the deficit amount in the sense that the loan amount is the deficit amount.

In other examples, the loan amount, the amount actually borrowed is not equal to the deficit amount. The PVR may be programmed to borrow for the borrower more than the deficit amount, to give a little headroom for recording. In addition, several loans may be required to amount to the deficit amount, if, for example, no single lender has an authorized maximum larger than the deficit amount or if no single lender has free space larger than the deficit amount. In such cases, there would be more than one loan amount, none of which would be equal to the deficit amount, but the sum of which would be at least equal to the deficit amount. In these examples, although the loan amount may not be equal to the deficit amount, the borrowing is carried out in dependence upon the deficit amount in the sense that the deficit amount is a guide to the total amount to borrow, that is, a guide to borrowing the loan amount.

In the example method of FIG. 4, the owner of the show, that is, the borrower, or others who may be interested to do so, eventually view the show. That is, the PVR displays the show 414. The loan amount of storage space borrowed to support recording the show is then returned 416 to the lender. Returning 416 the loan amount involves effectively reversing the borrowing process. That is, the PVR finds each loan record bearing the ShowID 241 of the recorded show. For each such loan record 230, the PVR subtracts the LoanAmount 236 from the LoanedSpace field 210 in the lender's user profile, adds the LoanAmount 236 to the FreeSpace field 206 in the lender's user profile, subtracts the LoanAmount 236 from the BorrowedSpace field 208 in the borrower's user profile, and deletes the loan record 230.

Figure 5:
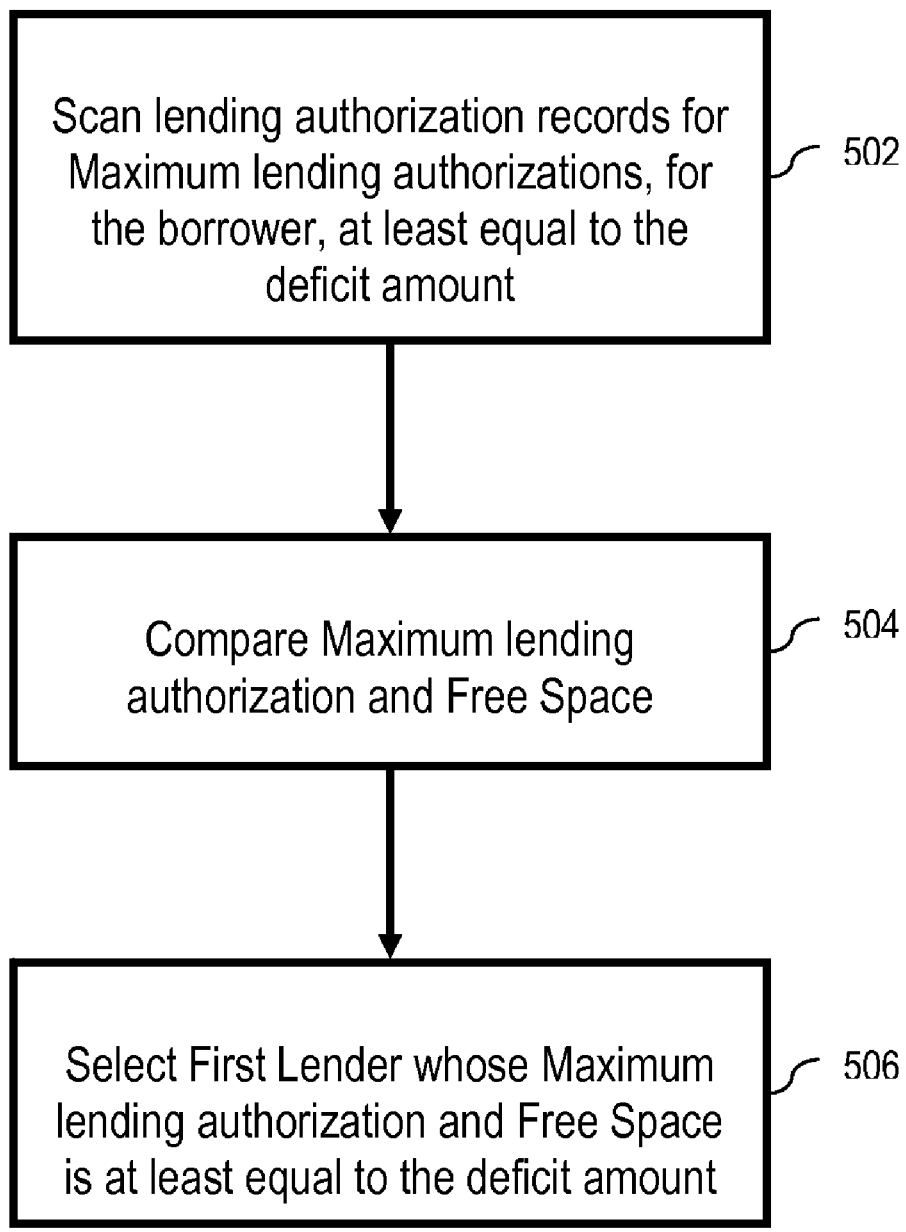
FIG. 5 is a flow chart depicting an example method of selecting lenders.

With reference to FIG. 5, and also with reference to the example data structures of FIG. 3, we describe an exemplary method of selecting lenders. In selecting a lender, the PVR can, for example, as shown in FIG. 5, identify a lender by scanning 502 through lender authorization records (like those depicted at reference 220 on FIG. 3) for MaximumLoan authorizations (226 on FIG. 3) at least equal to the deficit amount. To the extent that the PVR supports borrowerIDs 224 in lending authorization records 220, then the scan is for lender authorizations records authorizing, for the user who owns the show to be recorded, a MaximumLoan amount 226 at least equal to the deficit amount. To the extent that the PVR supports borrowerIDs 224 with wild card authorizations for lending to any user, then the scan is for lender authorizations records authorizing lending to the user who owns the show to be recorded, or to any user, a MaximumLoan amount 226 at least equal to the deficit amount. Using the LenderID 222 in the scanned lending authorization records as a foreign key into the user profiles 202, the PVR compares MaximumLoan authorizations 226 and the free space 206 for user identified as lenders in lending authorization records having MaximumLoan amounts 226 at least equal to the deficit amount. The PVR then selects as the lender the first lender found in the scan and comparison having a MaximumLoan amount 226 and a free space amount 206 both of which are at least equal to the deficit amount. In this sense, lenders are selected in dependence upon the deficit amount.

All lenders may have MaximumLoan authorizations (226 on FIG. 3) less than the deficit amount. All lenders may have free space (206 on FIG. 3) less than the deficit amount. It may therefore be necessary to borrow loan amounts from more than one lender, the loan amounts each being less than the deficit amount but adding up in total to at least the deficit amount.

Figure 6:
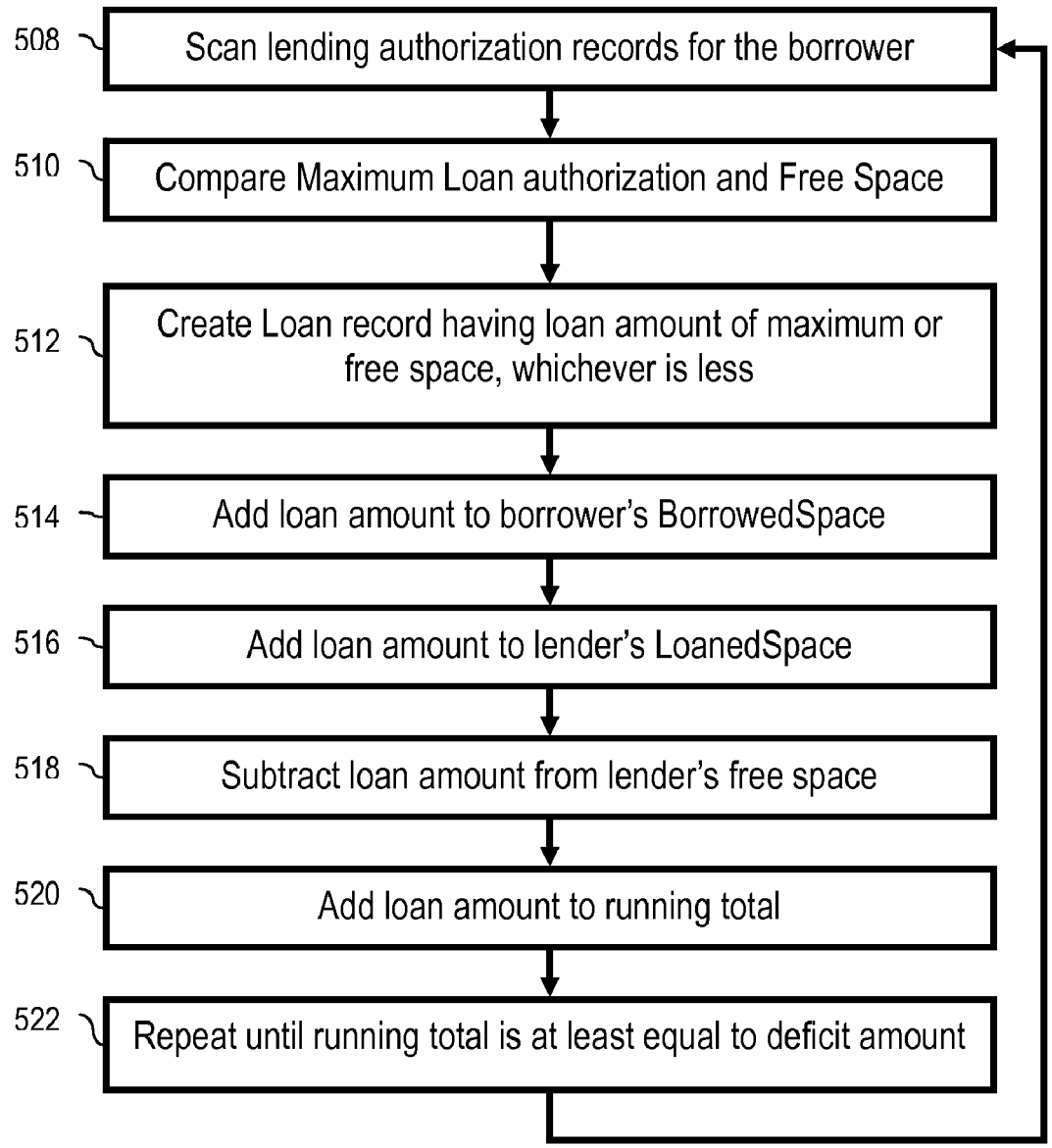
FIG. 6 is a flow chart depicting an example method of selecting multiple lenders from whom to borrow loan amounts totally at least a deficit amount.

FIG. 6 depicts a method of selecting lenders for multiple loans whose individual loan amounts add up to a total loan amount at least equal to the deficit amount. In particular, the example method depicted in FIG. 6 includes scanning 508 lending authorization records (220 on FIG. 3) 'for the borrower,' meaning scanning lending authorization records from various lenders to find the ones that authorize loans to the current borrower, that is, having the borrower's user ID in the BorrowerID field 224. To find lenders who authorize lending to the borrower (or possibly to any borrower, with wild card authorizations as described above) and also have at least some free space, the method of FIG. 6 compares 510 MaximumLoan 226 values from the lending authorization records with the free space values 206 in the corresponding user profiles 202. Because in this example, no single lender alone has sufficient free space to meet the deficit, the example method also, upon finding a lender who has some free space, creates 512 a loan record 230 having a LoanAmount 236 equal to the lender's MaximumLoan amount 226 or the lender's free space 204, whichever is less. The example method also adds 514 the loan amount to the borrower's BorrowedSpace 208, adds 516 the loan amount to the lender's LoanedSpace 210, subtracts 518 the loan amount from the lender's FreeSpace 206. The example method adds 520 the loan amount to a running total for the current show, and the example repeats 522 the steps of scanning 508, comparing 510, creating loan records 512, accounting for the loans (514, 516, 518), and adding a running total 520, until the running total of the loan amounts is at least equal to the deficit amount.

In the example method of FIG. 6, it is the existence of a lending authorization record bearing the borrower's user ID in the BorrowerID field 234 that represents authorization for a loan from a lender (the lender identified in the LenderID field 222) to the borrower. The PVR programmed to find, and finding or not finding at least one such lending authorization record, is determining whether there are lenders authorizing borrowing. More particularly, the PVR programmed to find, and finding or not finding at least one such lending authorization record, is determining whether the borrower is authorized to borrow from one or more lenders. The example method of FIG. 6 selects as lenders one or more users whose free space is at least equal to the deficit amount.

Figure 7:
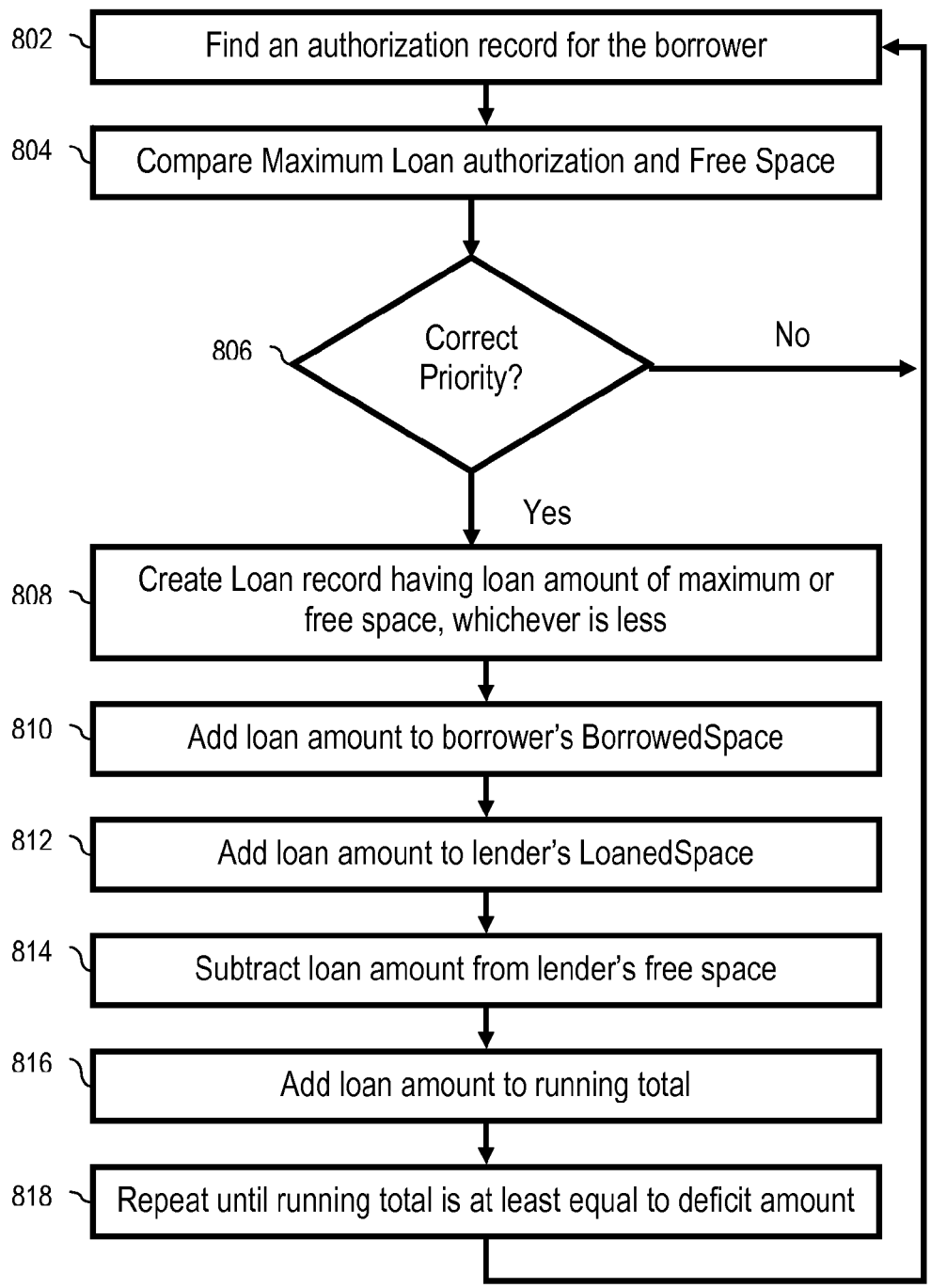
FIG. 7 is a flow chart depicting an example method of selecting a lender according to a lending priority.

FIG. 7, viewed in light of the example data structures of FIG. 3, depicts an alternative exemplary method of selecting lenders, similar overall to the example method of FIG. 6, but dependent also upon priorities. As shown in FIG. 3, PVRs implemented as embodiments of the present invention can include lending priority ratings 214 in user profiles 202. In the method of FIG. 7, each user has a priority rating and selecting a lender comprises selecting, in dependence upon the priority ratings, lenders whose free space is at least equal to the deficit amount. If a single lender can be found whose free space is at least equal to the deficit amount, then only the single lender is needed. If the first lender satisfying priority dependence has insufficient free space to meet the deficit, the PVR can be programmed either to make more than one loan or to continue looking for a single lender with sufficient free space. If no single lender can be found with sufficient free space to meet the deficit, then the PVR is typically programmed to make more than one loan.

More particularly, with regard to FIG. 7, the example method depicted includes finding 802 a lending authorization record (220 on FIG. 3) 'for the borrower,' meaning a lending authorization record having the borrower's user ID in the BorrowerID field 224. The method of FIG. 6 compares 804 the MaximumLoan 226 value from the lending authorization record with the free space value 206 in the corresponding user profile 202, that is, in the user profile of the lender identified in the LenderID field 222 in the lending authorization record 220.

The method of FIG. 7 includes checking for correct priority 806. The correct priority depends on the particular PVR. The PVR can be programmed, for example, so that the priority borrower's priority must be higher than the lender's priority, greater than or equal to the lender's priority, less than the lender's priority, or less than or equal to the lender's priority. Other ways of programming a PVR for priority comparisons or dependencies will occur to those of skill in the art, and all such ways are well within the scope of the present invention. In the method of FIG. 7, if the lender identified in a lending authorization record fails the priority requirement, the method loops back and repeats the process of the method by finding another lending authorization record 802.

In operation of the example method of FIG. 7, it is possible that no single lender alone has sufficient free space to meet the deficit. The PVR implementing the method of FIG. 7, therefore is programmed so that, upon finding a lender who has some free space and meets the priority requirement, the PVR creates 808 a loan record 230 having a LoanAmount 236 equal to the lender's MaximumLoan amount 226 or the lender's free space 204, whichever is less. The example method of FIG. 7 also adds 810 the loan amount to the borrower's BorrowedSpace 208, adds 812 the loan amount to the lender's LoanedSpace 210, and subtracts 814 the loan amount from the lender's FreeSpace 206. The example method adds 816 the loan amount to a running total for the current show, and the example repeats 818 the steps of finding an lending authorization record 802, comparing 804, checking priority 806, creating loan records 808, accounting for the loan (810, 812, 814), and adding a running total 816, until the running total of the loan amounts is at least equal to the deficit amount.

Figure 8:
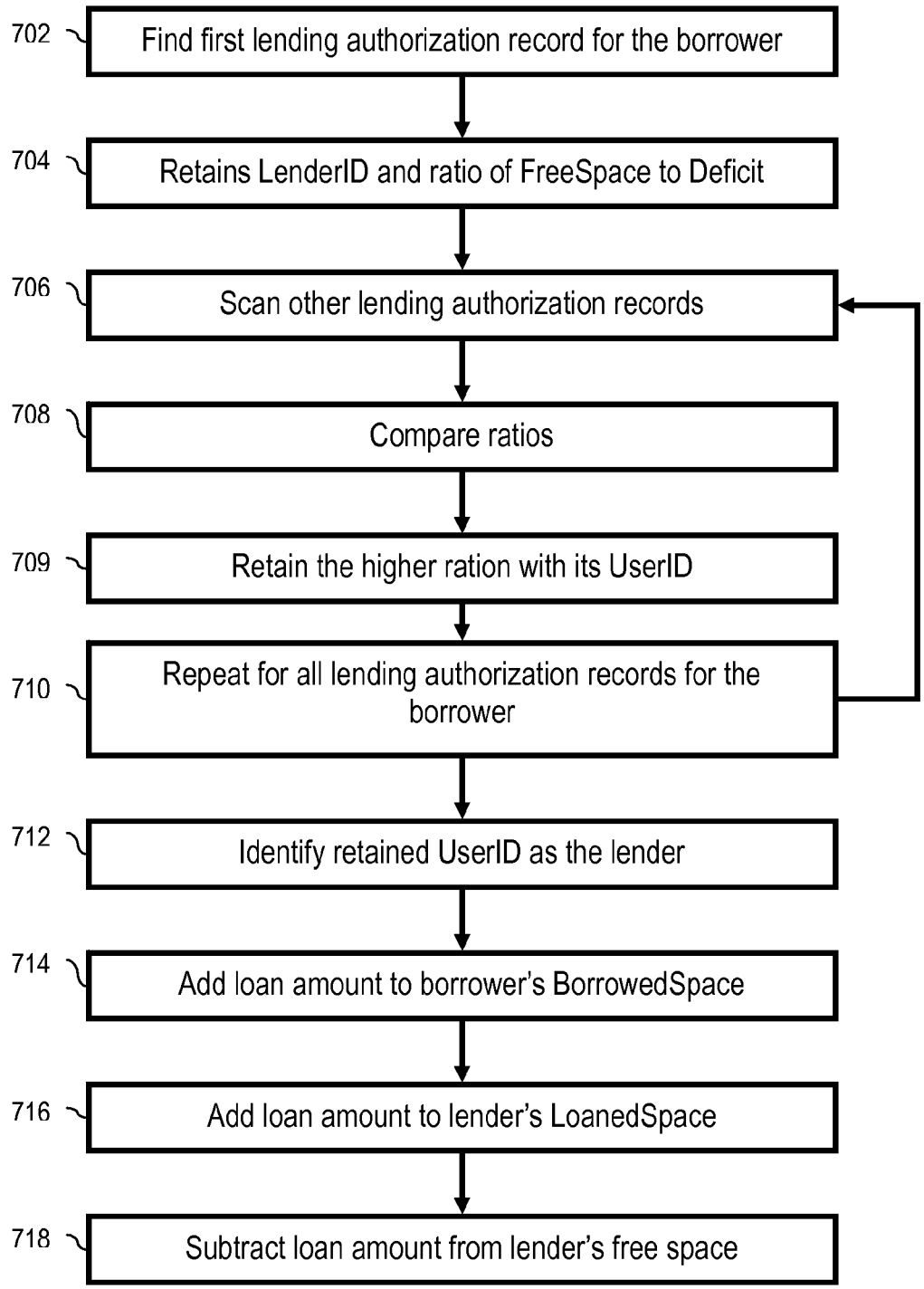
FIG. 8 is a flow chart depicting an example method of selecting a lender according to the ratio of free space to a deficit amount.

FIG. 8 depicts an alternative exemplary method of selecting lenders. More particularly, the example method of FIG. 8 selects a lender who, among all users having free space at least equal to the deficit amount, has the highest ratio of free space to allocated storage space. The example method of FIG. 8 is based upon the lending authorization granularity of the lending authorization 220 records in FIG. 3, that is, lending authorizations from a lender 222 to a borrower 224 of a particular maximum amount 226. The example method of FIG. 8 begins by finding 702 a first lending authorization record 220 authorizing lending to the borrower 224 from a lender whose FreeSpace 206 is at least equal to the deficit. The method of FIG. 8 then retains in temporary storage that first LenderID and the ratio of that lender's FreeSpace 206 to the deficit amount. The method then includes repeatedly 710 scanning 706 in a loop through the remaining lending authorization records for the borrower, comparing 708, for each lender authorizing lending to the borrower and having FreeSpace at least equal to the deficit, the lender's ratio of free space to the deficit amount with the ratio currently retained in temporary storage, and retaining 709 in temporary storage the highest ratio and the user ID of the lender having the highest ratio. The user ID retained in temporary storage at the end of the loop is identified 712 as the lender for the current loan. The loan is completed by adding 714 the loan amount to the borrower's BorrowedSpace 208, adding 716 the loan amount to the lender's LoanedSpace 210, and subtracting 718 the loan amount from the lender's FreeSpace 206.

Processing of borrowed storage space according to embodiments of the present invention includes returning borrowed space to lenders. As described earlier, return of borrowed space can occur when the borrower has viewed the show for which the space was borrowed. It can also occur, however, within the scope of the present invention, that borrowed space needs to be "repossessed" by a lender. More particularly, when recording a show for a lender, the show can have a storage space requirement exceeding the lender's free space. The difference between the storage space requirement of the show and the lender's free space is called a 'deficit amount.' The lender in this example is a user who has already loaned some storage space to one or more other users, that is, borrowers. In this example, a PVR according to an embodiment of the present invention is programmed to determine whether other free space is available for lending from other users to the lender, and, if no other free space is available for lending to the lender, returning from at least one borrower to the lender at least part of the loan amount previously loaned to the borrower from the lender.

Figure 9:
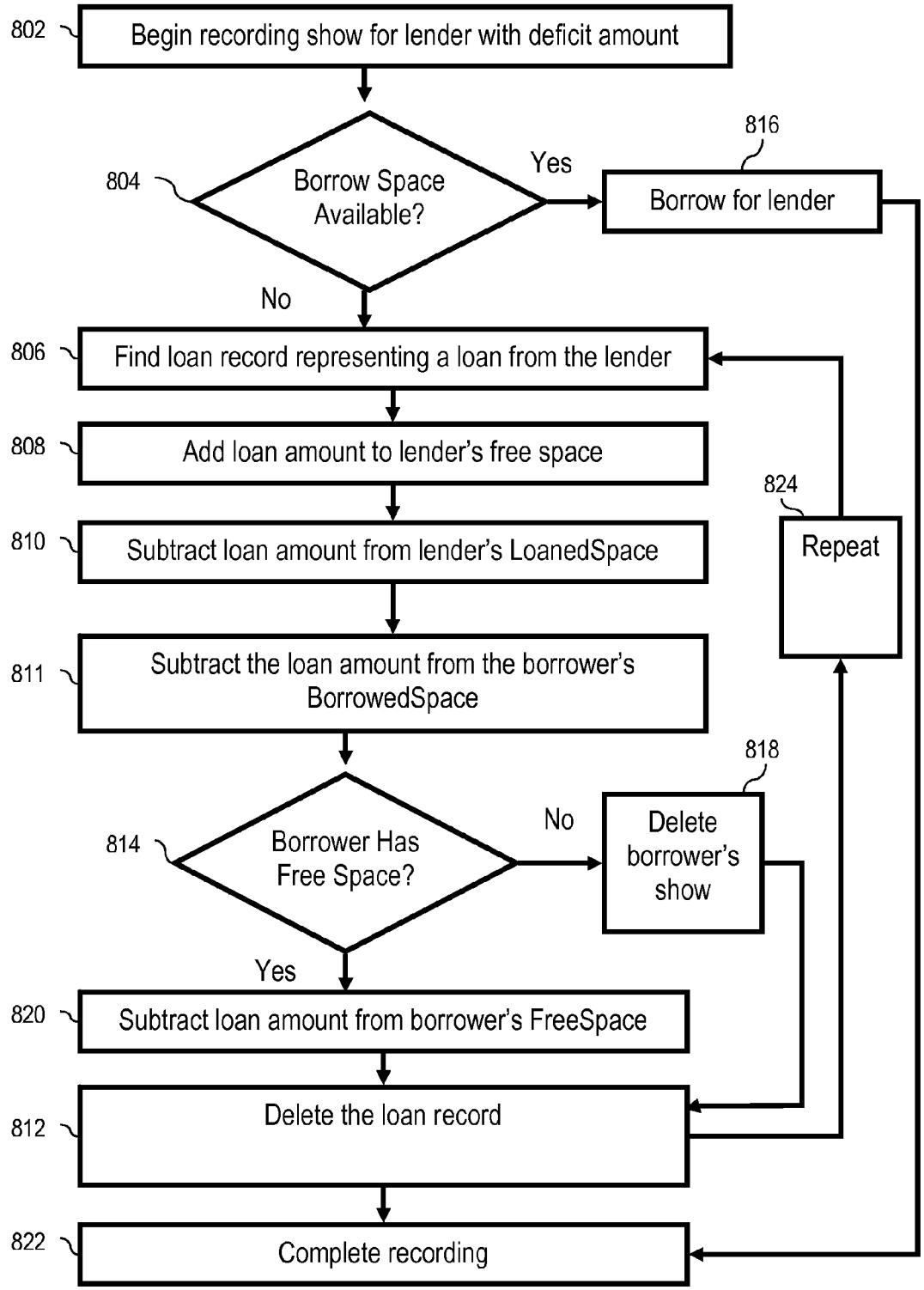
FIG. 9 is a flow chart depicting an example method of returning borrowed storage space from a borrower to a lender.

FIG. 9, viewed in conjunction with the example data structures of FIG. 3, depicts an example of a method for returning borrowed storage space to the lender from whom it was borrowed. The method of FIG. 9 begins 802 with a scheduled recording of a show having a storage space requirement exceeding the free space of the user who scheduled the recording, the 'owner' of the show. In this example, the owner is a lender. That is, the owner of the show to be recorded has outstanding loans of storage space to one or more users, loans represented by loan records of the kind illustrated at reference 230 on FIG. 3. In this example, the lender has a deficit. That is, the lender's FreeSpace amount 206 in the lender's user profile 202 is less than (by a deficit amount) the SpaceRequirement 246 in the show record 240 representing the show to be recorded.

The PVR in this example is programmed to scan lending authorization records to determine whether there exists storage space available for the lender to borrow 804. If storage space is available for the lender to borrow, then the PVR arranges a loan to the lender 816, and recording continues 822. In this example, if there is no space available for borrowing, then the PVR repossesses at least some of the storage space previously borrowed by other users ("borrowers") from the lender. More particularly, the PVR proceeds by finding 806 a loan record 230 representing a loan of storage space from the lender to a borrower, adding 808 the LoanAmount 236 from the loan record to the lender's FreeSpace field 206, subtracting 810 the LoanAmount 236 from the lender's LoanedSpace field, and subtracting 811 the LoanAmount 236 from the borrower's BorrowedSpace field.

In the example of FIG. 9, there remains the problem of whether the borrower gets to keep the borrower's show, the show identified in the ShowID 241 in the loan record 230, the show for which the borrower previously borrowed storage space from the lender. In the example of FIG. 9, the PVR is programmed to determine whether the borrower has sufficient free space 206 to store the show identified in the ShowID field 241 in the loan record 230. If not, the PVR deletes the borrower's show 818, deletes the loan record 230, and completes the recording 822. If the borrower does have sufficient free space to accommodate the borrower's show, the PVR subtracts 820 the loan amount from the borrower's FreeSpace 206, deletes 812 the loan record 230, and completes the recording 822.

If the LoanAmount in the loan record is less than the deficit amount, the PVR may be programmed to repeat 824 the steps of finding a loan record 806, repossessing loaned storage space (808, 810, 811), deleting a borrower's show 820 or subtracting a loan amount from borrower's FreeSpace 818, and deleting a loan record 812, until sufficient storage space has been repossessed to support completing the recording of the lender's show 822. This is an example of repossessing more than one loan amount. That is, in this example, when the lender has outstanding loan amounts to more than one borrower, or more than one loan to the same borrower, wherein returning from the borrower to the lender at least part of the loan amount includes returning at least parts of loan amounts from more than one borrower.

Compression Levels and Rechecking Storage Space Requirements

The storage space requirement 246 for a show 240 is an estimate calculated on the basis of the duration 247 of the show and the estimated compression level for the show. FIG. 3 illustrates three example data structures for compression level: One as a default compression level 308 for the entire PVR 300, another as a default compression level 261 at the user level 202, and a third as a compression level 279 for particular show 240. The default compression levels at the user level 261 and the PVR level 308 are provided so that the PVR can record a compression level 279 in a show record 240 whenever a show record is created, either by a user's scheduling a show for recording or by preference recording.

As an aid to understanding, we discuss an example of a calculation of a desired minimum compression level. As mentioned earlier, one of the formats defined for HDTV broadcasting within the United States is 1920 pixels horizontally by 1080 lines vertically, at 30 frames per second. If these numbers are all multiplied together, along with 8 bits for each of the three primary colors, the total data rate required would be approximately 1.5 gigabits per second. Because of the 6 megahertz channel bandwidth allocated for HDTV, each channel will only support a data rate of 19.2 Mb/sec, which is further reduced to 18 Mb/sec by the fact that the channel must also support audio, transport, and ancillary data information. This restriction in data rate means that the original signal must be compressed by a figure of approximately 83:1. This estimated minimum compression is for broadcast only, with commercial HDTV quality of frame rate and resolution. In addition, this estimated minimum compression is raw broadcast compression only, just enough to fit a video stream into a transmission bandwidth, not yet affected by desirable further (relative) compression needed to fit a show into a particular space requirement in the storage space of a PVR. As illustrated by the example compression level records in FIGS. 10a and 10b, discussed in more detail below, users willing to reduce video quality can achieve much higher compression levels for data storage.

As a further aid to understanding compression operations in PVRs, we present an example calculation of a compression ratio, presented in terms of a single image, which could be, for example, a static graphic image or a single video frame. The compression ratio is defined for calculation as the number of bits/pixel in the original image divided by the number of bits/pixel in the compressed image. Assume that the original image has a resolution, or rather a size, of 320×240 pixels each represented in a 24-bit data word. And assume that after initial compression the compressed file size is 5000 bytes. Then the bits/pixel for the compressed image is (5000*8)÷(320*240)=0.52 bits/pixel. In other words, the original image used need 24 bits to represent each pixel, but after compression, only need 0.52 bits are used to store each pixel (on average). The compression ratio therefore is 24÷0.52=46.

Factors that affect overall estimate compression level are shown in tables 420 and 602 in FIGS. 10a and 10b. As shown in both tables, but referenced to table 420, factors affecting compression level are shown to include encoding type 424, which we assume carries with it a particular compression algorithm; supported colorspace size 426, frame rate 428, resolution 430, and audio quality 432.

The example records in table 420 show several examples of compression level 422 estimated on the basis of the factors affecting compression. The compression levels are shown in absolute terms and then in parenthesis relative to a video source bit stream. Table 420 is organized with respect to an HDTV source having an initial resolution 430 of 1930×1080. Table 602 is organized with respect to an NTSC source having an initial resolution of 720×480.

Record 440 shows an estimated initial raw compression level 422 in the source stream of 80:1 estimated on the basis of encoding according to MPEG-2, colorspace size 4:4:4 or '48,' frame rate 428 of 30 frames/second, resolution of 1930×1080 pixels (an HDTV standard), with 'High' audio quality 432. Record 440 is shown with a relative compression of (1) with respect to itself.

The target records, records 442 through 450, illustrated compression levels supported by an exemplary PVR with respect to a video source of the kind represented in the source record 440. Record 442, for example, shows an estimated absolute compression level 422 of 480:1, or a compression level of (4) relative to the source stream, estimated on the basis of encoding according to MPEG-2, colorspace size '48,' frame rate 428 of 30 frames/second, resolution of 720×480 pixels (an NTSC video standard), with 'High' audio quality 432. In other words, recompressing the source stream using a resolution reduced from 1930×1080 (HDTV) to 720×480 (a high quality of NTSC video) reduced projected space requirement for a subject show by a factor of six. This is a useful demonstration of the fact that, although algorithmic compression alone can result in absolute compression ratios in the range of approximately 100 to 200, reductions in parameters other than compression technique as such, factors such as, for example, colorspace, frame rate, resolution, and audio quality, can result in very large overall compression levels.

Record 444 shows an estimated absolute compression level 422 of 960:1 and a relative compression of (12) with respect to the source stream, achieved by reducing the size of the colorspace 426 from 48 to 24, that is, for example, from 4:4:4 to 4:2:4. Record 446 shows an increase in relative compression to approximately (48) through an additional reduction in resolution 430. Record 448 shows an estimated relative compression level of (100) from changing encoding 424 to MPEG-1 and reducing audio quality 432. Record 450 shows an estimated relative compression level (140) estimated from an additional change in encoding 424 to MJPEG and an additional reduction in audio quality 432.

For a further example, consider table 602 in FIG. 10b. Table 602 shows a video source 604 having raw compression of 80, encoded 424 in MPEG-2, supported a colorspace size 426 of 48 (4:4:4), having a frame rate 428 of 30, a resolution 430 of 720×480, and high audio quality 432. The relative target compressions supported in a example PVR implementing table 602 include those represented by record 606, having a relative compression level of 4, achieved by reducing resolution 430; record 608, having a relative compression level of 16, achieved by a further reduction in resolution 430; record 610, having a relative compression level of 32, achieved by reducing colorspace 426; record 612, having a relative compression level of 128, achieved by changing encoding 424 and reducing audio quality 432; record 614, having a relative compression level of 256, achieved by a further change in encoding 424 and a further reduction in audio quality 432.

The examples records representing various compression levels in FIGS. 10a and 10b illustrate that compression level generally increases with decreases in colorspace size, resolution, and audio quality. Compression level also increases with decreases in frame rate. Effect on compression level of different encoding types with their associated compression algorithms depends on the particular encoding type and the kind of control provided by particular codecs implementing an encoding. For all these reasons, representations of compression level in various embodiments of the present invention typically are estimates based upon the factors discussed, and other factors as will occur to those of skill in the art. The use of a wide variety of video encodings, video compression algorithms, and factors affecting video compression levels, as will occur to those of skill in the art, are all well within the scope of the present invention.

Tables such as those shown in FIGS. 10a and 10b can be used to establish a show's storage space requirement. A show will have a raw compressed file size or space requirement determined, for a show of a given duration, on the basis of a source record such as the exemplary ones depicted at references 440 and 604. PVRs according to embodiments of the present invention can support establishment at their system levels in, for example, a PVR profile such as the one depicted at reference 300 in FIG. 3, a data element, as TargetFileSize 316, in which is stored a storage space guideline for all shows recorded on the PVR. To accommodate shows of varying length, the TargetFileSize 316 parameter can be expressed in terms of, for example, megabytes per minute, so that shows having durations of 60 minutes would have target storage requirements twice as large as 30 minute shows, and so on. Then, given an initial raw compressed file size based on source parameters (440, 604) exceeding a show's target space requirement according to TargetFileSize 316, a PVR can be programmed to scan a table such as those depicted in FIG. 10a and 10b to find a relative compression level and parameter set whose additional compress will result in an actual space requirement no greater than the target space requirement according to TargetFileSize 316.

For example, consider given a 30 minute NTSC show broadcast in MPEG-2 with a resolution of 720×480 requiring with no further compression an initial raw compressed file size of 50 megabytes, corresponding to a supported video source depicted at record 604 in table 602 on FIG. 10b. In this example, the TargetFileSize 316 indication for a 30 minute show is 15 megabytes. The PVR is programmed to scan through table 602 for a supported compression configuration resulting in a file size no greater than 15 megabytes. The PVR selects the supported compression level represented by record 606, having a relative compression level of 4 with respect to source video. The PVR orders its MPEG-2 codec to recompress the show using the parameters of compression level record 606, resulting in an actual (estimated) storage requirement of 12.5 megabytes which the PVR stores as the show's storage requirement in, for example, a SpaceRequirement data element 246 in a representative show record 240 as depicted on FIG. 3.

The tables in FIGS. 10a and 10b show two example configurations of supported compression levels in PVRs according to embodiments of the present invention. Many such configurations are possible, including at least one for each kind of source video supported by any particular embodiment of PVR. All such configurations as will occur to those of skill in the art are well within the scope of the present invention.

Shows recorded on PVRs generally are compressed, but the actual level of compression actually achieved generally is known only as an estimate. Each show's storage space requirement, therefore, is an estimate. In other words, when a PVR begins recording a show, perhaps even borrowing storage space in dependence upon a comparison of the show's storage requirement and a user's free space, the PVR cannot know for certain that the amount of space borrowed can actually support the recording. A method is needed for checking the show's storage space requirement during recording and borrowing more space if needed. In fact, we disclose two ways of administering the risk of storage space estimation, one method using a space check threshold for checking a show's storage space requirement during recording and a second method using overallocation.

Figure 11:
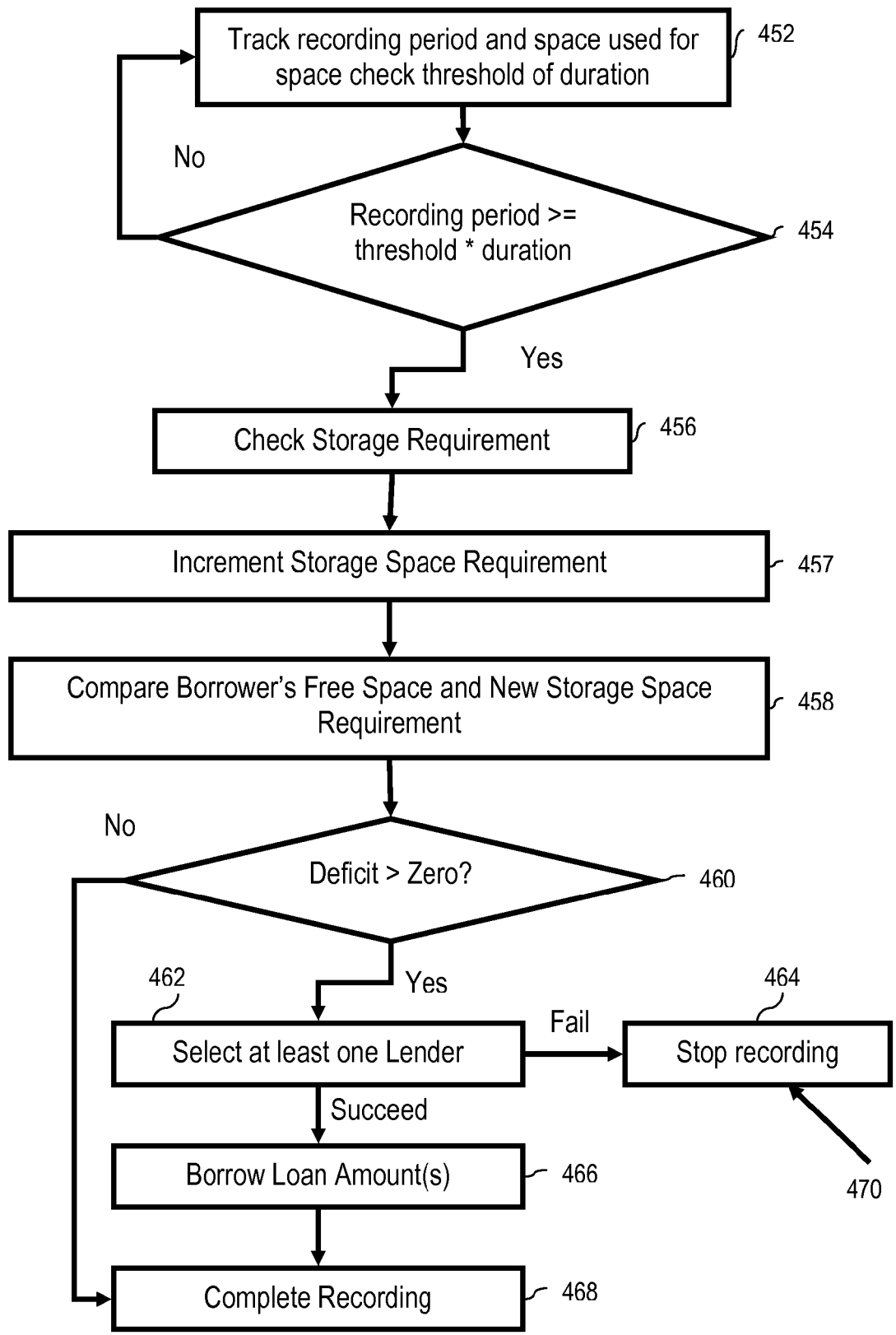
FIG. 11 is a flow chart depicting a method of personal video recording including recalculating a storage space requirement.

FIG. 11, with reference to the example data structures in FIG. 3, depicts an exemplary method of checking a storage space requirement during recording. As such, the method described with reference to FIG. 11 is an expansion of the recording step (410 on FIG. 4) described earlier. As shown in FIG. 11, the method includes tracking 452 the recording period and the actual storage space used during actual recording. The tracked recording period is a space check threshold 310 multiplied by the show's duration 247.

The space check threshold 310 is the portion of the show duration (247 in show record 240) to be recorded before recalculating the show's storage space requirement 246. The space check threshold can be implemented in data structures as shown at reference 310 in the PVR profile structure 300 in FIG. 3. A show having, for example, a duration 247 of 30 minutes in a PVR having a space check threshold of 90%, the tracked recording period for the show would be 27 minutes.

When the tracked recording period is at least equal to the space check threshold 310 multiplied by the show's duration 247, the PVR checks the estimated storage space requirement by comparing the actual storage space used with the amount of storage space projected to be used based on the estimated storage space requirement. The projected usage is the space check threshold 310 multiplied by the original estimated storage space requirement 247.

If the actual space used is greater than the projected usage, the PVR according to the method of FIG. 11 increments the show's storage space requirement 457. Incrementing the show's storage space requirement can be accomplished by adding a predetermined proportion of the original storage space requirement. A predetermined proportion can be stored as, for example the SpaceCheckAddProportion 312 in the PVR profile 300. If the original storage requirement for the show reflected in field 246 in the show record 240 were 20 megabytes, and the SpaceCheckAddProportion were 10%, then the PVR would add 2 megabytes to the show's storage space requirement 246, resulting in a new storage space requirement of 22 megabytes.

The method of FIG. 11 includes comparing the borrower's free space and the new storage space requirement to determine whether a deficit exists. This comparison is useful now because, even if the user had a deficit requiring borrowing when recording began, whether the user has a deficit now is not known. The borrower's free space can change after recording begins. If a deficit does exist 460, then the method of FIG. 11 selects a lender 462, borrows a new loan amount 466 at least as large as the current deficit, and completes the recording 468. If the PVR according to FIG. 11 is unable to find a lender, recording stops 464.

Assume that the initial bit rate for a 30 minutes show, a video download for example, is 150 kilobits/second, which would be fairly high quality video at MPEG-1. Thirty minutes is 1800 seconds, the duration of the show. 150,000 multiplied by 1800 is 270 megabits total space requirement, divided by 8 bits/byte is about 34 megabytes for the show's storage space requirement. This show is downloaded with quite a lot of compression, and the storage space requirement is definitely an estimate.

Figure 12:
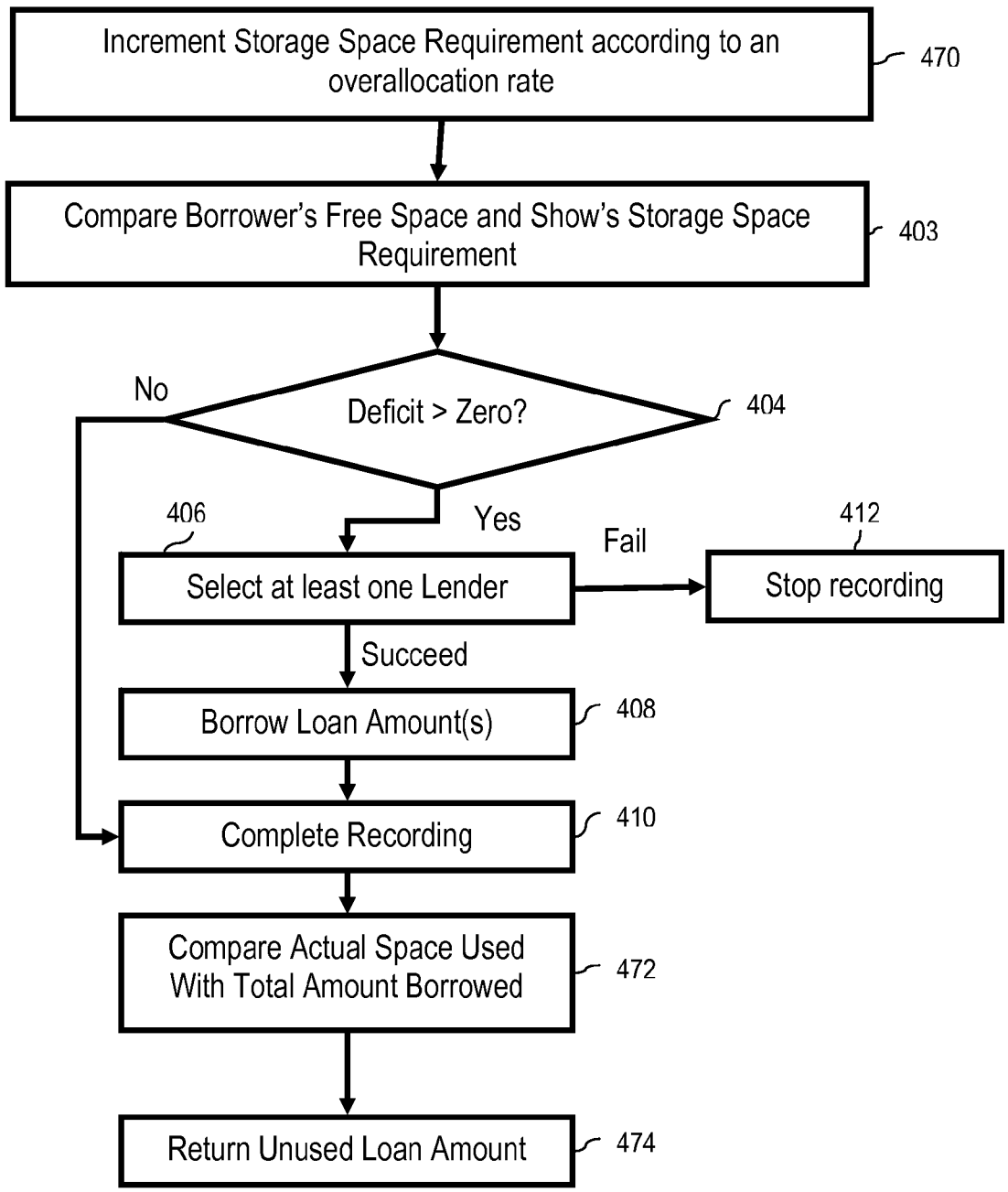
FIG. 12 is a flow chart depicting an alternative method of personal video recording including recalculating a storage space requirement.

Because we know before beginning recording that the storage space requirement is an estimate, another way of dealing with the risk of estimation is shown in the method illustrated in FIG. 12. We discuss the method of FIG. 12 in view of the example data structures of FIG. 3. The method according to FIG. 12 begins the overall recording process by incrementing the show's storage space requirement in accordance with an overallocation rate. The overallocation rate in this example is provided in the data structures of FIG. 3 at reference 314 in the PVR profile 300. If the overallocation rate 314 were 110%, for example, then according to the method of FIG. 12, the show's storage space requirement would be increased from 34 megabytes to 37.4 megabytes (34*110%).

The method of FIG. 12 continues by comparing the borrower's free space and the show's (new) storage space requirement 458, selecting a lender if a deficit exists 462, borrowing a loan amount 466, and completing the recording 468. The method of FIG. 12 proceeds after recording to compare the actual storage space used (read from an operating system's file system, for example, using the show's filename 242) and return to a lender the unused amount.

Returning the unused loan amount 474, expressed in terms of the data structures of FIG. 3, includes finding a loan record 230 bearing the ShowID 241 of the recorded show 240. The PVR according to the method of FIG. 12 subtracts the unused amount of storage space from the LoanedSpace field 210 in the lender's user profile, adds the unused amount to the FreeSpace field 206 in the lender's user profile, and subtracts the unused amount from the BorrowedSpace field 208 in the borrower's user profile.

The effectiveness of compression depends on genre. More particularly, the effectiveness of actual video compression depends on the motion of the subjects depicted in the video. Consider five frames of a close-up still life of an apple. The first frame must be encoded in its entirety, but the subsequent four frames need only refer to the first frame; they need not be encoded at all. In five frames of video tightly focused on eleven football players during a play, however, a large proportion of the pixels in the frame will change from frame to frame for each of the five frames. Five frames of football is must less effectively compressed than five frames of a fine arts show. The arts are more effectively compressed than drama. Drama is more effectively compressed than action movies. Action movies are more effectively compressed than sports events, and so on.

Figure 13:
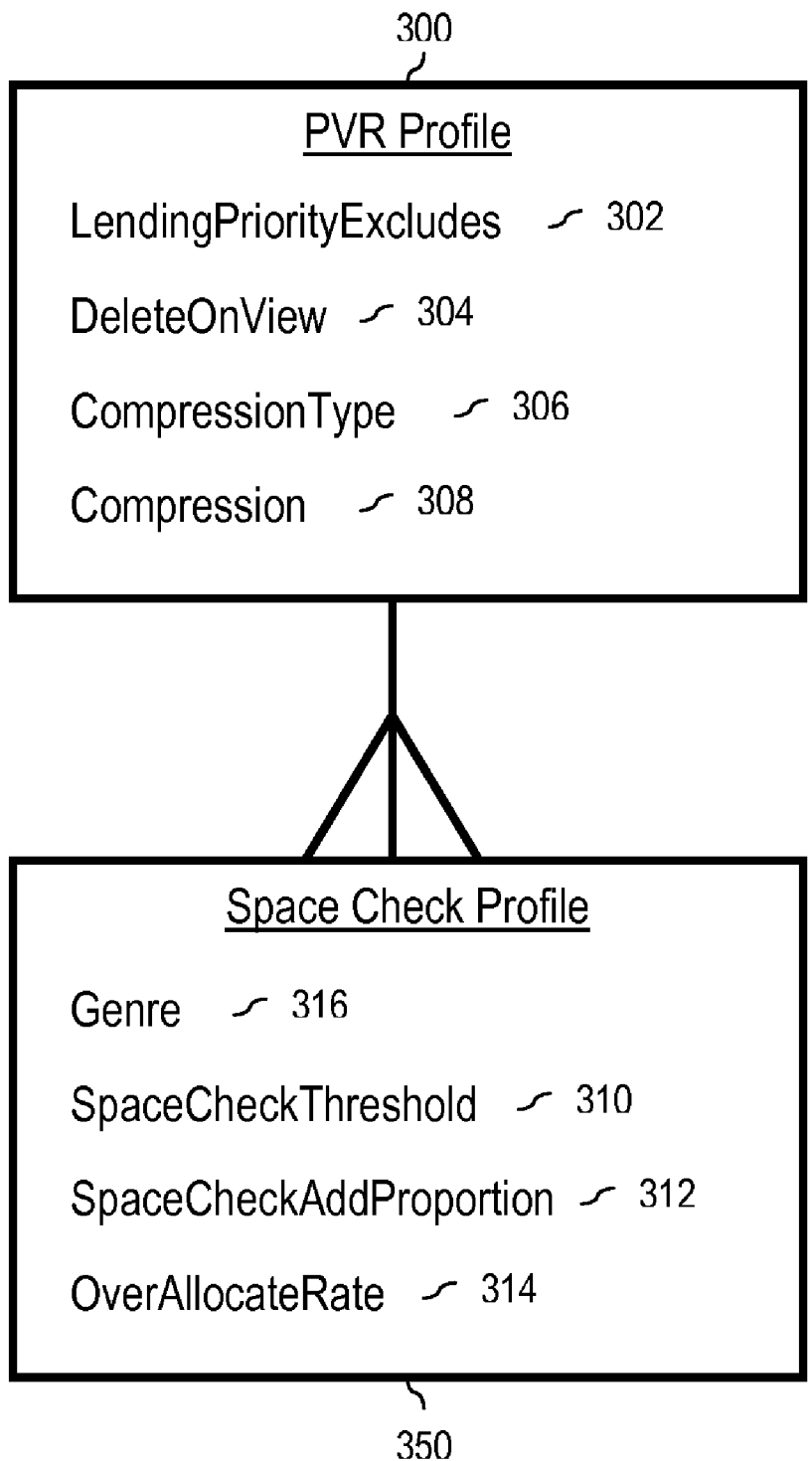
FIG. 13 depicts data structures for a PVR system-level profile and for genre-keyed space checking records related one-to-many to the PVR profile, data structures useful in various exemplary embodiments of the present invention.

The methods of FIGS. 11 and 12 are also adapted to address the problem that effectiveness of compression varies with genre. First we discuss the method of FIG. 12 in view of the example data structures in FIG. 13. FIG. 13 depicts a form of PVR profile 300, already familiar from FIG. 3, which has been amended to shift to a new space check profile 350 the space checking fields SpaceCheckThreshold 310, SpacecheckAddProportion 312, and OverallocateRate 413. The new space check profile 350 includes a genre field 316. The space check profile 350 is useful to vary, according to genre 316, the values of the space checking fields SpaceCheckThreshold 310, SpacecheckAddProportion 312, and OverallocateRate 413.

In a PVR implementing the method of FIG. 11 for checking storage space requirements during recording, the SpaceCheckAddProportion 312 can be set in a space check profile 350 to 5% for a genre 316 of 'fine arts.' The SpaceCheckAddProportion 312 can be set in another space check profile to 10% for a genre 316 of 'drama.' The SpaceCheckAddProportion 312 can be set in still another space check profile to 15% for a genre 316 of 'action.' The SpaceCheckAddProportion 312 can be set in yet another space check profile to 20% for a genre 316 of 'sports.' And so on, using different increments for various genres as will occur to those of skill in the art or as set in the discretion of users authorized to set the SpacecheckAddProportion in space check profiles.

In a PVR implementing the method of FIG. 12 for overallocating storage space at the beginning of the recording process, the proportional increment of overallocation, the OverAllocationRate 314, can be set in a space check profile 350 to 105% for a genre 316 of 'fine arts.' The OverAllocationRate 314 can be set in another space check profile to 110% for a genre 316 of 'drama.' The OverAllocationRate 314 can be set in still another space check profile to 115% for a genre 316 of 'action.' The OverAllocationRate 314 can be set in yet another space check profile to 120% for a genre 316 of 'sports.' And so on, using different OverAllocationRate values for various genres as will occur to those of skill in the art or as set in the discretion of users authorized to set the SpacecheckAddProportion in space check profiles.

Figure 14:
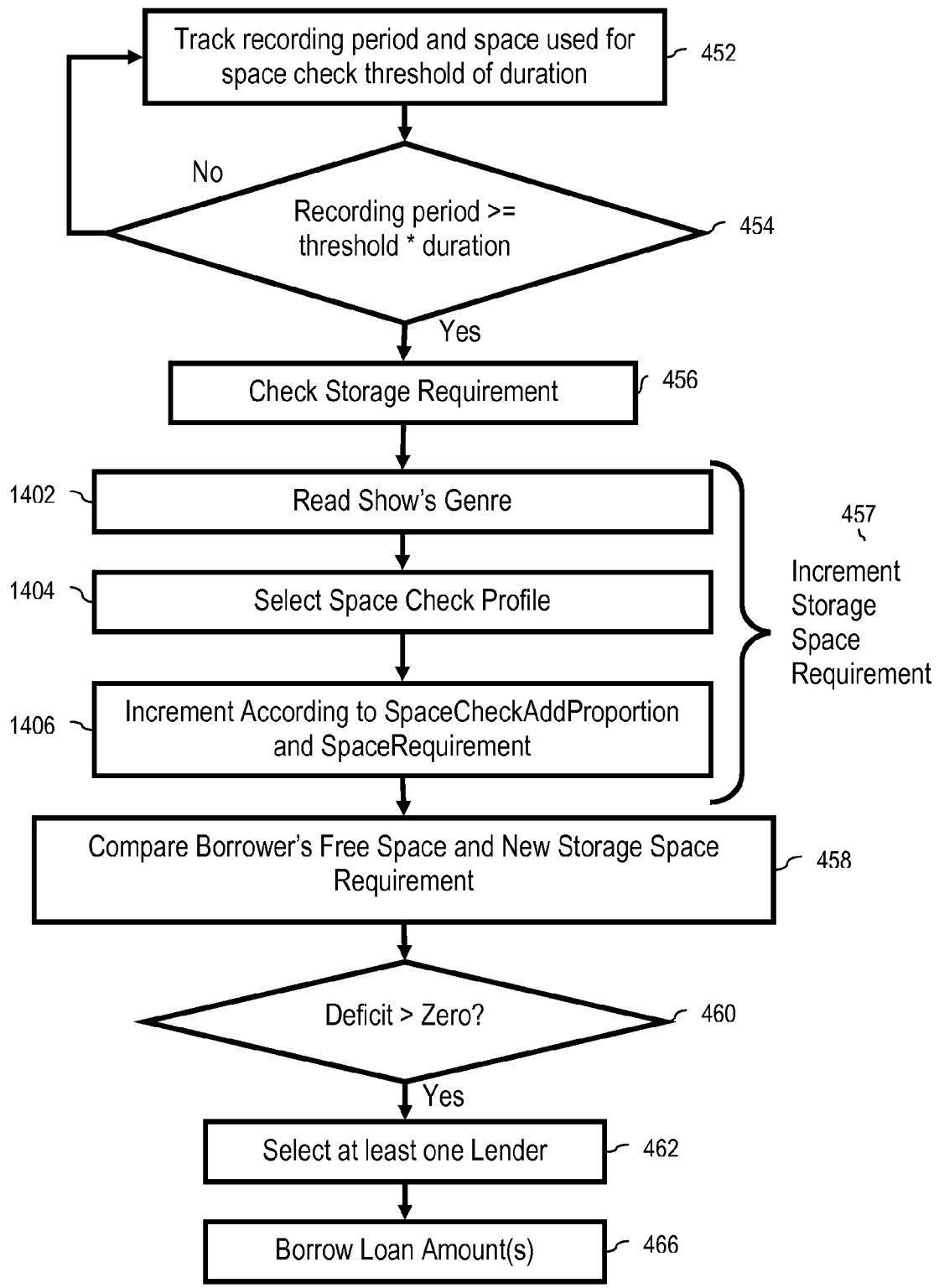
FIG. 14 is a flow chart depicting an exemplary method of incrementing storage space requirements in dependence upon genre.

With reference to FIG. 14 and in view of the data structures of FIGS. 3 and 13, we described a method of incrementing the storage space requirement in dependence upon genre. More particularly, the method of FIG. 14 is a more detailed method of incrementing the storage requirement as disclosed in connection with reference 457 of FIG. 11, a method of checking a storage space requirement during recording. The method of FIG. 14 includes reading 1402 the show's genre (243 on FIG. 3) from the show record 240, selecting 1404 a space check profile 350 in dependence upon the show's genre, and incrementing 1406 the storage space requirement by the product of the SpaceCheckAddProportion (312 on Space Check Profile 350 in FIG. 13) and the current SpaceRequirement for the show (246 in show record 240 on FIG. 3).

Figure 15:
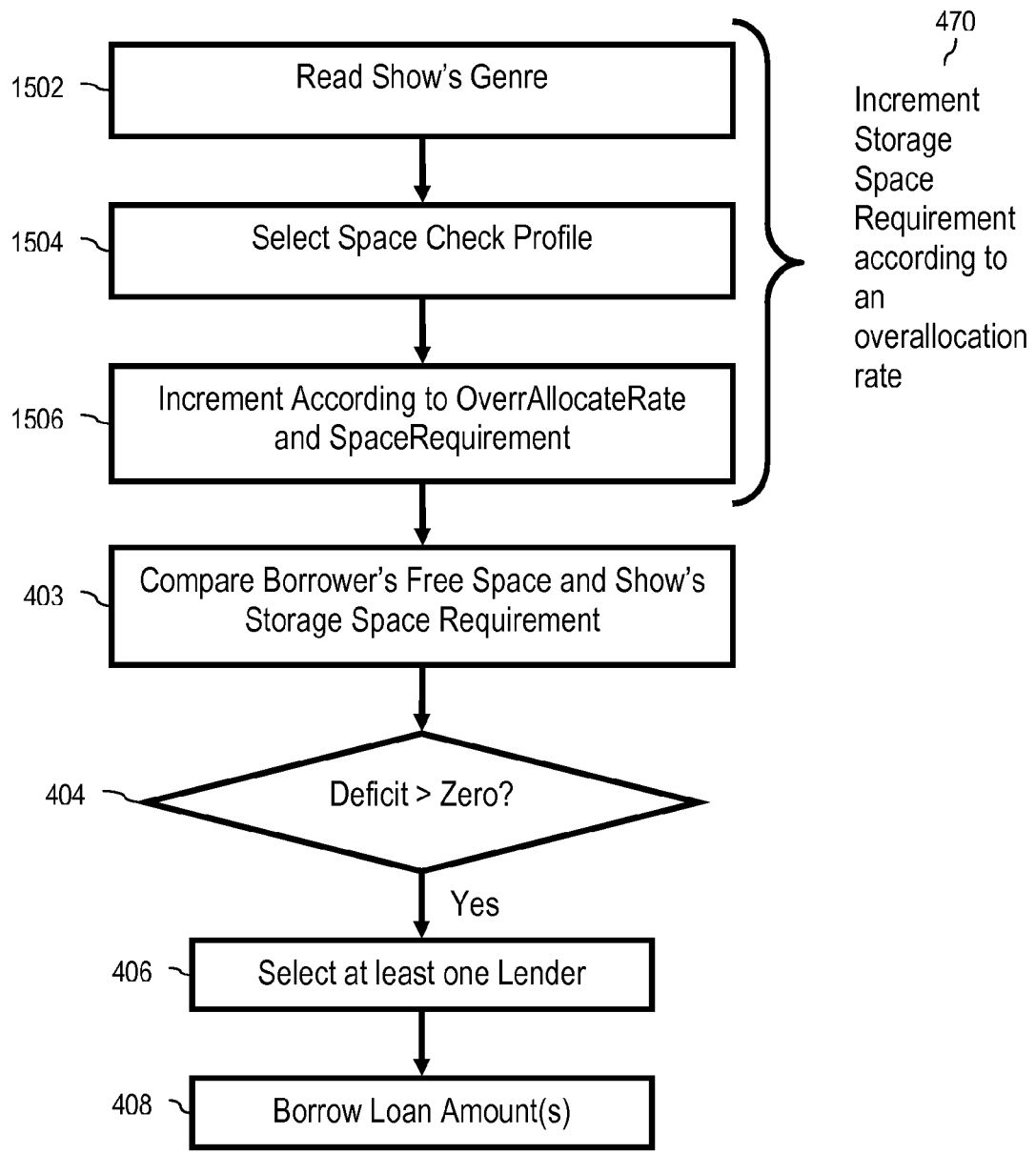
FIG. 15 is a flow chart depicting a further exemplary method of incrementing storage space requirements in dependence on genre.

With reference to FIG. 15 and in view of the data structures of FIGS. 3 and 13, we described a method of overallocating storage space at the beginning of the recording process. More particularly, the method of FIG. 15 is a more detailed method of incrementing a storage space requirement according to an overallocation rate as disclosed in connection with reference 470 of FIG. 12. The method of FIG. 15 includes reading the show's genre (243 on FIG. 3) from the show record 240, selecting a space check profile 350 in dependence upon the show's genre, and incrementing the storage space requirement to the amount of the product of the OverAllocateRate (314 on Space Check Profile 350 in FIG. 13) and the current SpaceRequirement for the show (246 in show record 240 on FIG. 3).

Pools and Groups

At this point we have disclosed at length personal video recording with loans of storage space among users. We can add power and flexibility to personal video recording, however, by supporting various ways of allowing users to aggregate their abilities to lend, borrow, and record shows. We therefore now turn our attention to pools and groups.

Figure 16:
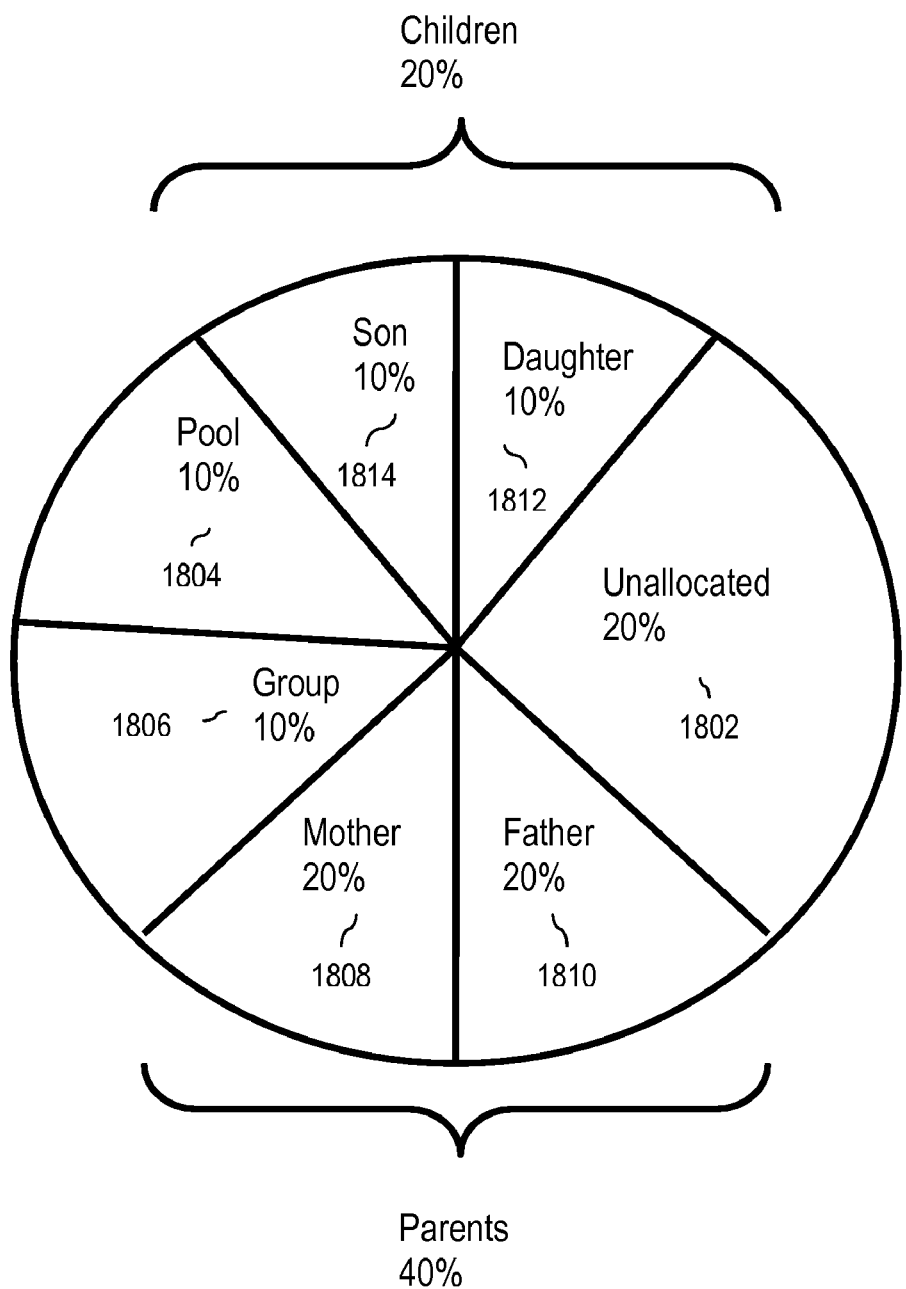
FIG. 16 is a pie chart depicting an example of unallocated storage space and storage space allocations among user's, a pool, and a group.

We begin with a reconsideration of overall structure of storage space. With reference to FIG. 2b, we described above an overall structure of storage space in which all available storage space was allocated to users. Now with reference to FIG. 16, we describe a more flexible overall structure of storage space. The exemplary structure of storage space according to FIG. 16 depicts, at reference 1802, 20% of the overall storage space as unallocated to anyone; at reference 1810, 20% allocated to Father; at reference 1808, 20% to Mother, at reference 1806, 10% to a group, at reference 1804, 10% to a pool; at reference 1814, 10% to Son; and at reference 1812, 10% to Daughter. In the following discussion we describe in some detail how this new overall structure of storage space adds flexibility to personal video recording.

Pools

A pool is an aggregation of storage space for lending. Pools are assigned their own storage space. Pools lend their storage space to borrowers. Although there is nothing within the scope of the present invention that excludes pools from lending, in this disclosure, our examples of aggregations for borrowing are the 'groups' described below. In our examples of pooling, to reduce the risk of confusion and augment clarity of explanation and understanding, we describe examples of pools that do not borrow.

Pools acquire their storage space by assignments of storage space from unassigned storage space or through allocations from users' free space. Pools are generally authorized to lend their storage space to users or to groups. An example of an authorization to lend is creations of a lending authorization record.

Figure 20:
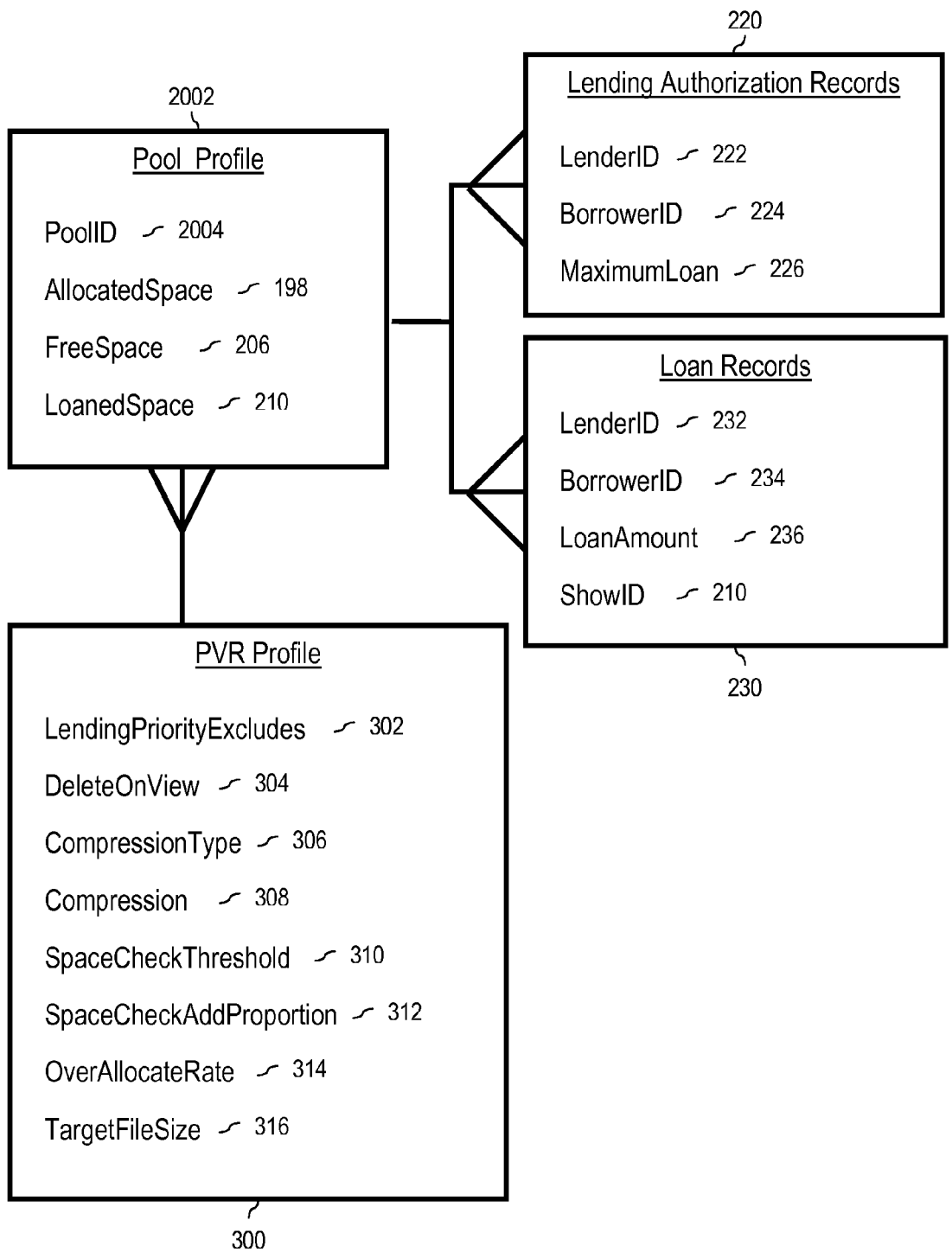
FIG. 20 depicts exemplary data structures useful in various embodiments utilizing pools.

More particularly, FIG. 20 depicts example data structures useful for implementation of pools. The data structures for lending authorization records 220, loan records 230, and the PVR profile 300 are similar to those of FIG. 3. PVRs according to this kind of embodiments contain at least one pool profile 2002, each pool profile representing a pool. The pool profile 2002 comprises the data elements PoolID 2004, a pool identification field; AllocatedSpace 198 in which is stored the amount of storage space currently allocated to the pool; FreeSpace 206 in which is stored the portion of the pool's allocated space available for recording or lending; and LoanedSpace 210 in which is stored the amount of space currently on loan from the pool to users or groups.

Loans of storage space from a pool are authorized in lending authorization records such as those depicted at reference 220. The lending authorization records comprise the data elements LenderID 222. In the case of loan authorizations from pools, the LenderID field stores a pool ID. Fields of the lending authorization records also include a BorrowerID 224, which stores a user ID or a group ID of a user or group authorized to borrow from the pool. The BorrowerID field 224 can also store a wild card value such as a '*,' indicating authorization to lend from the pool to any user or group. Fields of the lending authorization records also include a MaximumLoan field 226 in which is stored the maximum amount of storage space authorized by the lending authorization record for lending from the pool to a borrower.

Figure 17:
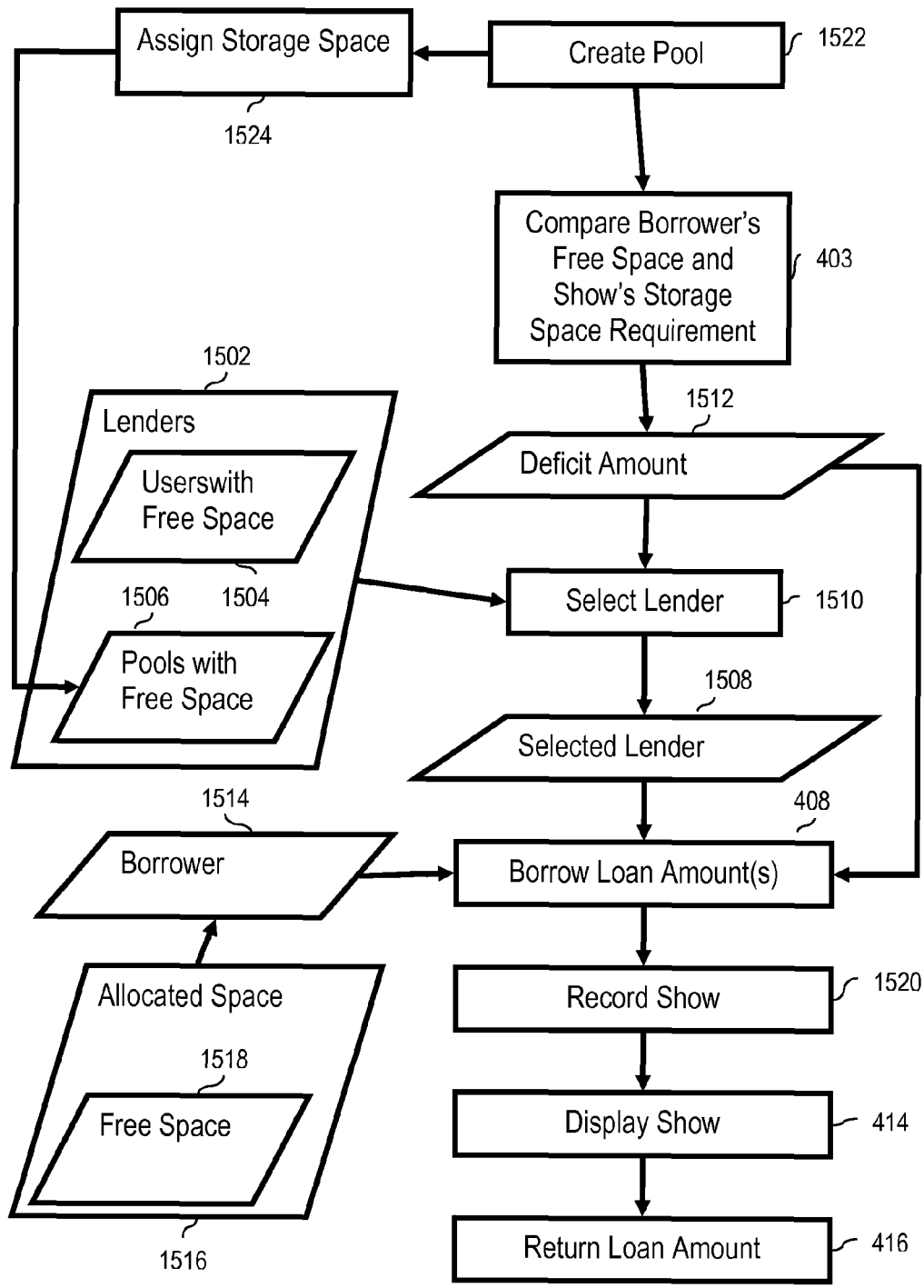
FIG. 17 is a flow chart depicting an exemplary method of personal video recording including borrowing storage space wherein at least one lender is a pool.

FIG. 17 sets forth a flow chart depicting a method for automated personal video recording with pools in which the method includes selecting 1510 a lender from among one or more lenders 1502. The lenders comprise at least one user 1504 having free storage space and at least one pool 1506 having free storage space. Selecting a lender in the method of FIG. 17 is carried out in dependence upon a deficit amount 1512. The deficit amount is the amount by which a show's storage space requirement exceeds a borrower's free space. The borrower is the user or group on whose behalf a show is to be recorded.

The selecting is carried out in dependence upon the deficit amount 1512. That is, for example, a lender is selected who has authorized lending of at least the deficit amount and who has free space at least equal to the deficit amount. Alternatively, if no single lender has sufficient free space and sufficient lending authorized, several lenders may be selected, until the lenders' aggregate free space and maximum loan amount authorizing lending to the borrower are at least equal to the deficit amount.

The method according to FIG. 17 includes borrowing 408, in dependence upon the deficit amount 1512, from the selected lender 1508 for a borrower 1514, at least one loan amount of storage space, the borrower 1514 having allocated storage space 1516 on the PVR optionally including free space 1518. The borrowing is carried out in dependence upon the deficit amount in that at least the deficit amount needs to be borrowed. The loan amount may be for more than the deficit amount. The PVR can be programmed to build up the loan amount from several loan amounts each of which is less than the deficit amount but the sum of which is at least the deficit amount. When the loan, or loans, is settled 408, a PVR programmed according to FIG. 17 proceeds to record 1520 a show for the borrower. In this example, the show has a storage space requirement (as reference 246 on FIG. 3) exceeding the borrower's free space (reference 206) by the deficit amount 1512.

In the method according to FIG. 17, the selected lender 1508 can be a pool 1506. In the method according to FIG. 17, the borrower can be a user. As discussed in more detail below, the borrower also can be a group. The method of FIG. 17, as described in more detail below, can include creating 1522 a pool, including assigning 1524 storage space to the pool.

Figure 18:
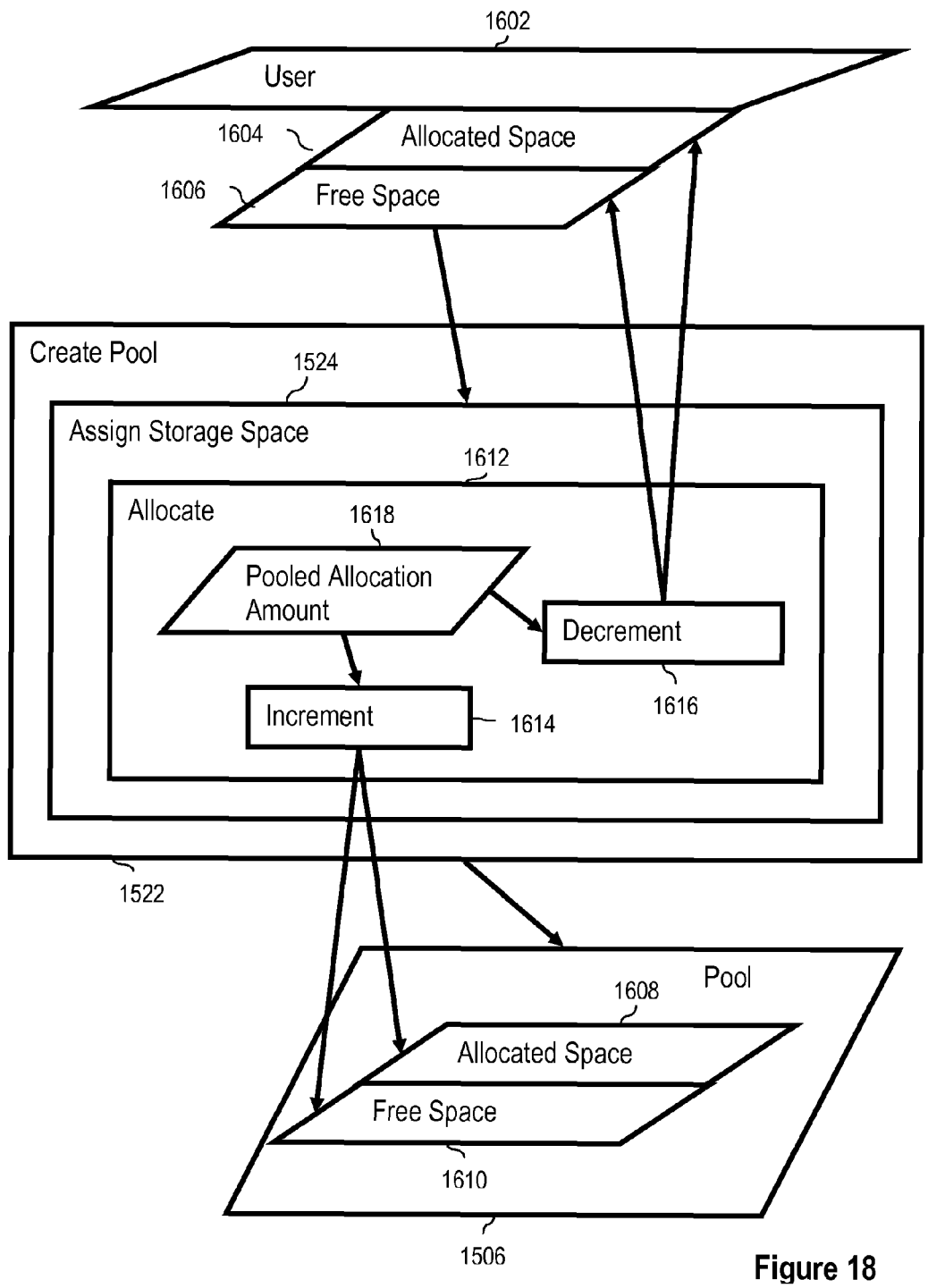
FIG. 18 is a flow chart depicting an exemplary method of assigning storage space to a pool.

More particularly, FIG. 18 sets forth a flow chart depicting an exemplary method of assigning storage space to a pool. In the method of FIG. 18, assigning 1524 storage space to the pool 1506 comprises allocating 1612 storage space from at least one user 1604 to the pool 1506. It is useful for the user to have free space 1606 available for allocation to the pool. In the method of FIG. 18, allocating storage space 1612 to the pool 1506 includes decrementing 1616, by a pooled allocation amount 1618, the user's storage space allocation 1604 and the user's free space 1606. The method of FIG. 18 also includes incrementing 1614, by the pooled allocation amount 1618, the pool's free space 1610 and the pool's allocated space 1608.

Figure 19:
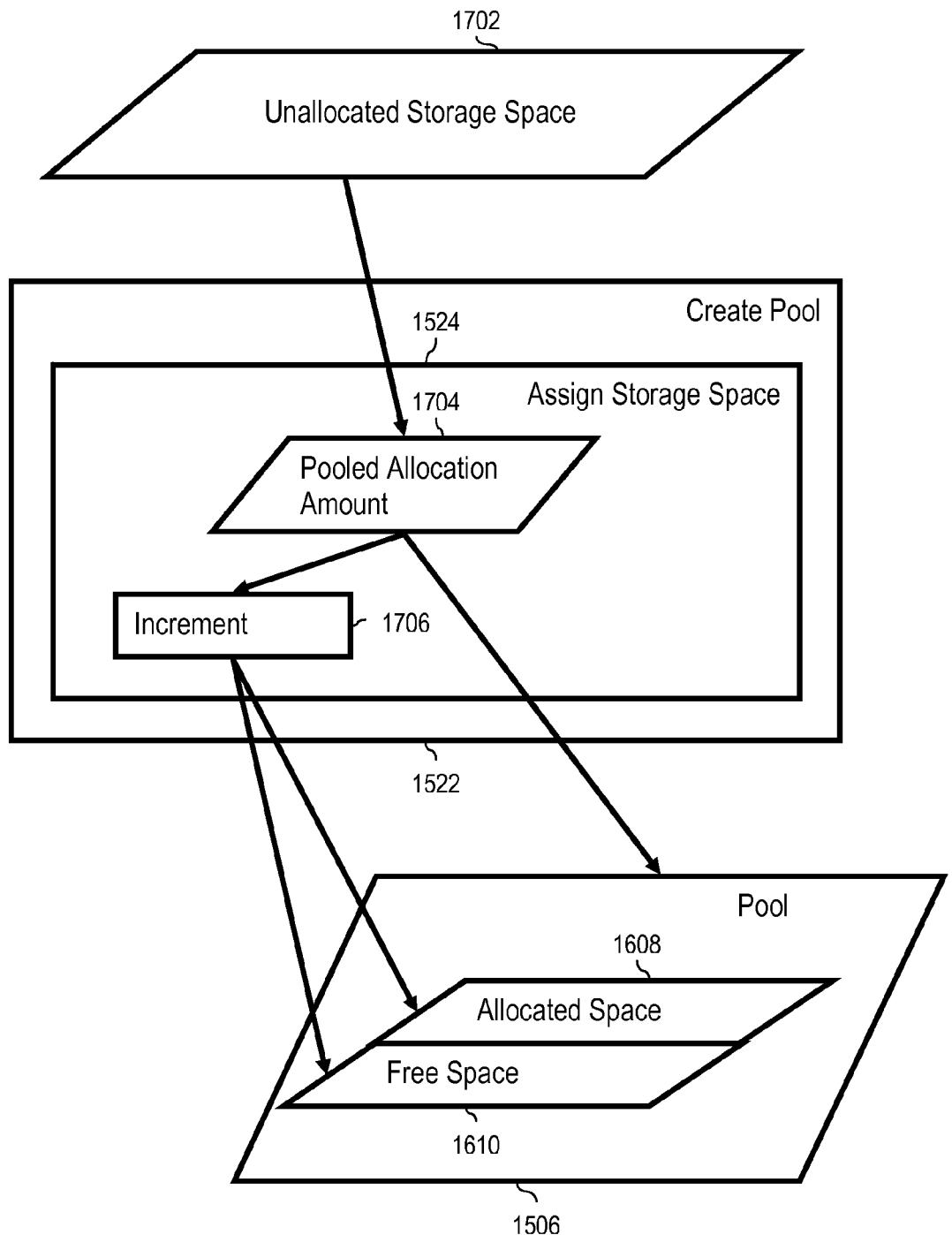
FIG. 19 is a flow chart depicting an additional exemplary method of assigning storage space to a pool.

FIG. 19 sets forth a flow chart depicting an alternative exemplary method of assigning storage space 1524 to a pool 1506. The method of claim 19 includes assigning a pooled allocation amount 1704 of storage space directly from unallocated storage space 1702 to the pool 1506. In the method of claim 19, assigning 1524 a pooled allocation amount to the pool includes incrementing 1706, by the pooled allocation amount 1704, the pool's free space 1610 and the pool's allocated space 1608.

Now with respect to the overall storage space structures illustrated in FIGS. 2b and 16, consider the increased flexibility afforded by the use of pools. In the overall structure according to FIG. 16, for example, parents (1808, 1810) can treat the pool 1804 as a repository of borrowing overhead for the children (1814, 1812). By issuing lending authorization records authorizing lending from the pool to the children, with no lending authorization records authorizing lending directly from the parents to the children, the parents empower the children with available storage space beyond that allocated specifically to the children, and, at the same time, reserve for the parents' exclusive use of their own core allocations (1808, 1810).

Groups

Groups are aggregations of recording power. That is, groups aggregate free space and borrowing power in support of recording rather than lending. Although it is not a limitation of the present invention, in our exemplary aggregations, it is groups rather than pools that are authorized to borrow storage space. It is pools rather than groups, in our examples, that lend storage space. Groups comprise members, and groups, at least implicitly and as described in more detail below, apportion storage space among their members.

Group space, that is, storage space assigned to a group, can be allocated or borrowed. Group space can be allocated from users' free space or from unallocated space. Group space can be borrowed from any lender issuing a lending authorization record in favor of a group, that is, from users or pools.

Figure 21A:
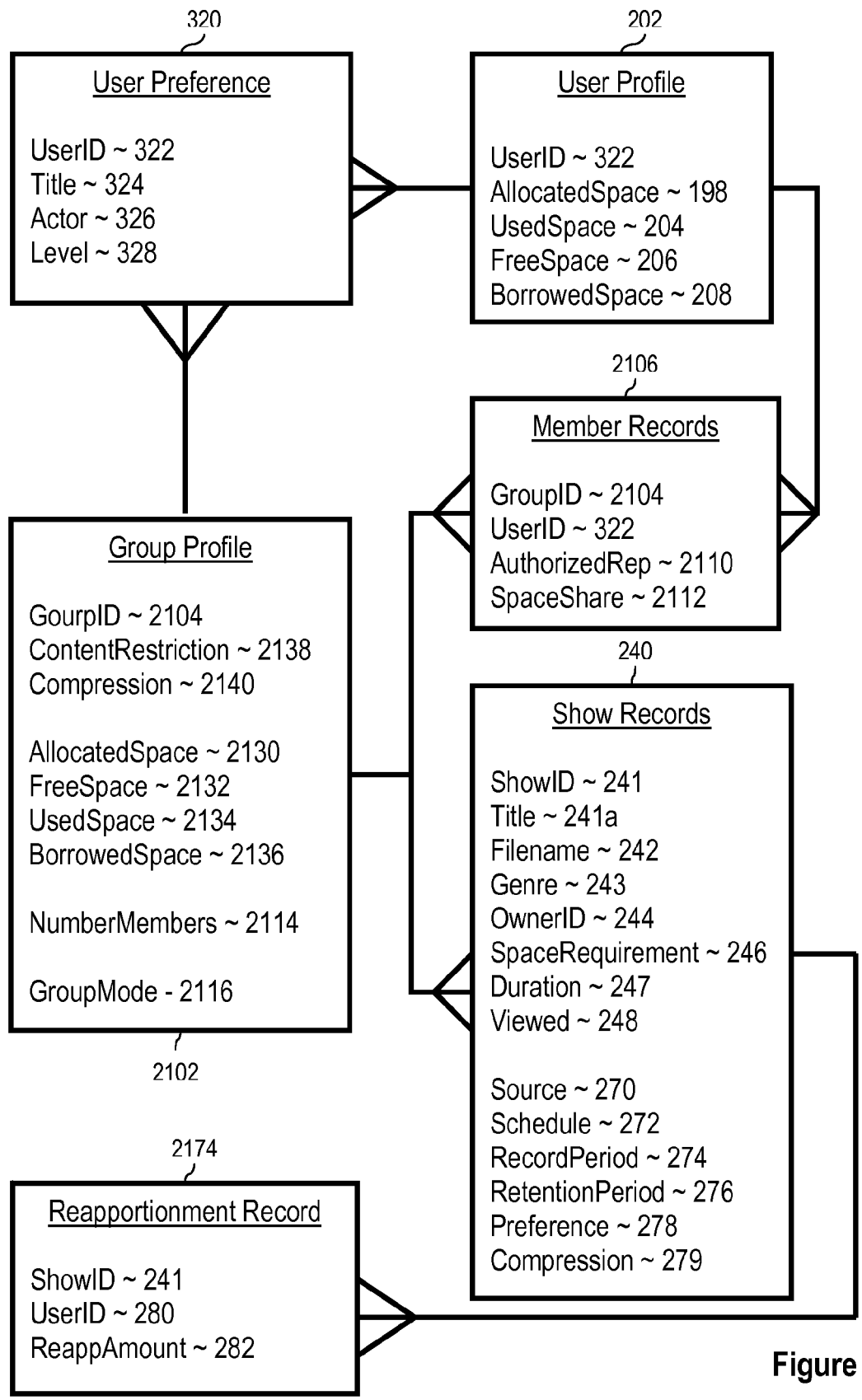
FIG. 21a depicts exemplary data structures useful in various embodiments utilizing groups.

FIG. 21*a* depicts example data structures useful for representing groups in PVRs according to various embodiments of the present invention. A group profile 2102 represents a group. Group profiles typically have a group identification field such as GroupID 2104. The group profile 2102 also provides data elements for allocated space 2130, free space 2132, used space 2134, borrowed space 2136, content restrictions 2138 on recordable content allowed for the group, and a default compression level 2140 at the group level 2102.

The exemplary data structures of FIG. 21*a* provide a member record 2106 representing each member of a group. A member of a group is a user having a member record identifying the user as a member of a group. The member records 2106 contain a group ID field 2104 as a foreign key linking each member record to a group in a one-to-many relationship.

The member records 2106 contain a user ID field 322 identifying a user as a member of the group identified in the GroupID field 2104. The user ID field 322 is a foreign key linking the member records one-to-many to user profiles 202. In the exemplary data structures of FIG. 21*a*, therefore, member records implement a many-to-many relationship between groups 2102 and users 202. That is, each group can have many users as members, and each user can be a member of many groups.

Groups can have stated preferences. More particularly, groups, through their authorized representatives, can create expressions of preference in the form, for example, of user preference records 320. For groups' expressions of preference, the UserID field 322 in a preference record 320 stores a group ID, acting as a foreign key, linking user preference records 320 one-to-many to groups. That is, each group can assert many preferences. PVRs according to embodiments of this kind are programmed to carry out preference recording for groups in the same way that preference recording is done for individual users.

Groups' authorized representatives can schedule recordings of shows for groups in the same way that shows are scheduled for users, for example, by creation of a show record effected through a user interface. More particularly, a show 240 scheduled to be recorded on behalf of a group 2102 has stored in its OwnerID field 244 the group ID of the group on whose behalf the show is scheduled to be recorded. In such embodiments, that group is considered the owner of such a show.

As for borrowing, any lending authorization record (220 on FIGS. 3 and 20) issued by any lender can store in its BorrowID field 224 a group ID, effectively authorizing lending to a group. Groups are authorized to borrow by use of a '*' wild card such as a '*' in the BorrowerID field 224 when the wild card represents authority to lend to any borrower, including groups. Lenders identified in the LenderID field 222 of a lending authorization record 220 can be any lender, including, for example, users and pools.

Borrowing for groups can be further explained with reference to the exemplary method of personal video recording depicted in FIG. 17. The method of FIG. 17 includes borrowing 408 from a lender 1502 a loan amount on behalf of a borrower 1514. The lender 1502 can be any authorized lender including, for example, individual users and pools. And the borrower 1514 can be any authorized borrower including, for example, groups as well as individual users. In the context of our example data structures, an authorized borrower can be a group whose group ID appears in the BorrowerID field 224 of a lending authorization record 220.

Loans from pools to groups are optional. That is, there is no requirement within the present invention for pools to loan to groups, and it is entirely within the scope of the present invention for a PVR's programming to effect loans to groups only from individual users.

PVRs can be programmed to accept scheduling entries for shows or expressions of group preferences from all group members or less than all. The example data structure for member records 2106 includes a Boolean field AuthorizedRep 2110 in which is stored an indication whether the member represented by the member record 2106 is authorized to schedule shows and assert preferences on behalf of the group.

Figure 22:
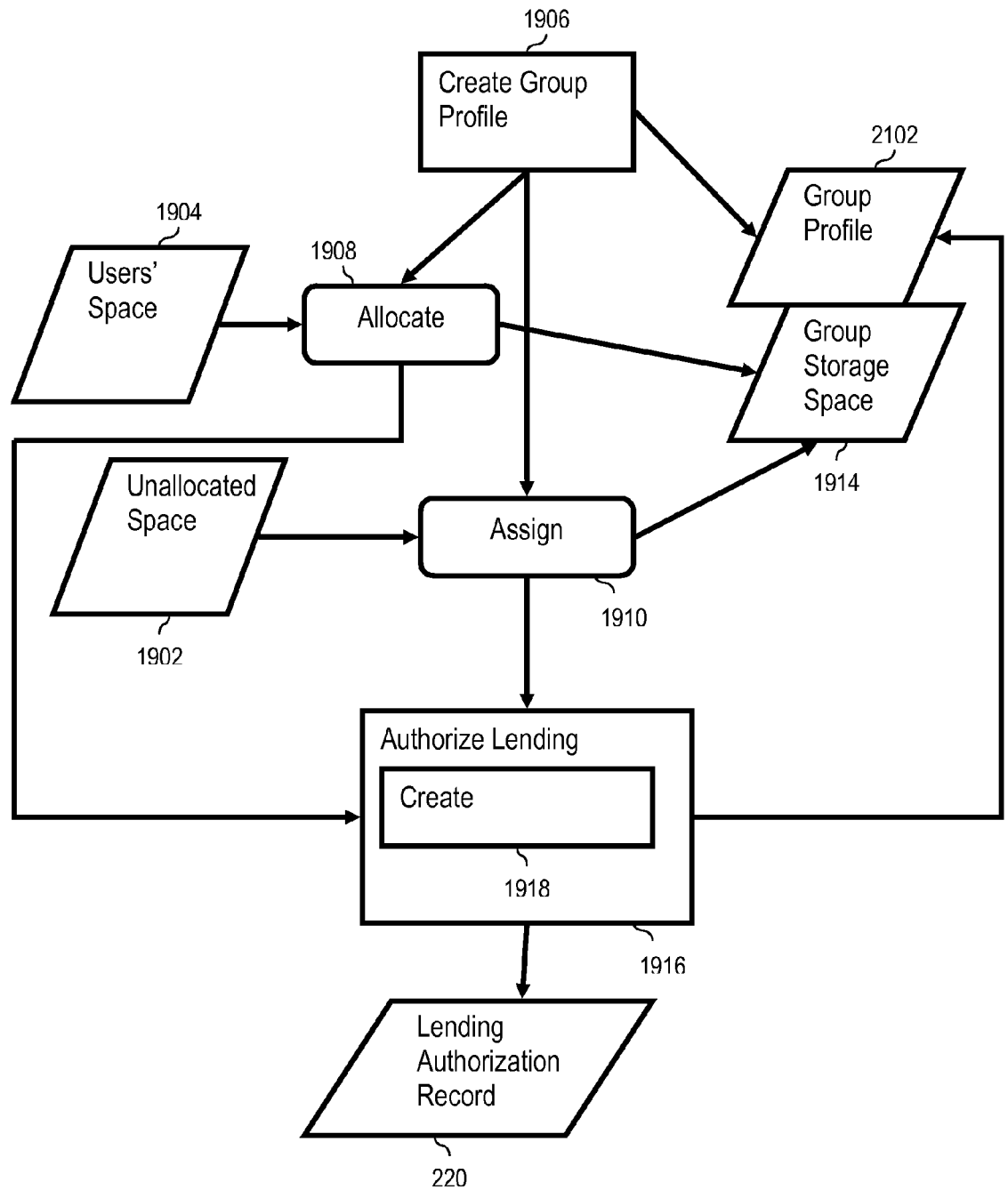
FIG. 22 is a flow chart depicting an exemplary method of creating a group, including the alternatives of allocating group storage space from users' space and assigning group storage space from unallocated space.

FIG. 22 sets forth a flow chart depicting an exemplary method of creating a group. The method of FIG. 22 includes including creating 1906 a group profile 2102 and assigning group storage space 1914 to the group. In addition, FIG. 22 depicts two alternative methods of assigning group storage space. More particularly, the method of FIG. 22 includes allocating 1908 to the group 2102 users' storage space 1904 as group storage space 1914. The method of FIG. 22 also includes the alternative of assigning 1910 group storage space 1914 to the group 2102 directly from unallocated storage space 1902.

To the extent that group allocation comes from members' free space 1904, members' allocated space (as reference 198 on FIG. 21*a*) and members' free space (206 on FIG. 21*a*) is reduced by the amount of storage space allocated from users' free space to group storage space. There is no requirement that members contribute equally to allocations from members' free space to group storage space. There no requirement that all (or any) users contributing free space to a group must be members of the group. Contributors, users and/or members can determine proportions of allocation from users' free space when the group is created (or can amend later through user interface screens).

It is an advantage of the use of groups to record shows that the use of individual user's free space is leveraged. An example of such leveraging is a show having a storage space requirement of 50 megabytes recorded for a group having three members each of whom contributed 20 megabytes of user free space to the group's storage space, that is, equal contributions from each user. In this example, each user's free space is implicitly used at the level of 16.67 megabytes in return for which each user is empowered to record and view a 50 megabyte show.

It is also an advantage that group ownership in shows implicitly apportions ownership among members according to their relative contributions to a group storage space. Consider an example in which three users group to record comedy shows knowing in advance that users 1 and 2 have less interest in comedy that user 3. The users contribute their free space to group storage space in the proportion 1/1/2, that is, 10 megabytes from user 1, 10 megabytes from user 2, and 20 megabytes from user 3. In using 10 megabytes to record a show, therefore, the three users implicitly use their storage space respectively at the levels of 2.5 megabytes, 2.5 megabytes, and 5 megabytes. This is an explicit use of group storage space that implicitly apportions the space requirement according to predetermined weighted coefficients, set by the users themselves, rather than equally among all three members of the group.

Apportionment

In all our example thus far regarding groups, it is a group as a whole that records and deletes each show, and, despite the implicit apportionment of storage space, it is nevertheless the group as a whole who benefits from or suffers from the use of the show's entire space requirement at all times. It would be advantageous to have more flexibility than that. It would be advantageous to be able to allow users to aggregate their storage space in groups and then opt out user by user, with flexibility granted to each user when to opt out, rather than requiring the entire group to wait until they all recoup a show's used space at the same time. It would be useful to be able to explicitly apportion ownership, and loan amounts also, among members of a group.

Apportionment of Storage Space

We now describe an additional class of embodiments of PVRs according to the present invention, embodiments for recording shows for groups in which a show's storage space requirement is charged to group members rather than to a group as such. In such embodiments, with reference to the example data structures in FIG. 21a, to the extent that the data elements for charging space requirements to groups, the fields for space allocation 2130, free space 2132, used space 2134, and borrowed space 2136, are present in group profiles 2102, such fields are not utilized. Indeed, in some PVRs according to this class of embodiments, such fields may be entirely excluded from group profiles 2102.

In other embodiments, two modes of operation are supported, one for charging space requirements to a group as such, another mode for charging space requirements to group members. In the first mode, the fields for charging space requirements to groups are utilized; in the second mode they are ignored. PVRs according to such embodiments can switch between the two modes of operation using a mode switch implemented, for example, in a Boolean field established for that purpose, such as, for example, the field GroupMode 2116 in the example group profile 2102 on FIG. 21a. We described the first mode of operation in detail above. In the description which follows, we focus on the second mode, charging space requirements to members.

Figure 23:
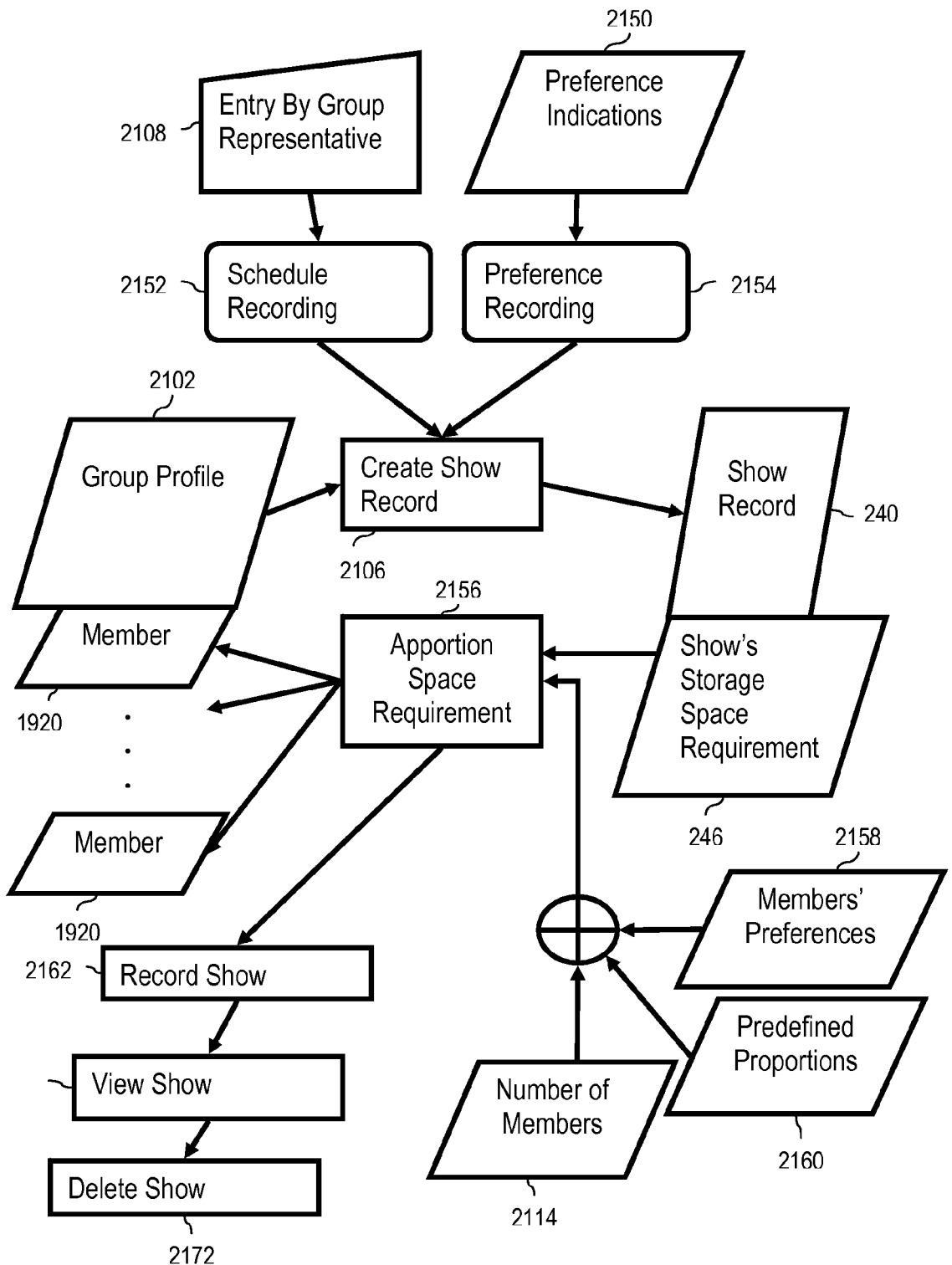
FIG. 23 is a flow chart depicting alternative exemplary methods of allocating a show's storage space requirements among group members.

With reference to FIG. 23, and with reference to the example data structures of FIG. 21a, we described a method of personal video recording of shows for groups that apportions 2156 storage space requirements 246 to group members 1920. The method of FIG. 23 includes creating 2106 show records 240 in two circumstances. The method includes creating show records when shows are scheduled for recording 2152 through data entry by an authorized representative of a group 2108.

The method includes also creating show records when shows are identified for preference recording 2154 on the basis of indications of member preference 2150. Members are users, and users, as described in detail above, are supported by PVRs of the present invention in data entry of indications of user preference, including, for example, entry into user preference records 320 users' indications of preferred show titles 324 and preferred actors 326, as well as users' indications of the relative intensity with which such preferences are asserted, as, for example, in the preference level field at reference 328.

A show 240 to be recorded on behalf of a group 2102 has stored in its OwnerID field 244 the group ID of the group on whose behalf the show is to be recorded. In such embodiments, that group, rather than any individual user, is considered the owner of such a show.

FIG. 23 sets forth a flow chart depicting a method of automated personal video recording that includes recording 2162 for a group 2102 comprising a number of members 1920, a show 240 having a storage space requirement 246, wherein each of the members has allocated storage space 198 on a PVR optionally including free space 206. The method of FIG. 23 includes apportioning 2156 the show's storage space requirement 246, including apportioning to each member 1920 an apportioned amount of the show's storage space requirement. Three exemplary alternative ways of apportioning space requirements are disclosed.

In the method of FIG. 23, apportioning 2156 the show's storage space requirement 246 alternatively includes apportioning according to the number of members 2114. In PVRs according to this kind of embodiment, the number of members is typically recorded on a group profile 2102, in, for example, a field such as NumberMembers 2114. Apportioning a show's storage space requirement then includes dividing the show's space requirement by the number of members, thereby determining an apportioned amount of the show's storage space requirement to be charged to each member. Apportioning the show's storage space requirement then includes incrementing each member's UsedSpace 204 by the apportioned amount and decrementing each member's FreeSpace 206 by the apportioned amount.

In the method of FIG. 23, apportioning 2156 the show's storage space requirement 246 alternatively includes apportioning according to predefined proportions 2160. In PVRs according to this kind of embodiment, predefined proportions are established in fields such as the SpaceShare field 2112 in member records 2106. Predefined proportions can be percentages adding up to one hundred percent, so that, for example, in a group having four members, the predefined proportions can be, for example, 10%, 10%, 40%, and 40%. Apportioning a show's storage space requirement in such embodiments then includes multiplying the show's storage space requirement by each predefined proportion, thereby determining a separate apportioned amount for each member. Apportioning the show's storage space requirement in such embodiments then includes, for each member, incrementing a member's UsedSpace 204 by the apportioned amount for that member and decrementing a member's FreeSpace 206 by the apportioned amount for that member.

In the method of FIG. 23, apportioning 2156 the show's storage space requirement 246 alternatively includes apportioning according to members' preferences 2158.

Members indicate preferences in, for example, user preference records 320, including indications of levels of relative intensity 328. Apportioning a show's storage space requirement in such embodiments then includes establishing, as percentages, for example, a weighted coefficient of preference for each member. Apportioning a show's storage space requirement in such embodiments then includes multiplying the show's storage space requirement by each weighted coefficient, thereby determining a separate apportioned amount for each member. Apportioning the show's storage space requirement in such embodiments then includes, for each member, incrementing a member's UsedSpace 204 by the apportioned amount for that member and decrementing a member's FreeSpace 206 by the apportioned amount for that member.

Further with regard to weighted coefficients of preference, we present this example for further explanation. In user preference records 320 for the show title "Dukes of Hazzard," Mom asserts a preference level of '3,' Dad asserts a preference level of '2,' Son asserts a preference level of '1,' and Daughter asserts no preference for "Dukes of Hazzard." The weighted coefficients of preference for the member respectively are 3/6, 2/6, 1/6, and 0/6, or, in terms of percentages, 50%, 33.33%, 16.67%, and 0%. The show's storage space requirement for an episode of "Dukes of Hazard" is 10 megabytes. The apportioned amount for each member respectively then is 5 megabytes, 3.3 megabytes, 1.67 megabytes, and 0 megabytes. In this example, the members' UsedSpace 204 is incremented and FreeSpace 206 is decremented in each member's user profile 202 respectively by 5 megabytes for Mom, 3.3 megabytes for Dad, 1.67 megabytes for Son, and 0 megabytes for Daughter. In this example, Daughter gets a free ride, which is reasonable in light of the fact that she expressed no preference for the show.

Members' Opting Out of Group-Related Allocations of Storage Space

Despite their prior agreement to join a group, it is possible that members may wish to recoup their free space allocated to group storage of a show by opting out of the group's joint ownership of a show. A member may wish to opt out and therefore recoup storage for other uses, for example, when the member has viewed a show. A member may wish to opt out upon discovering that the group has recorded, and therefore apportioned part of a show's storage requirement to the member, a show in which the member has little interest. Remember the example just above in which the Son expressed a preference level of '1' for "Dukes of Hazzard." Upon learning that his group has recorded an episode of "Dukes of Hazzard," the Son might very well believe this his storage space might be better utilized elsewhere.

In our teachings thus far regarding personal video recording, there is no very easy way for a member to opt out of group ownership of a show. Consider, for example, the case of storage space apportionment according to the number of members in a group. We disclosed storing the group size in the NumberMembers field 2114 in a group profile 2102, shown on FIG. 21a. If the one member opts out, however, the effective group size is reduced by one. Presumably we could then define a field called for example 'EffectiveGroupSize' in which a PVR could store the number of members who have not opted out, but then there would be no easy way to know which members remain. What is needed is something with more flexibility.

FIG. 21a depicts an example data structure for reapportionment records 2174, each of which identifies a reapportionment of a show's storage space requirement to a particular member of a group. Such reapportionment records represent apportionments of responsibility for a show's space requirement among the members of a group who have not opted out of ownership responsibility for a particular show. Using reapportionment records 2174, a PVR is programmed to create, when a user opts out of group ownership, one reapportionment record for each remaining member, thereby providing an exact record both of how many members remain as well as exactly which members remain.

The exemplary reapportionment record 2174 of FIG. 21a provides a ShowID field 241 which functions as a foreign key relating the reapportionment record to a show record 240. The show record 240 identifies a group as the owner of the show by storing a group ID in its OwnerID field 244. The SpaceRequirement field 246 in the show record 240 stores the total space requirement of the show.

The exemplary reapportionment record 2174 provides a UserID field 280 storing a user ID of one of the member to whom the show's storage space requirement is to be reapportioned. The exemplary reapportionment record 2174 also provides a reapportionment amount field 282 storing the portion of the show's space requirement to be reapportioned to the member identified in the UserID field 280 of the reapportionment record 2174.

Figure 24:
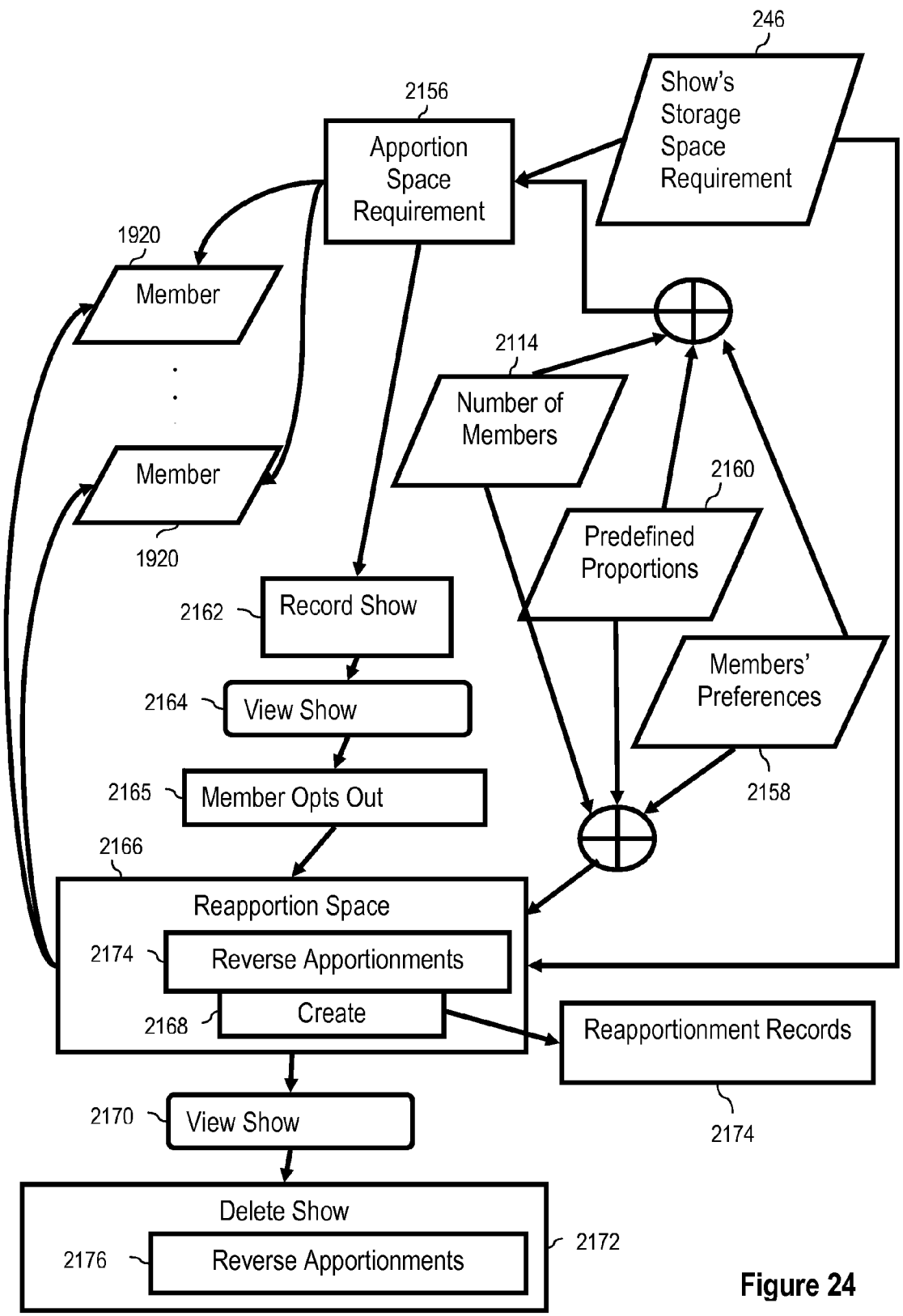
FIG. 24 is a flow chart depicting exemplary methods of reallocating a show's storage space requirements among group members in the event that one or more members opt out of a storage space allocation.

FIG. 24 sets forth a flow chart depicting a method of personal video recording in which group members are empowered to opt out of group ownership of shows. The method of FIG. 24 includes apportioning 2156 a show's storage space requirement 246 among group members 1920. Apportioning 2156 storage space is carried out in dependence upon the number of members 2114, in dependence upon predefined proportions 2160, or in dependence upon members' preferences 2158. After apportioning 2156 storage space, PVRs according to the method of FIG. 24 record the show 2162, after which users optionally view the show (2164, 2170) and delete the show 2172. Viewing the show is said to be optional in the sense that the show can be viewed before members opt out 2164, after members opt out 2170, or, in fact, never viewed by anyone before the show is deleted from storage. The method of FIG. 24 does include eventually deleting the show 2172, including reversing 2176 the then-current apportionments of the show's storage space requirement.

The method of FIG. 24 includes a member's opting out 2165 and subsequently reapportioning 2166 the show's storage space requirement 246 among group members 1920. Reapportioning 2166 the show's storage space requirement includes reversing 2174 the previous apportionment of the show's storage space requirement by decrementing each member's UsedSpace 204 by the original apportioned amount and incrementing each member's FreeSpace 206 by the original apportioned amount.

Reapportioning 2166 also includes creating 2168 reapportionment records 2174, one reapportionment record for each group member remaining after one opts out. Each reapportionment record 2174, as shown in FIG. 21a, stores the show ID 241, a user ID of a remaining member, and a reapportionment amount 282. Reapportionment amounts 282 are determined in many ways. We discuss three exemplary alternative ways of determining reapportionment amounts and then reapportioning storage space requirements accordingly.

In the method of FIG. 24, reapportioning 2166 the show's storage space requirement 246 alternatively includes reapportioning according to the number of members 2114. In PVRs according to this kind of embodiment, the number of members is typically recorded on a group profile 2102, in, for example, a field such as NumberMembers 2114. Reapportioning 2168 a show's storage space requirement then includes decrementing by one the number of members, thereby determining the number of members remaining after one opts out and the number of reapportionment records to be created; creating one reapportionment record for each remaining member, described above; dividing the show's space requirement by the number of remaining members, thereby determining a reapportioned amount of the show's storage space requirement to be charged to each remaining member; and storing the reapportioned amount in the ReappAmount field 282 in each reapportionment record 2174. Reapportioning the show's storage space requirement then also includes incrementing each remaining member's UsedSpace 204 by the reapportioned amount and decrementing each remaining member's FreeSpace 206 by the reapportioned amount.

In the method of FIG. 24, reapportioning 2166 the show's storage space requirement 246 alternatively includes reapportioning according to predefined proportions 2160. In PVRs according to this kind of embodiment, predefined proportions are established in fields such as the SpaceShare field 2112 in member records 2106. Predefined proportions can be percentages adding up to one hundred percent, so that, for example, in a group having four members, the predefined proportions can be, for example, 10%, 10%, 40%, and 40%. After a member opts out, however, the remaining members' predefined proportions no longer add up to 100%. The method of FIG. 24, therefore, includes recalculating by weight the remaining predefined proportions so that they again add up to 100%. Reapportioning a show's storage space requirement in such embodiments then includes multiplying the show's storage space requirement by each recalculated predefined proportion, thereby determining a separate reapportioned amount for each remaining member. Reapportioning a show's storage space requirement in such embodiments then includes storing each remaining member's reapportioned amount in the ReappAmount field in a reapportionment record 2174. Reapportioning the show's storage space requirement in such embodiments then includes, for each remaining member, incrementing a member's UsedSpace 204 by the reapportioned amount for that member and decrementing a member's FreeSpace 206 by the reapportioned amount for that member.

In the method of FIG. 24, reapportioning 2166 the show's storage space requirement 246 alternatively includes reapportioning according to members' preferences 2158. Members indicate preferences in, for example, user preference records 320, including indications of levels of relative intensity 328. Reapportioning a show's storage space requirement in such embodiments then includes establishing, as percentages, for example, a weighted coefficient of preference for each remaining member. The weighted coefficients so established will be different after a member opts out, than they were before a member opted out, unless, as described above, the member opting out had asserted no preference for the show in question. Reapportioning a show's storage space requirement in such embodiments then includes multiplying the show's storage space requirement by each newly established weighted coefficient, thereby determining a separate reapportioned amount for each member. Reapportioning a show's storage space requirement in such embodiments then includes storing each remaining member's reapportioned amount in the ReappAmount field in a reapportionment record 2174. Reapportioning the show's storage space requirement in such embodiments then includes, for each remaining member, incrementing a member's UsedSpace 204 by the reapportioned amount for that member and decrementing a member's FreeSpace 206 by the reapportioned amount for that member.

Apportionment of Loans

We now describe an additional class of embodiments of PVRs according to the present invention, embodiments for recording shows for groups where, in addition to apportioning storage space requirements among members, loans of storage space are also apportioned among members. It is useful to note that a need for a loan can arise in at least two ways. One way a need for a loan can arise is when a deficit is discovered at the time of a user-scheduled or recording or in preference recording.

Another way a need for a loan can arise is when a member opts out of group ownership of a show. When a user opts out, the remaining members' apportioned amounts of the show's storage space requirement typically will increase. If one member's apportioned amount exceeds the member's free space, a deficit exists that requires borrowing if recording is to continue.

PVRs according to the embodiments under discussion charge group loan amounts by apportionment to group members rather than to a group as such. If a member opts out, then any outstanding group loan amount is reapportioned to the remaining members.

Figure 21B:
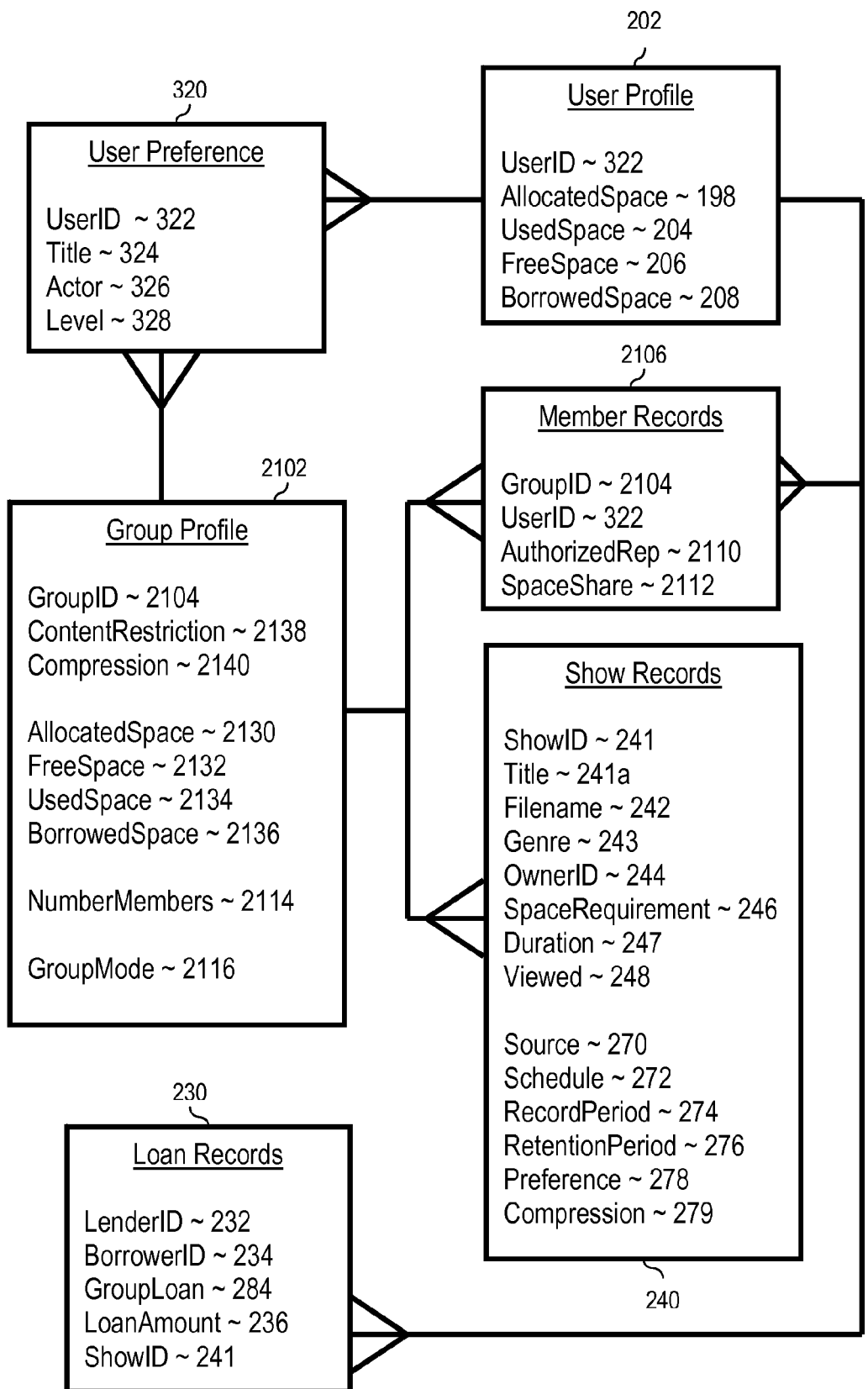
FIG. 21b depicts alternative exemplary data structures useful in various embodiments utilizing groups.

With reference to the exemplary data structures of FIG. 3, a group loans, that is, a loan to a groups, is authorized by storing a group ID in a BorrowerID field 224 in a lending authorization record 220. A data structure useful in apportioning group loans among members is show in the loan record 230 of FIG. 21b. The loan record of FIG. 21b is similar to the loan record of FIG. 3 with the addition of a Boolean GroupLoan field 284, a field used for identifying a group loan. More particularly, a group loan is represented by two types of loan records used in tandem. One loan record type, called a 'group loan record,' has a group ID stored in its BorrowerID field 234 and its GroupLoan field 284 is set to True. The other loan record type, called a 'member loan record,' has a group ID stored in its BorrowerID field 234 and its GroupLoan field 284 is reset to False. Group loan records and member loan records are therefore related one-to-many through the BorrowerID field 234 which stores a group ID operating as a relational key.

The LenderID field 232 in each member loan record stores a user ID of a member and therefore serves as a foreign key relating the member loan record to a user profile 202. From the point of view of the user profile 202, the member loan record looks like any other loan record, but it is in fact a little different. The LoanAmount 236 in the member loan record 230 represents an amount to be added to a member's BorrowedSpace 208 and subtracted from a member's FreeSpace 206, just like any other loan to a user. There is a difference, however, because the only actual loan in question is one which was authorized as a loan to the group, in a lending authorization record issued in favor of the group, not for any particular member of the group. The only loan involved here is a loan to a group. The LoanAmounts in the member loan records are apportionment amounts of a group loan, not actual loans to individual members.

Described in the paragraphs just preceding is one exemplary way to represent group loans in data structures. Another way would be to create a separate table for the header records, the group loan records. Many other data structures for representing group loans will occur to those of skill in the art and all such structures are well within the scope of the present invention.

Figure 25:
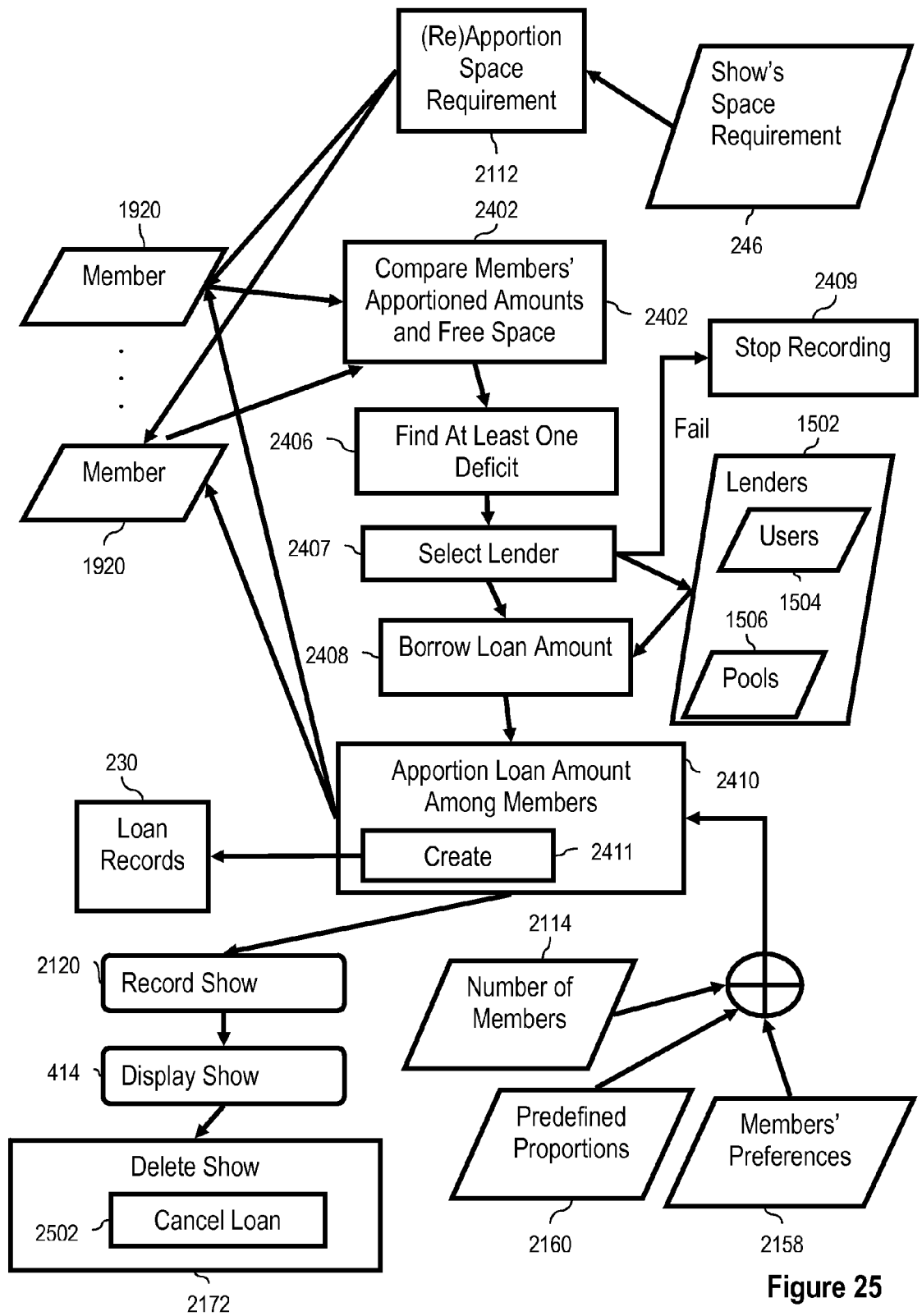
FIG. 25 is a flow chart depicting alternative exemplary methods of allocating a loan among group members.

FIG. 25 sets forth a flow chart depicting a method of personal video recording that includes apportioning or reapportioning 2112 a show's storage space requirement 246 to group members 1920. The members are users having allocated storage space optionally including free space on a PVR. In the method of FIG. 25, comparing 2402 the members' apportioned amounts of storage space and the members' free space results in finding 2406 at least one deficit, that is, at least one member whose apportioned amount exceeds the member's free space by a deficit amount.

The method of FIG. 25 includes selecting 2407, in dependence upon the deficit amount, one or more lenders 1502. The lenders 1502 can include users 1504 having free storage space and pools 1506 having free storage space. The selecting 2407 is carried out in dependence upon the deficit amount in the sense that lenders are selected who have authorized lending to the group in at least the deficit amount and who have free space at least equal to the deficit amount. Alternatively, if there is no lender who authorizes lending to the group in at least the deficit amount and who has free space at least equal to the deficit amount, then more than one lender is selected.

The method of FIG. 25 includes borrowing 2408, in dependence upon the deficit amount, from the lenders 1502 for the group, at least one loan amount of storage space. The borrowing 2408 is carried out in dependence upon the deficit amount in the sense that a loan amount is borrowed at least equal to the deficit amount. If there is no lender who authorizes lending to the group in at least the deficit amount and who has free space at least equal to the deficit amount, then more than one loan is effected with more than one loan amount until the total of the loan amounts is at least equal to the deficit amount.

The method of FIG. 25 include apportioning 2410 the loan amount among the group members 1920. Apportioning 2410 the loan amount among the members includes apportioning to each member 1920 an apportioned amount of the loan amount. Three exemplary alternative ways of apportioning loan amount are disclosed below.

In the method of FIG. 25, apportioning 2410 the loan amount alternatively includes apportioning according to the number of members 2114. In PVRs according to this kind of embodiment, the number of members is typically recorded on, for example, a group profile 2102 in a field such as NumberMembers 2114 shown on FIG. 21b. Apportioning a loan amount includes dividing the show's space requirement by the number of members, thereby determining an apportioned amount of the loan amount to be charged to each member. Apportioning a loan amount includes creating 2411 loan records 230, including a group loan record and one member loan record for each member. Apportioning a loan amount includes storing in the LoanAmount field 236 in each member loan record the apportioned amount to be charged to each member. Apportioning the loan amount includes incrementing each member's BorrowedSpace 208 by the apportioned amount and decrementing each member's FreeSpace 206 by the apportioned amount.

In the method of FIG. 25, apportioning 2410 the loan amount alternatively includes apportioning according to predefined proportions 2160. In PVRs according to this kind of embodiment, predefined proportions are established in fields such as the SpaceShare field 2112 in member records 2106. Predefined proportions can be percentages adding up to one hundred percent, so that, for example, in a group having four members, the predefined proportions can be, for example, 10%, 10%, 40%, and 40%. Apportioning a loan amount in such embodiments includes multiplying the loan amount by each predefined proportion, thereby determining a separate apportioned amount for each member. Apportioning a loan amount includes creating 2411 loan records 230, including a group loan record and one member loan record for each member. Apportioning a loan amount includes storing in the LoanAmount field 236 in each member loan record the apportioned amount to be charged to each member. Apportioning the loan amount in such embodiments includes, for each member, incrementing a member's BorrowedSpace 208 by the apportioned amount for that member and decrementing a member's FreeSpace 206 by the apportioned amount for that member.

In the method of FIG. 25, apportioning 2410 the loan amount alternatively includes apportioning according to members' preferences 2158. Members indicate preferences in, for example, user preference records 320, including indications of levels of relative intensity 328. Apportioning a loan amount in such embodiments includes establishing, as percentages, for example, a weighted coefficient of preference for each member. Apportioning a loan amount in such embodiments includes multiplying the loan amount by each weighted coefficient, thereby determining a separate apportioned amount for each member. Apportioning a loan amount includes creating 2411 loan records 230, including a group loan record and one member loan record for each member. Apportioning a loan amount includes storing in the LoanAmount field 236 in each member loan record the apportioned amount to be charged to each member. Apportioning the show's storage space requirement in such embodiments then includes, for each member, incrementing a member's BorrowedSpace 208 by the apportioned amount for that member and decrementing a member's FreeSpace 206 by the apportioned amount for that member.

The method of FIG. 25 includes optionally recording the show 2120, optionally displaying the show 414, and eventually deleting the show 2172, including canceling the loan 2502. Recording is said to be optional in the method of FIG. 25 because, to the extent that the need for borrowing is caused by a user's opting out of group ownership, the show in question probably has already been recorded. Displaying (or viewing) the show 2172 is said to be optional in that an authorized member is perfectly free within the method of FIG. 25 to delete the show before anyone watches it.

Canceling the loan includes scanning through the loan records 230 for the show and, for the member identified in each member loan record, decrementing a member's BorrowedSpace 208 by the LoanAmount 236 for that member and incrementing a member's FreeSpace 206 by the LoanAmount 236 for that member. Canceling the loan then includes deleting all the loan records 230 for the show, that is, all the loan records related to the show record through the ShowID field 241.

Members' Opting Out of Group-Related Loans of Storage Space

Figure 26:
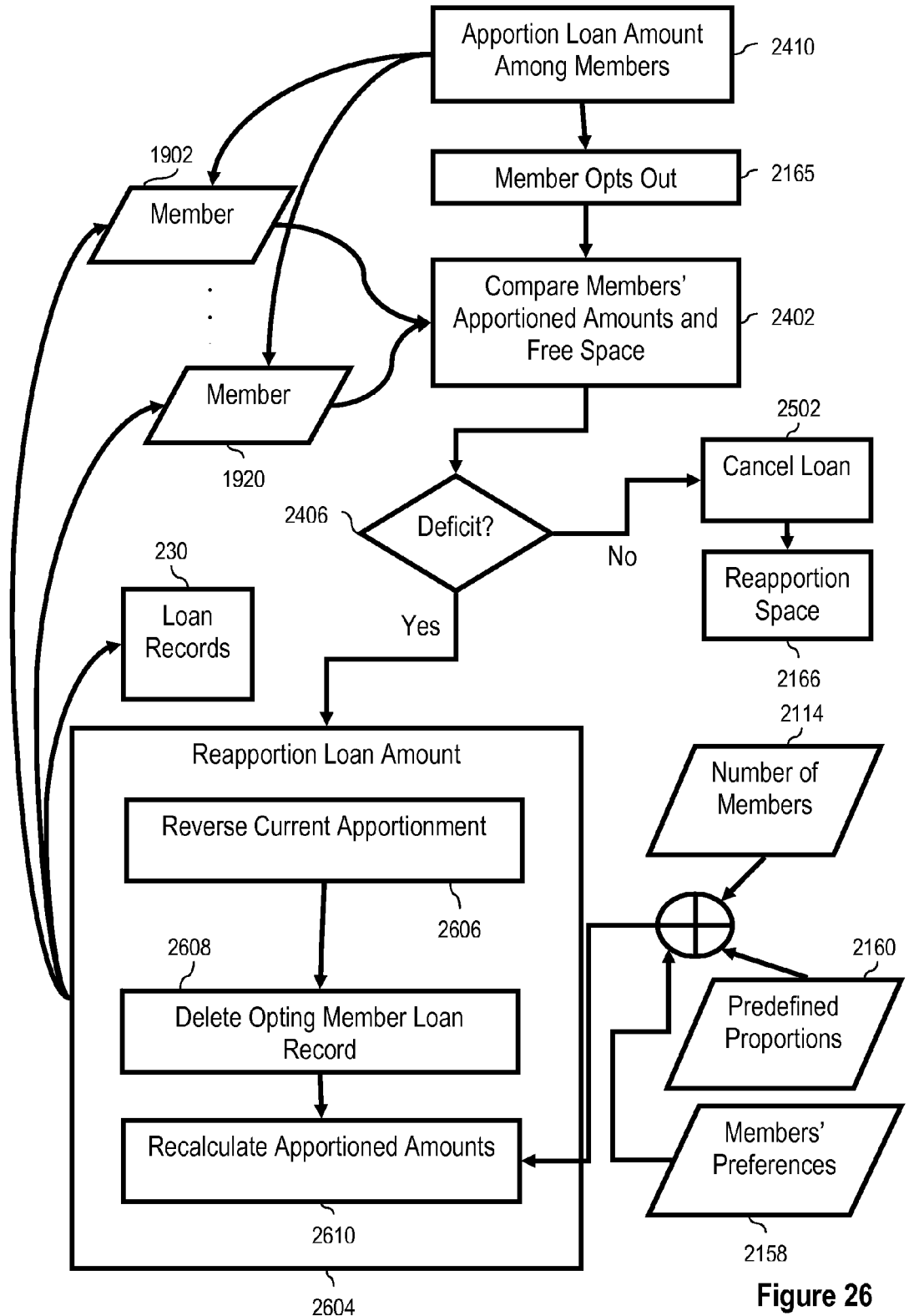
FIG. 26 is a flow chart depicting exemplary methods of reallocating a show's group loan among group members in the event that one or more members opt out of responsibility for group storage.

When a member opts out of responsibility for group ownership, not only must the storage space requirement be reapportioned (as described in detail above in this disclosure), but any existing loan amount must be reapportioned also. FIG. 26 sets forth a flow chart depicting a method of personal video recording in which group members are empowered to opt out of group ownership of a show when the show has an associated group loan of storage space. The method of FIG. 26 includes a member's opting out 2165 after a PVR apportions 2410 a loan amount among group members 1920.

There is no particular timing limitation on opting out. A member can opt out before or after a show is recorded, before or after a show is viewed or displayed. When a member opts out therefore, it is possible, in fact likely, that the members' free space quantities have changed since the related show record was created. The method of FIG. 26 includes comparing 2402 members currently apportioned amounts of the show's storage space and the members' free space to determine whether a deficit still exists.

If members' free space has changed so that no deficit currently exists, then the method of FIG. 26 cancels 2502 the now unnecessary loan. Canceling the loan, as described above, includes scanning through the loan records 230 for the related show and, for the member identified in each member loan record, decrementing a member's BorrowedSpace 208 by the LoanAmount 236 for that member and incrementing a member's FreeSpace 206 by the LoanAmount 236 for that member. Canceling the loan then includes deleting all the loan records 230 for the show, that is, all the loan records related to the show record through the ShowID field 241. After canceling the loan, the method of FIG. 26 is still left with a reduction in the number of members responsible for the show's storage requirement, so the method includes reapportioning 2166 the show's space requirement among the remaining members as described in detail above.

If members' free space has not changed, so that a deficit still exists, of if members' free space has changed but nevertheless a deficit still exists, the method of FIG. 26 proceeds by reapportioning 2604 the loan amount among the remaining members. Reapportioning the loan amount includes reversing 2606 the current apportionment of the loan, deleting 2608 the member loan record of the member opting out, and recalculating the 2610 members' apportioned amounts of the loan.

Reversing 2606 the current apportionment of the loan includes scanning through the loan records 230 for the related show and, for the member identified in each member loan record, decrementing a member's BorrowedSpace 208 by the LoanAmount 236 for that member and incrementing a member's FreeSpace 206 by the LoanAmount 236 for that member. Then, because the method at this point is not canceling the loan entirely, only the member loan record for the member opting out is deleted 2608.

In the method of FIG. 26, reapportioning 2604 the loan amount alternatively includes recalculating 2610 apportioned amounts of the group loan according to the number of members 2114. In PVRs according to this kind of embodiment, the number of members is typically recorded on a group profile 2102, in, for example, a field such as NumberMembers 2114. Recalculating 2610 apportioned amounts of a loan then includes decrementing by one the number of members, thereby determining the number of members remaining after one opts out. Alternatively, the PVR can be programmed to determine the number of remaining members by counting the number of member loan records remaining with the same ShowID setting, now that the member loan record of the member opting out has been deleted. Recalculating 2610 then includes dividing the show's space requirement by the number of remaining members, thereby determining a reapportioned amount of the loan to be charged to each remaining member. The method includes storing the reapportioned amount in the LoanAmount field 236 in each remaining member loan record 230. Reapportioning the loan then also includes incrementing each remaining member's UsedSpace 204 by the reapportioned amount and decrementing each remaining member's FreeSpace 206 by the reapportioned amount.

In the method of FIG. 26, reapportioning 2604 the loan amount alternatively includes recalculating 2610 apportioned amounts of the group loan according to predefined proportions 2160. In PVRs according to this kind of embodiment, predefined proportions are established in fields such as the SpaceShare field 2112 in member records 2106. Predefined proportions can be percentages adding up to one hundred percent, so that, for example, in a group having four members, the predefined proportions can be, for example, 10%, 10%, 40%, and 40%. After a member opts out, however, the remaining members' predefined proportions no longer add up to 100%. Recalculating 2610 apportioned amounts of a loan therefore includes recalculating by weight the remaining predefined proportions so that they again add up to 100%. Recalculating 2610 in such embodiments then includes multiplying the total loan amount by each recalculated predefined proportion, thereby determining a separate reapportioned amount for each remaining member. Recalculating 2610 in such embodiments then includes storing each remaining member's reapportioned amount in the LoanAmount field 236 in a remaining member loan record 230. Recalculating 2610 in such embodiments then includes, for each remaining member, incrementing a member's UsedSpace 204 by the reapportioned amount for that member and decrementing a member's FreeSpace 206 by the reapportioned amount for that member.

In the method of FIG. 26, reapportioning 2604 the loan amount alternatively includes recalculating 2610 apportioned amounts of the group loan according to members' preferences 2158. Members indicate preferences in, for example, user preference records 320, including indications of levels of relative intensity 328. Recalculating 2610 apportioned amounts of a group loan in such embodiments then includes establishing, as percentages, for example, a weighted coefficient of preference for each remaining member. The weighted coefficients so established generally will be different after a member opts out, than they were before a member opted out, unless, for example, as earlier described in detail, the member opting out asserted no preference for the show in question. Recalculating 2610 in such embodiments then includes multiplying the total loan amount by each newly established weighted coefficient, thereby determining a separate reapportioned amount for each remaining member. Recalculating 2610 in such embodiments then includes storing each remaining member's reapportioned amount in the LoanAmount field 236 in a remaining member loan record 230. Recalculating 2610 in such embodiments then includes, for each remaining member, incrementing a member's UsedSpace 204 by the reapportioned amount for that member and decrementing a member's FreeSpace 206 by the reapportioned amount for that member.

Recovery of Displayed Storage Space

In this specification so far, our discussion has assumed that, if a show's storage space requirement exceeds available free space and it is not possible find a lender so that storage space can be borrowed, then the show will not be recorded. See, for example, our discussion above regarding the method depicted in FIG. 4 in which a failure to select a lender 406 results in stopping recording 412.

See also, for example, our discussion above regarding the methods depicted in FIGS. 11 and 12, both of which are concerned with the risk of underestimating a show's storage space requirement. Both methods include stopping recording (464, 412) if no lender can be found (462, 406). See also our discussion of apportioning or reapportioning storage space requirement among group members in connection with FIG. 25, where once again we assumed that a failure to find a lender 2407 would mean stopping recording 2409.

It would be advantageous, however, if there were other ways to find or create additional free space, so that recording can continue over a broader range of circumstances and storage space can be used more efficiently. One way to proceed against this problem is to note that at any given moment, used space may store recorded shows portions of which have already been displayed to viewers. It would be useful to have ways of recovering such displayed storage space for current use in recording shows.

Figure 27:
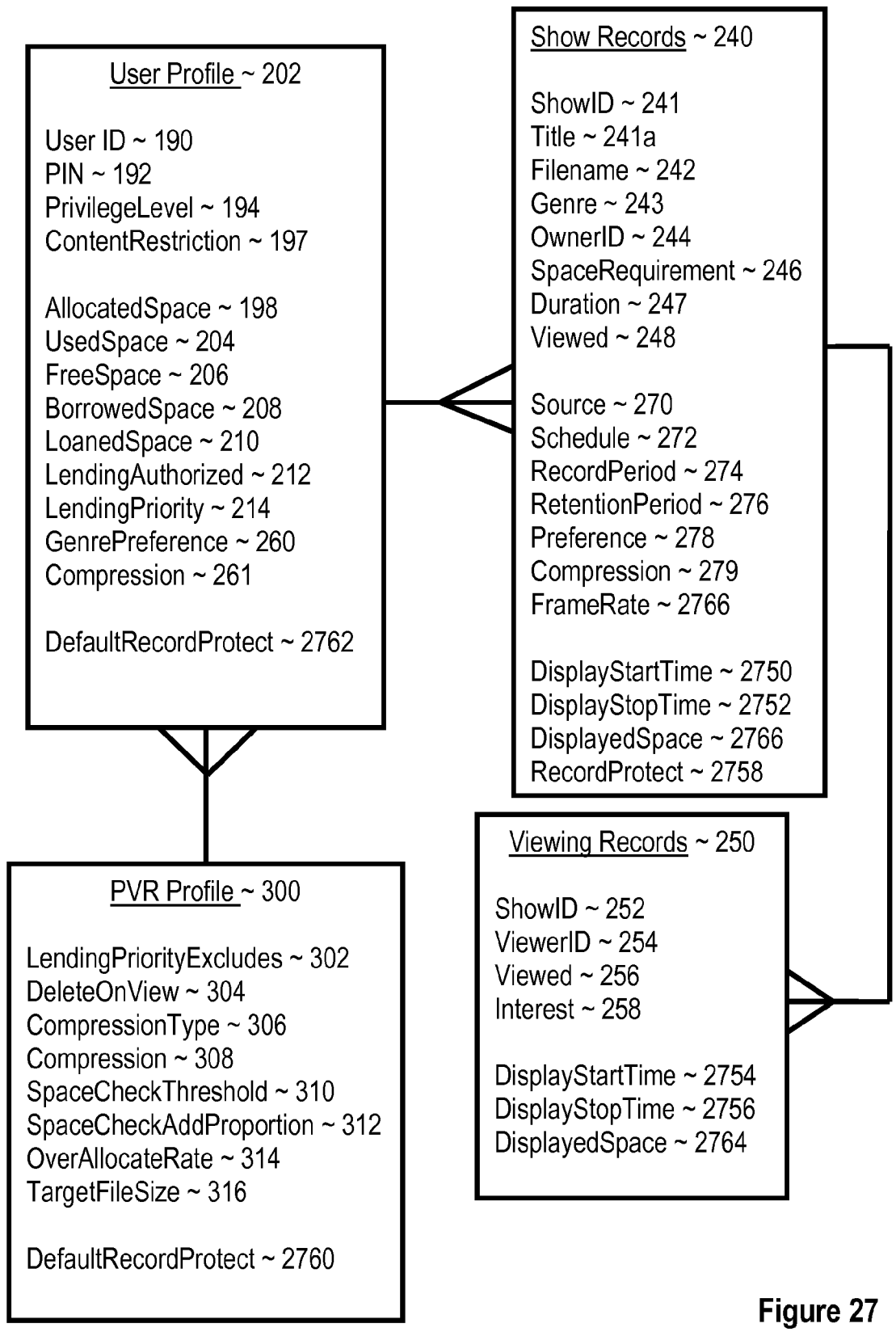
FIG. 27 sets forth example data structures useful in various embodiments of the present invention.

In the following discussion, we use the terms "displayed storage space" or "displayed space" to refer to the storage space upon which is recorded portions of shows that have already been displayed to viewers. FIG. 27 depicts exemplary data structures useful in freeing displayed space for use in recording shows. PVRs according to embodiments of this invention are programmed to refrain from attempting to free displayed space in shows that are marked as write-protected, as, for example, in the Boolean fields DefaultRecordProtect (2762 on user profile 202), RecordProtect (2758 on show record 240), and DefaultRecordProtect (2760 on PVR profile 300). DefaultRecordProtect 2762 and DefaultRecordProtect 2760 are Boolean indications, at the user level and the PVR level respectively, whether to set RecordProtect 2758 to True as a default, that is, whether the default for the PVR is to exclude recovering displayed space for use in further recording. An indication whether a particular show is write-protected, such as, for example, the RecordProtect field 2758, can be changed at any time by an authorized user through manipulation of a user interface. The defaults can be changed also.

DisplayStartTime 2750 and DisplayStopTime 2752 record display start time and display stop time respectively for a display period for a show 240. The amount of used space that has been displayed for the show can be stored in DisplayedSpace 2766, or the amount of displayed space can be calculated on the fly as described in more detail below.

DisplayStartTime 2754 and DisplayStopTime 2756, in the viewing records 250, record display start time and display stop time respectively for a display period for a show identified in ShowID 252 for a particular user as identified in ViewerID 254. The amount of used space that has been displayed for the show to the user can be stored in DisplayedSpace 2764 or can be calculated on the fly as described below.

Figure 28:
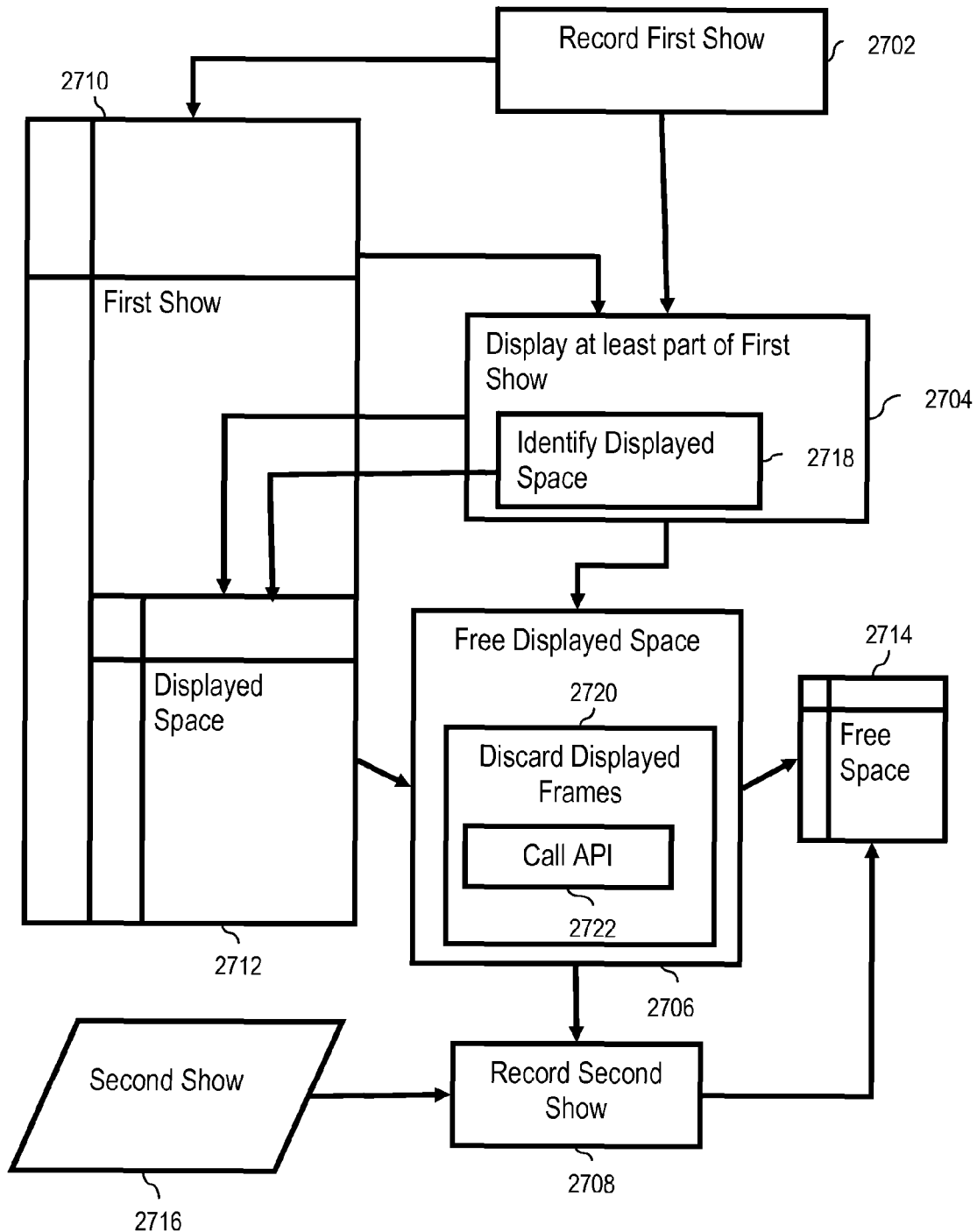
FIG. 28 is a flow chart depicting an exemplary method of freeing displayed storage space for use in recording shows.

FIG. 28 depicts an exemplary method of freeing displayed storage space for use in recording shows. More particularly, FIG. 28 depicts a method for automated personal video recording on a personal video recorder. The method of FIG. 28 includes recording 2702 a first show 2710; displaying 2704 at least a portion of the first show, thereby creating displayed space 2712; freeing 2706 displayed space, thereby making available free space 2714; and recording 2708 at least part of a second show 2716 in free space 2714 made available by freeing displayed space.

Figure 29:
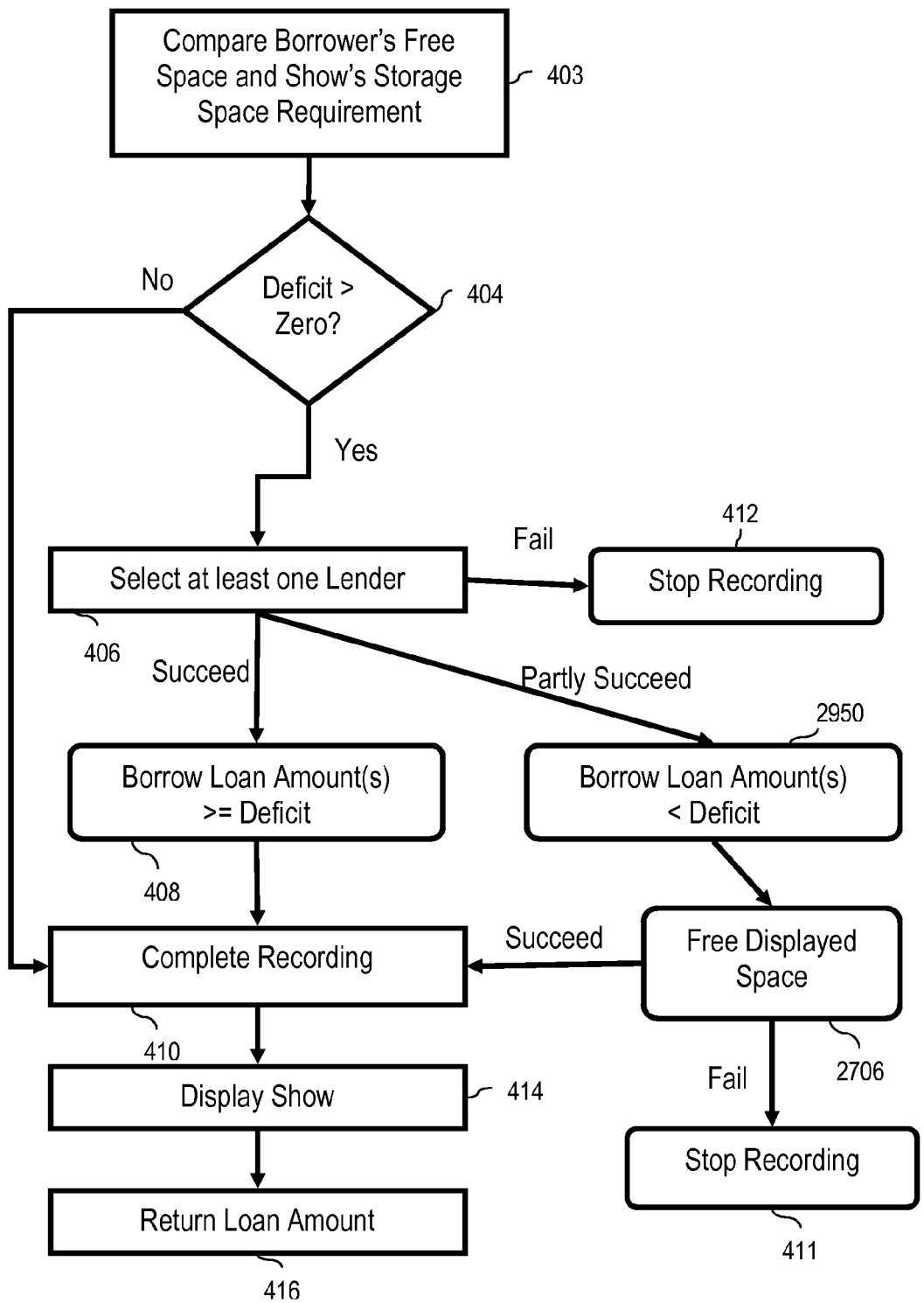
FIG. 29 is a flow chart depicting an exemplary alternative method of borrowing a loan amount of storage space, less than a deficit amount, and freeing displayed space.

FIG. 29 depicts a method of personal video recording in which a show's storage space requirement is compared 403 with a borrower's free space. The method includes selecting 406 lenders when the borrower's free space is less than the show's storage requirement, that is, when a deficit exists. In a similar method discussed above in connection with FIG. 4, when lenders are successfully selected, a PVR according to this embodiment borrows a loan amount at least covering the deficit 408 and proceeds with recording 410. If no lender is found, recording stops 412. In the method of FIG. 29, however, there is an additional alternative. That is, the method of FIG. 29 includes borrowing less than the deficit 2950, freeing displayed space 2706, and then proceeding with recording 410. Freeing displayed space 2706 comprises freeing a sufficient quantity of displayed space so that the displayed space so freed in combination with the borrowed loan amount 2950 is sufficient to meet the deficit. In use of the method of FIG. 29, it is only necessary to stop recording 411 in the event that both borrowing 2950 and freeing displayed space 2706 fail to provide sufficient free space to meet the deficit.

Figure 30:
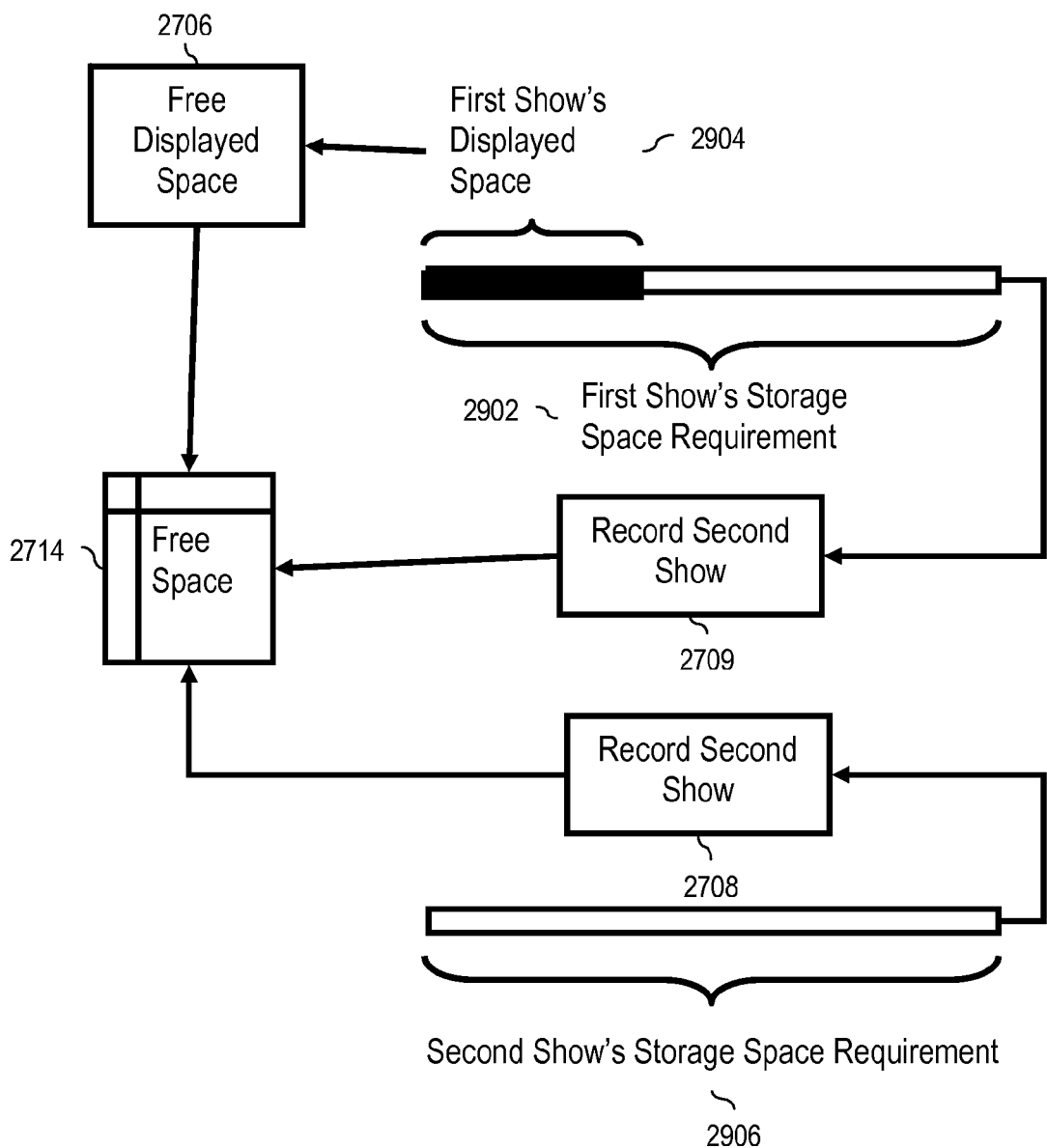
FIG. 30 is a flow chart and schematic diagram of storage space requirements depicting an alternative method of freeing displayed space of a show while recording and viewing a show.

In the method of FIG. 28, the first show 2719 and the second show 2716 can be same show. FIG. 30 depicts, in a flow chart and a schematic diagram of storage space requirements, an alternative method of freeing displayed space of a show while recording and viewing a show. In FIG. 30, the step 2708 for recording a second show includes recording a second show 2906 in free space 2714 made available by freeing 2706 displayed space 2904 of a first show 2902. In addition, the step 2709 for recording a second show includes recording a second show 2902 (actually the first show) in free space 2714 made available by freeing 2706 displayed space 2904 of a first show 2902. That is, the method depicted in FIG. 30 includes operation by recording a show into space in which an earlier portion of the same show was recorded, displayed, and subsequently freed. This can occur when, for example, in the process of checking a storage space requirement during recording of a show that is being viewed while it is being recorded, a PVR finds a deficit. If the only displayed space available to be freed is the earlier-displayed portion of the same show, then the PVR frees that displayed space and continues recording.

Figure 31:
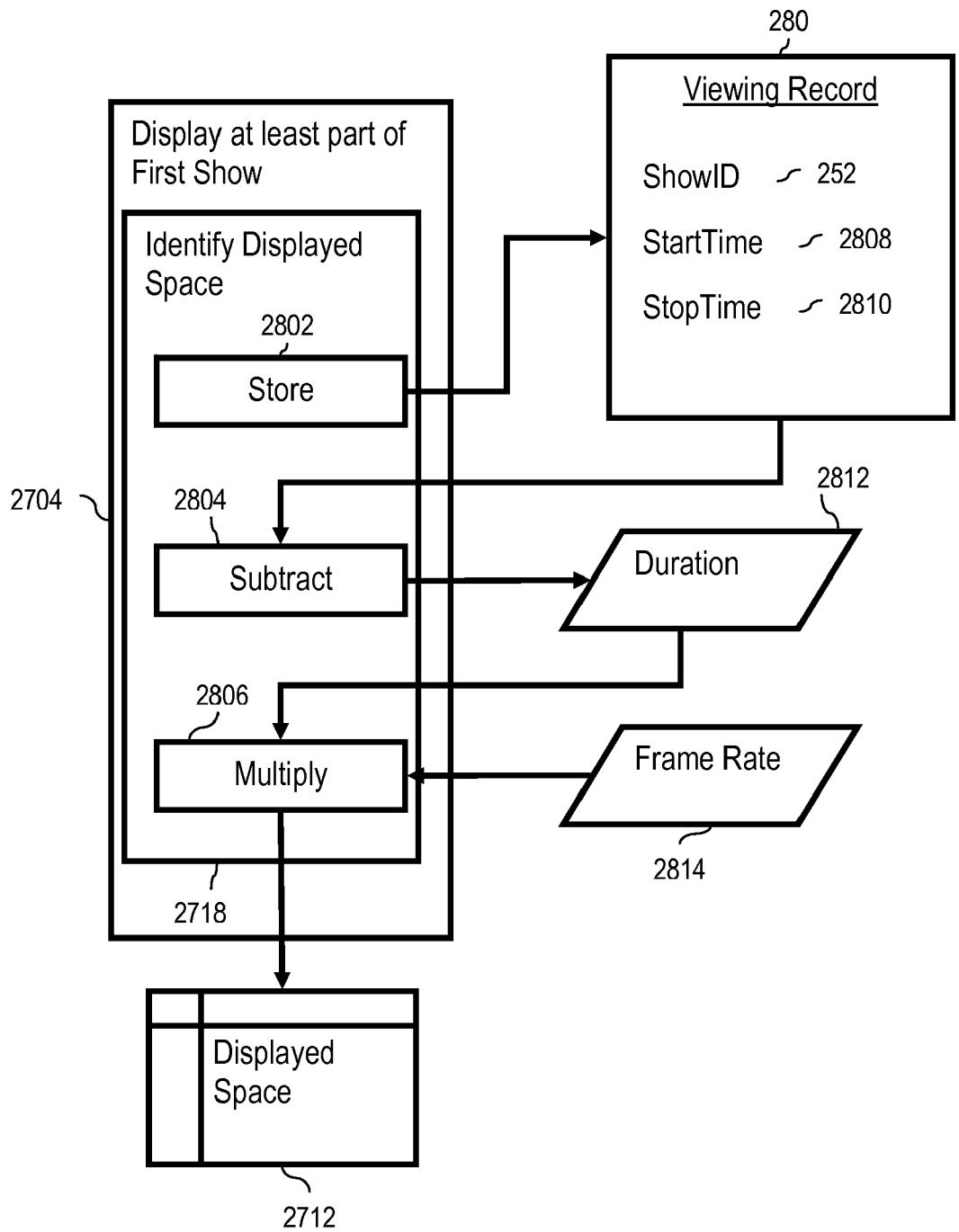
FIG. 31 is a flow chart depicting an exemplary method of identifying displayed space.

Referring again to FIG. 28, note that if a PVR is to free 2706 displayed space, the PVR will need to be able to identify displayed space to free. Displaying a show 2704, therefore, in the example of FIG. 28, includes identifying the displayed space 2718 for the show. FIG. 31 depicts in more detail a method of identifying 2718 displayed space for a show. More particularly, the method of FIG. 31 includes storing 2802 in a viewing record 280, for a show identified by ShowID 252, a display start time 2808 and a display stop time 2810 for a display period for a the show. The method of FIG. 31 includes subtracting 2804 the start time 2808 from the stop time 2810, thereby establishing a duration 2812 for a display period for the show. The method of FIG. 31 also includes multiplying 2806 the duration 2812 of the display period by a frame rate 2814 for the show, thereby identifying, in terms of a number of video frames, a particular amount of displayed space 2712 for the show.

Consider, for example, a thirty-minute show displayed at a frame rate of thirty frames per second having a display period of ten minutes. In this example show, there are 10 minutes×60 seconds/minutes×30 frames/second equals 18,000 displayed frames.

That is, the displayed space for such a show can be represented as comprising the first 18,000 frames of the video file in which the show is recorded. If the show's storage space requirement is 60 megabytes, then the displayed space for the show can alternatively be represented as comprising one third of the show's storage space requirement or 20 megabytes of displayed space.

The PVR needs the frame rate for calculating displayed space in terms of video frames. PVRs according to some embodiments of the present invention store the frame rate 2766 for a show directly on the show record 240. Other embodiments treat frame rate as one factor in compression level 279 and store frame rates in tables keyed by compression level, such as, for example, the tables depicted in FIGS. 10a and 10b. PVRs implementing the method of FIG. 28, for example, typically include identifying frame rates in dependence upon compression levels of shows, that is, inferring or identifying frame rates from compression level tables such as those of FIGS. 10a and 10b.

In the method of FIG. 28, freeing displayed space comprises discarding 2720 displayed frames. As shown in FIG. 28, one way to discard displayed frames is to issue video editing calls 2722 to software routines in an application programming interface ("API") for video editing, a video editing API. There are many APIs for video editing. Most, if not all, codecs have associated APIs for video editing. Examples of APIs for video editing include 'Video For Linux,' Microsoft's 'Video For Windows™,' and the Sun Microsystems's 'Java Media Framework™.' Video For Windows, for example, is a hardware independent API used by popular video editing packages such as Adobe Premier™ and by video conferencing software such as Microsoft's NetMeeting™.

Figure 32:
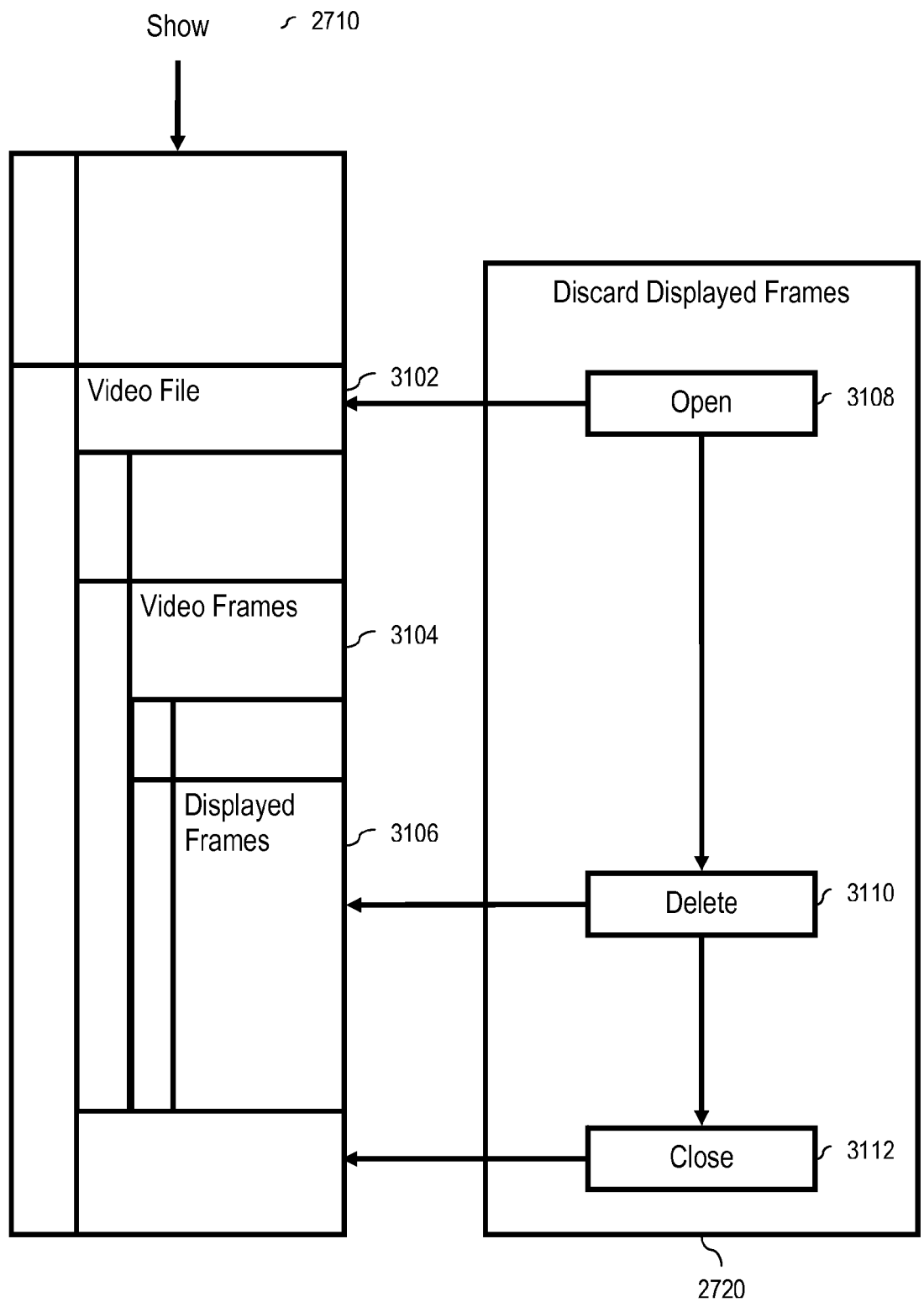
FIG. 32 is a flow chart depicting an alternative exemplary method of discarding displayed frames.

FIG. 32 depicts an alternative exemplary method of discarding 2720 displayed frames, a method that is implemented by application programming that itself directly manipulates video files or manipulates video files through calls to video editing APIs. The method of FIG. 32 operates on a show 2710 recorded in a video file 3102 comprising video frames 3104, including displayed frames 3106. In the method of FIG. 32, discarding 2720 displayed frames comprises deleting 3110 displayed frames from the video file. More particularly, the method of FIG. 32 includes opening 3108 the video file 3102; deleting 3110 displayed frames 3106; and closing 3112 the video file 3106. The method of FIG. 32, therefore, relies on the PVR's operating system to reduce the size of the video file 3102 by approximately the proportion of storage space formerly occupied by the deleted displayed frames 3106.

Figure 33:
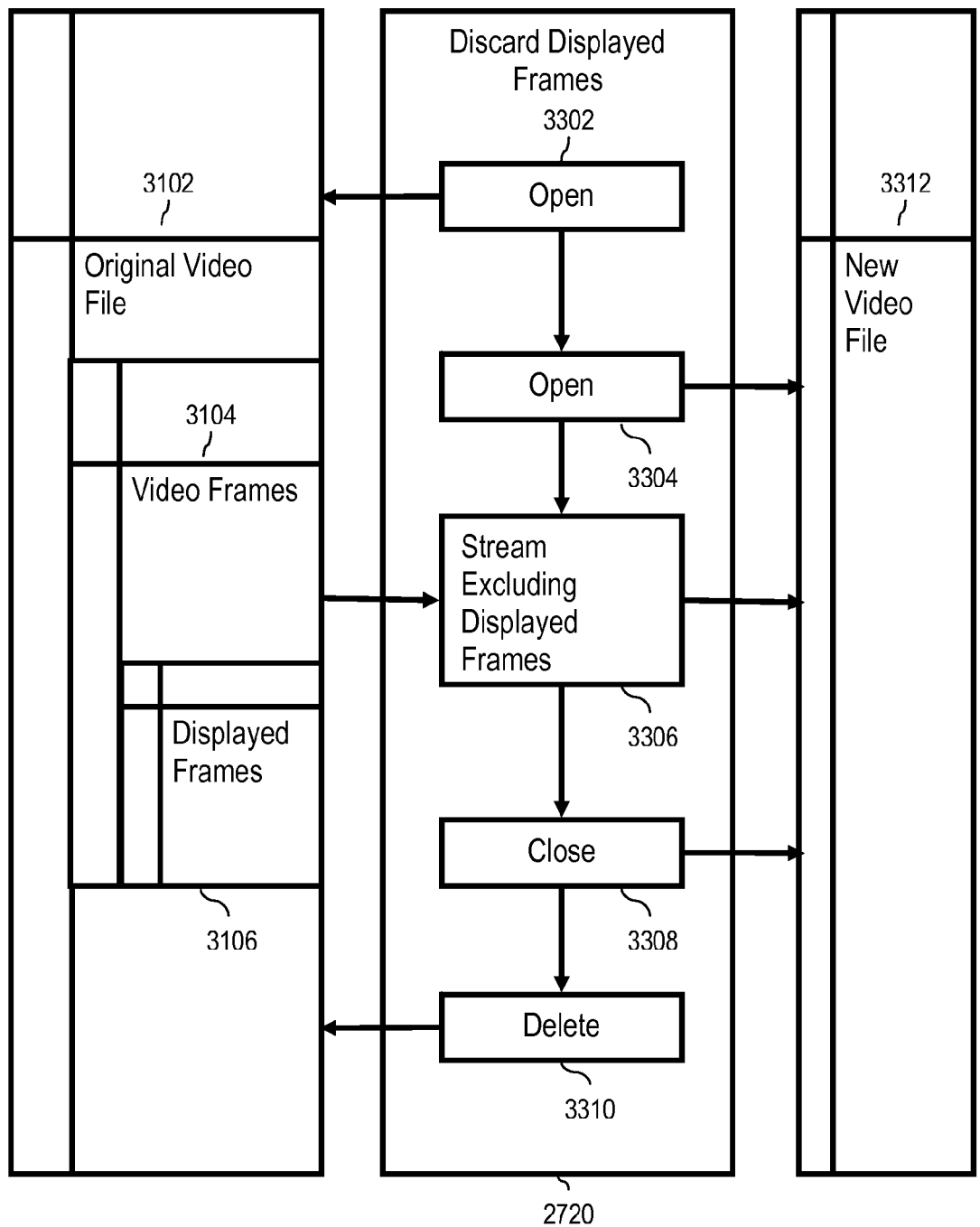
FIG. 33 is a flow chart depicting a further alternative exemplary method of discarding displayed frames.

FIG. 33 depicts a slightly more affirmative alternative exemplary method of discarding 2720 displayed frames, a method that too is implemented by application programming that itself directly manipulates video files or manipulates video files through calls to video editing APIs. The method of FIG. 33 operates upon a show in an original video file 3102 comprising video frames 3104 and displayed frames 3106. In the method of FIG. 33, discarding 2720 displayed frames comprises streaming 3306 the show from the original video file 3102 to a new video file 3312, excluding displayed frames 3106, and deleting 3310 the original video file 3102. More particularly, the method of FIG. 33 includes opening 3202, the original video file 3202; opening 3304 a new video file 3312; streaming 3306 the video frames 3104 from the original video file 3102 to the new video file 3312, excluding displayed frames 3106; closing 3308 the new video file 3312; and deleting 3310 the original video file 3102. We say that this method is slightly more affirmative in that the new video file 3312 is only ever filled with a video clip of reduced size, and the original video file 3102 is completely deleted.

In all this opening, closing, and deleting of files, in PVRs according to many embodiments of the present invention, the application software in a PVR will need the shows' filenames for dealing with the PVR's operating system. Shows' filenames are stored, for example, in fields provided for that purpose, such as the one at reference 242 in show record 240 on FIG. 27. In the method of FIG. 33, for example, it is useful, after opening a new video file 3312 and deleting 3310 the original video file 3102, for the PVR to update the filename field 242 (presently containing the filename of the original video file 3102) in the show record 240 with a filename for the new video file 3312.

It is useful to consider in more detail the process of deleting displayed frames and excluding displayed frames from a stream to a new video file as these processes apply to discarding displayed frames. More particularly, it is useful to identify how to determine when to stop. That is, it is useful to have particular ways of determining in deleting displayed frames which is the last frame to be deleted, assuming the PVR takes as the first frame to be deleted the first frame in the video file. Similarly, with respect to excluding displayed frames from a steam to a new file, it is useful to be able to identify exactly which frame is to be the last frame excluded from the stream to the new file, assuming that the PVR begins exclusion with the first frame in the original video file. The answer as to which frame is the last frame depends on the video encoding of the video being worked upon, the file from which frames are to be deleted or the file from which frames are streamed to a new file.

MJPEG, for example, compresses only a single frame at a time, so-called intra-frame or spatial compression. Each MJPEG video frame is a complete picture in itself. Identifying a particular MJPEG frame as the last frame to be deleted or excluded a stream is straightforward: Count the number of frames identified by use of, for example, the method of FIG. 31 for identifying displayed space 2718. That is, multiply 2806 a duration 2812 of a display period by a frame rate 2814 for a show. The product is a number of frames. In using a method according to FIG. 32, delete that number of frames from the front of a video file. In using a method according to FIG. 33, exclude that number of frames from the front of a stream from an original video file to a new video file.

Figure 34:
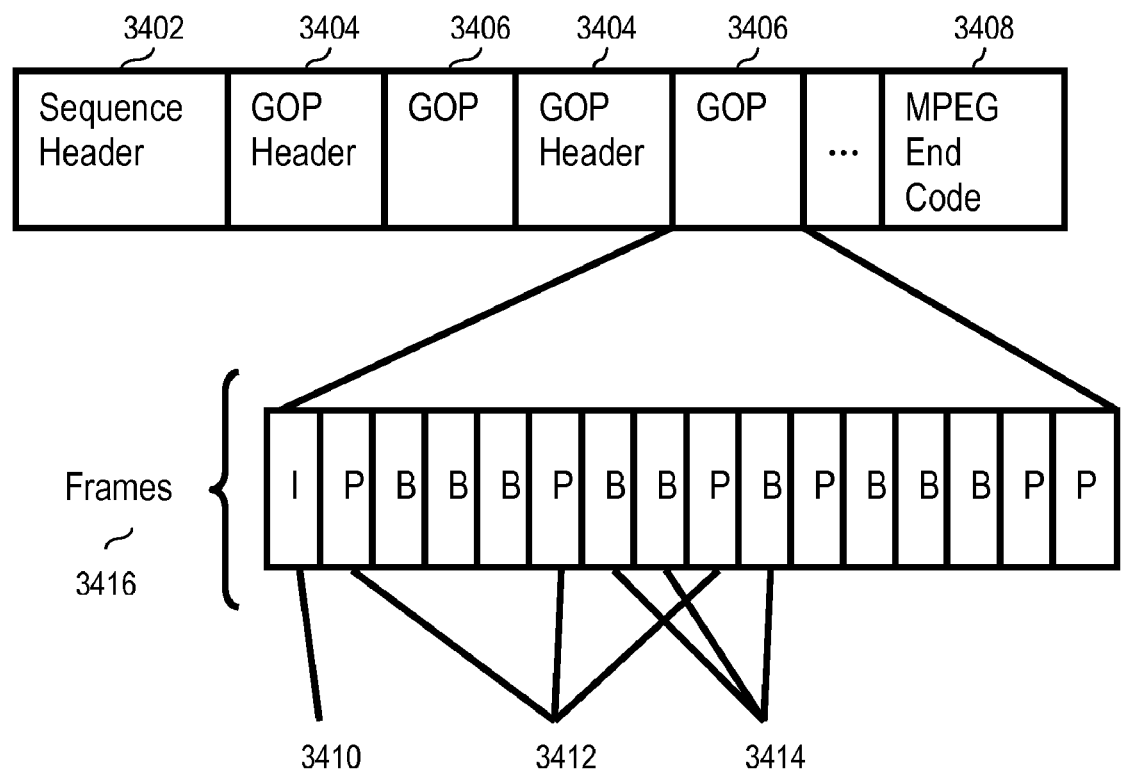
FIG. 34 is a diagram of a prior art structure of MPEG video.

MPEG, on the other hand, is an inter-frame compression format that uses both spatial compression in each frame and temporal compression across frames. In MPEG, that is, several frames at once are considered while performing encoding operations. FIG. 34 illustrates a simplified illustrative example of the structure of MPEG-1 video. MPEG-1 video includes a sequence header 3402, followed by one or more alternating sequences of 'Group of Pictures' or 'GOP' headers 3404 and GOPs 3406, followed by a sequence end marker 3408. A GOP is a series of pictures (frames 3416) each of which consists of a picture header and actual picture data.

A frame or picture can be of type I (3410), P (3412), or B (3414). An I-frame is an 'intracoded' frame, intracoded meaning coded only with reference to itself. I-frames are coded spatially with no reference to any other frame in the sequence. That is, I-frames are coded spatially but not temporally. I-frames can be decoded, or reconstructed for display, with no reference to other frames. Each I-frame is a complete picture ready for display on its own after decoding.

Starting with an I-frame, an MPEG encoder can forward predict a future frame. A forward-predicted frame is called a 'P-frame,' 'P' for 'predicted.' P-frames are predicted from I-frames and from other P-frames. P-frames are encoded both spatially and temporally. It is not possible to reconstruct or decode a P-frame without data from another frame. P-frames are forward predicted only, from the most recently preceding I-frame or P-frame.

B-frames are both forward predicted and backward predicted, 'B' for 'bidirectional.' B-frames are forward and backward predicted from the last and next I-frame or P-frame, therefore requiring two other frames to reconstruct each encoded B-frame.

As an example of the usage of I, P, and B-frames, consider the following sequence of six-frame GOPs: IBPBPB, IBPBPB, IBPBPB . . . . The I-frames are coded spatially only and the P-frames are forward predicted based on previous I and P-frames. The B-frames are coded based on forward prediction from a previous I or P-frame, as well as backward prediction from a succeeding I or P frame. The example sequence is processed by the encoder so that the first B frame is predicted from the first I frame and first P frame; the second B frame is predicted from the second and third P frames; and the third B frame is predicted from the third P frame and the first I frame of the next group of pictures.

Note that the second B-frame in each GOP, in addition to depending on backward prediction from a next I-frame, also depends on forward prediction from a preceding P-frame which in turn depends on forward prediction from a preceding P-frame and a preceding I-frame. Because the P-frames and B-frames between I-frames depend, directly or indirectly, on forward prediction from a previous I-frame, cutting an MPEG sequence at a point in the sequence between I-frames renders useless the frames between the cut point and the next I-frame. Cuts for deleting displayed frames from MPEG video files and excluding displayed frames from MPEG streams in PVRs according to embodiments of the present invention, therefore, are usefully made at I-frames.

With reference to the methods of FIGS. 32 and 33, therefore, PVRs according to those methods usefully include, when processing MPEG video, in the process of deleting 3110 displayed frames 3106 and in the process of streaming 3306 while excluding displayed frames 3106, checking frame types. Frame types are checked in such embodiments, for MPEG video, to determine that the first frame in continuation is an I-frame, that is, that the next frame after a last frame deleted or excluded is an I-frame, so that an MPEG decoder in reconstructing the modified or new file for display is not presented initially with a P-frame or a B-frame, frames which cannot be decoded without a preceding I-frame.

In other words, if the last frame to be deleted or excluded is a P-frame or a B-frame, then PVRs processing MPEG video according to these embodiments can delete all the frames up to the next I frame. If the cut would then occur in the middle of GOP, requiring editing a GOP header, then PVRs can delete or exclude all the frames up to the beginning of the next GOP, including the GOP header for the current GOP. A typical MPEG block frame count is sixteen frames including one I-frame. On average, this method therefore would be expected to exclude about eight undisplayed frames comprising about a fourth of a second of video display, which is unlikely to be noticed by viewers.

An alternative for MPEG that is slightly more conservative and slightly more complex is to buffer GOPs, that is, buffering all the frames in each GOP one-by-one as each GOP is processed for deletion or exclusion. Then when a displayed frame count indicates a mid-GOP discard, the PVR can still include or stream out to the new video file the entire current GOP, including the displayed frames in the GOP as well as the undisplayed frames in the block, thereby deleting somewhat fewer than all the displayed frames, but conservatively preserving all the frames not yet displayed.

We discussed in this disclosure several ways of carrying out deletions and exclusions of displayed frames, particularly with reference to the exemplary encodings MJPEG and MPEG. Many ways of deleting or excluding displayed frames in these encodings and other encodings will occur to those of skill in the art, and all such ways are well within the scope of the present invention.

Further Compression of Shows

Above in this disclosure, we discussed various ways of making free space available for recording shows, including lending free space to other users or groups of users, repossessing loaned space, and recovery of displayed space. We discussed also the fact that compression levels affect storage space requirements and storage space usage. In light of that discussion, we note now that it would be useful also to be able, not only to calculate and reset storage space requirements in dependence upon compression levels, but also to affect compression levels as such. Having the capability of changing compression levels for shows already recorded or currently in the process of being recorded would add a useful alternative way of making free space available for recording.

We turn now to a discussion of further compression of shows. We speak of "further" compression because, as readers will realize from our earlier discussion of compression, all shows are compressed to some extent during delivery or capture and storage. Readers will also understand by now that in this discussion the term "show" includes show records that identify shows and store the shows' attributes, as well as the physically recorded video and audio content associated with particular shows. Although it is true that the physically recorded content can be stored in a variety of media including streams and temporary data structures in RAM, for ease of explanation, we generally speak in this disclosure of recording shows in files for storage in file systems on magnetic or optical media.

Figure 35:
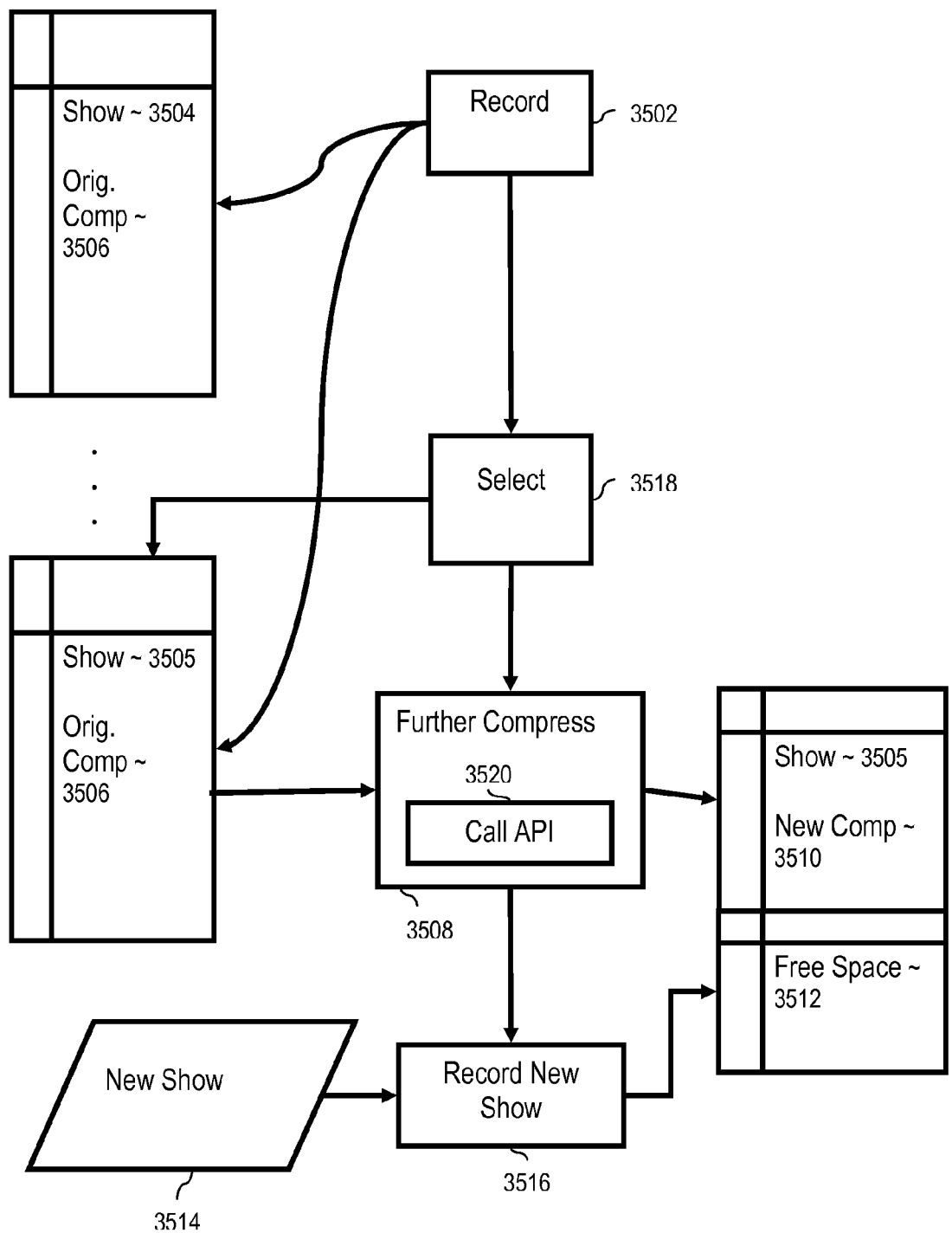
FIG. 35 is a flow chart depicting an exemplary method of further compressing a show.

FIG. 35 depicts a method for automated personal video recording that includes recording 3502 shows (3504, 3505), where each show has an original compression level 3506. Compression level values generally, including the original compression level 3506 of this embodiment, can be stored, for example, in a compression field such as the one illustrated at reference 279 in the show record 240 in the example data structures in FIGS. 3 and 27. The method of FIG. 35 includes further compressing 3508 a recorded show 3505 to a new compression level 3510, the new compression level being higher than the recorded show's original compression level, thus making free space 3512 available for recording. The method of FIG. 35 also includes recording 3516 at least part of a new show 3514 in free space 3512 made available by further compressing the recorded show 3505.

The need to make additional free space available for recording can arise in several ways. Additional free space is needed for scheduled recording and for preference recording when, for example, a show to be recorded for a user has a storage space requirement larger than the user's free space. Additional free space is needed for apportioning and reapportioning shows' storage space requirements among group members, when, for example, an apportioned amount of a storage space requirement exceeds a member's free space. Additional free space is needed for apportioning and reapportioning group loan amounts among group members, when, for example, an apportioned amount of a loan exceeds a member's free space.

Figure 36:
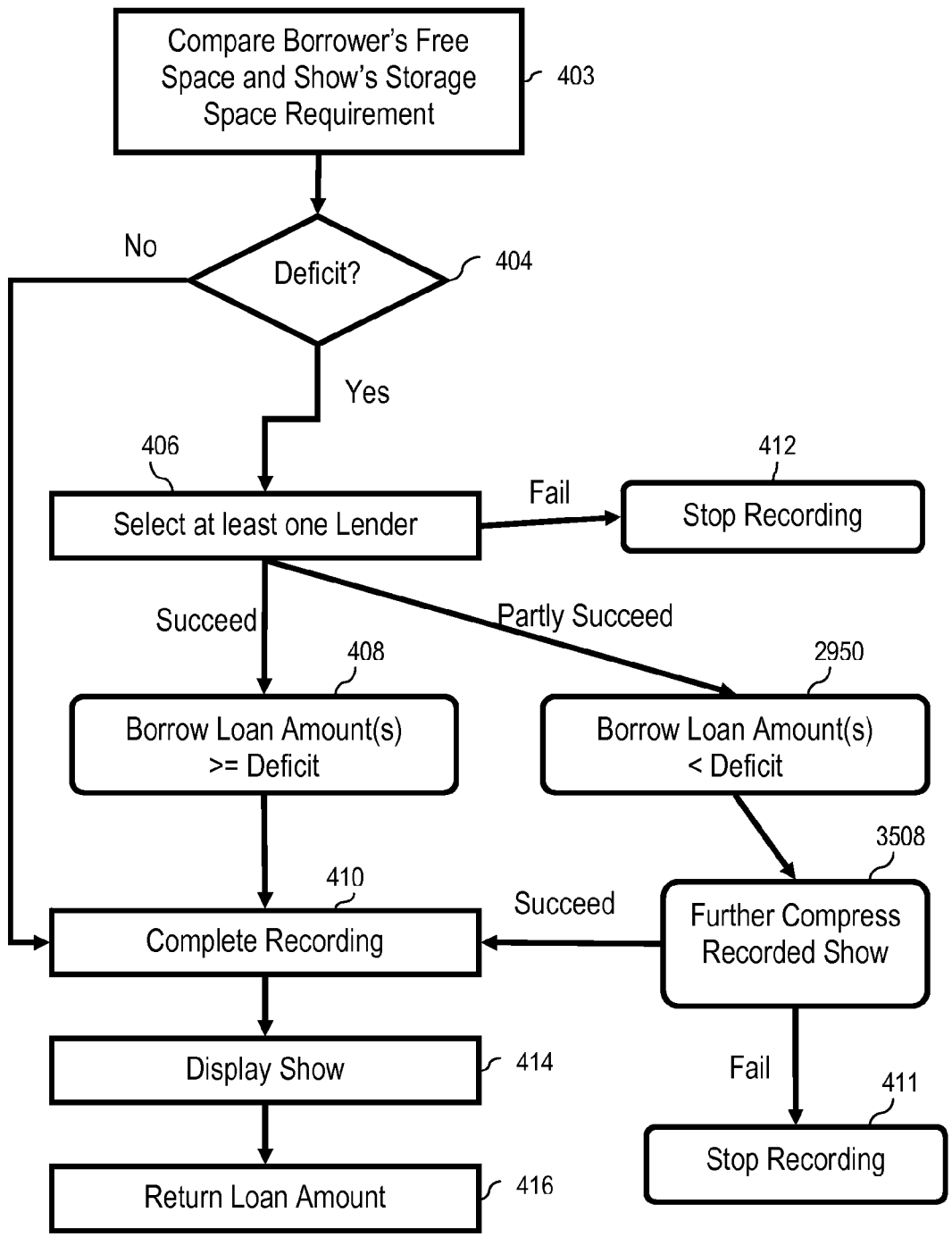
FIG. 36 is a flow chart depicting an exemplary alternative method of borrowing a loan amount of storage space, less than a deficit amount, and further compressing a recorded show.

FIG. 36 depicts a method of personal video recording in which a show's storage space requirement is compared 403 with a borrower's free space. When the borrower's free space is less than the show's storage requirement, that is, when a deficit exists 404, the method proceeds by selecting 406 lenders. In a similar method discussed above in connection with FIG. 4, when lenders are successfully selected, a PVR according to this embodiment borrows a loan amount at least covering the deficit 408 and proceeds with recording 410. If no lender is found, recording stops 412. In the method of FIG. 36, however, there is an additional alternative. The method of FIG. 36 includes borrowing less than the deficit 2950, further compressing 3508 a recorded show, and then proceeding with recording 410. Further compressing 3508 a recorded show includes freeing a sufficient quantity of displayed space so that the displayed space so freed in combination with the borrowed 2950 loan amount is sufficient to meet the deficit. In use of the method of FIG. 36, it is only necessary to stop recording 411 in the event that both borrowing 2950 and further compressing 3508 recorded shows fail to provide sufficient free space to meet the deficit.

In addition to the method of further compressing recorded shows, PVRs can implement also the method of FIG. 29 comprising freeing displayed space 2706. In such PVRs, it is only necessary to stop recording 411 in the event that the combination of borrowing 2950, freeing displayed space 2706, and further compressing recorded shows 3508 fails to provide sufficient free space to meet a deficit.

A further kind of embodiment, illustrated also in FIG. 35, includes selecting a recorded show to be further compressed. Selecting the recorded show can include selecting a show having an original compression level lower than a highest supported compression level in a PVR. The recorded show's 'original' compression level is the compression level presently stored in the compression field 279 show's show record 240. Regarding the relationship between the original compression level and the highest supported compression level, consider, for example, compression level table 602 in FIG. 10b. Assume for explanation that the original compression level is '320:1,' indicating the compression level whose affecting factors are listed in record 606 of table 602, including MPEG-2 encoding, a frame rate of 30 frames per second, a resolution of 352×240, and so on. The compression level of '320:1' is relative to raw video. The same compression level is '4' relative to an NTSC source stream identified in record 604 of table 602.

The highest supported compression level, in this example context, is '20480:1.' 'Highest supported compression level' means the highest level for which a PVR has a codec capable of handling the show's present encoding as an input and producing a more compressed encoding of video as output. In this example context, such a 'highest supported compression level' is indicated in record 614 of table 602. As long as the show's original compression level is less than a highest supported compression level, the show is a candidate for further compression. In this example, as among several candidate shows, selecting a show for further compression includes selecting the first show among the candidates having an original compression level lower than a highest supported compression level in a particular PVR according to an embodiment of the present invention.

The method of FIG. 35 includes further compressing a recorded show. The recorded show comprises an original video file, 'original' in the sense that it is in a beginning condition for the current process of further compression. As shown in FIG. 35, one way to further compress the original video file is to issue calls 2722 to software routines in an application programming interface ("API") for a codec. There are many APIs for codecs. Most, if not all, codecs have associated APIs. Examples of APIs for codecs, as mentioned earlier, include 'Video For Linux,' Microsoft's 'Video For Windows™,' and the Sun Microsystems's 'Java Media Framework™.'

Figure 37:
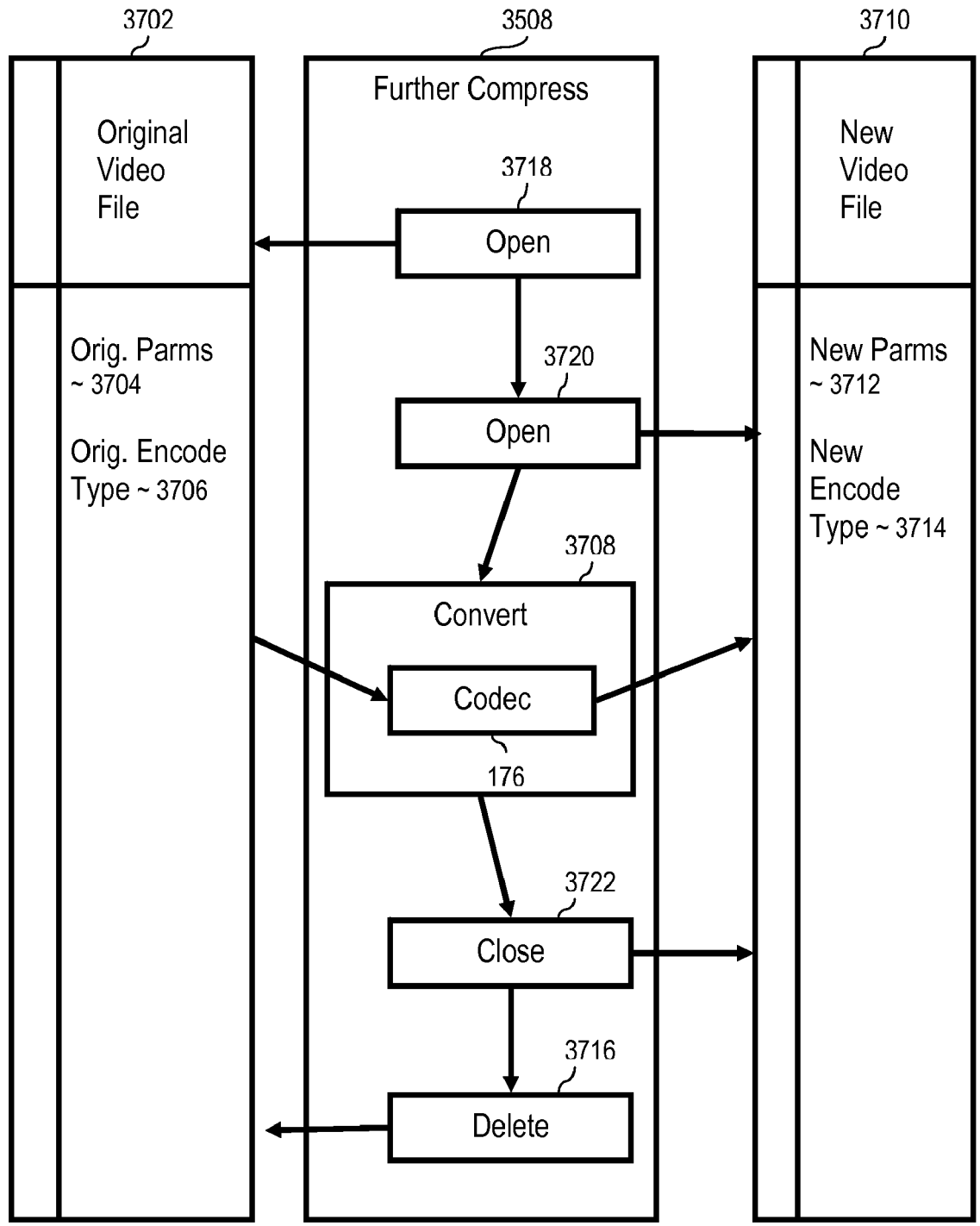
FIG. 37 is a flow chart depicting a further alternative exemplary method of further compressing a show.

FIG. 37 depicts a method of further compressing 3508 a recorded show comprising an original video file 3702. The method of FIG. 37 is implemented by application programming that itself directly manipulates video files or manipulates video files through calls to codecs' APIs. Although it is possible through application programming to manipulate video files directly, because of the complex structure of most video encoding formats, it is quite likely that most embodiments will implements codecs and codec APIs. In the following discussion, the use of codecs and codec APIs is assumed.

In the method of FIG. 37, a recorded show comprises an original video file 3702 having original encoding parameters 3704 including an original encoding type 3706. Examples of encoding type include MPEG-1, MPEG-2, MPEG-4, MJPEG, DVD, and so on. Further compressing 3508 the recorded show includes opening 3718 the original video file 3702, opening 3720 a new video file 3710, converting 3708, through a codec 176, the original video file 3702 into a new video file 3710 having new encoding parameters 3712.

Encoding parameters implement factors affecting compression level, including, as illustrated, for example, in FIGS. 10a and 10b, encoding type 424, color space size 426, frame rate 428, resolution 430, and audio quality 432. The new encoding parameters may optionally include a new encoding type 3714, although it may or may not be necessary to change encoding type in order to achieve a higher compression level. In the sequence of compression levels depicted in table 602 in FIG. 10b, for example, beginning with an original compression level of 320:1 for the MPEG-2 encoding type, there are two higher compression levels having the MPEG-2 encoding type (represented by records 608 and 610) that can be used before there is a need to change to MPEG-1 (record 612) or MJPEG (record 614) in order to obtain even higher compression.

In addition, when changing encoding types, it may or may not be necessary to change codecs. At least some codecs that handle MPEG-2 also handle MPEG-1, for example. Our system block diagram in FIG. 2a depicts only one codec 176, but that illustration is for convenient explanation, not for limitation. PVRs according to embodiments of the present invention often will implement more than one codec. In situations requiring changes in encoding type to achieve higher supported compression levels, a series of codecs are used to convert from one encoding type or compression level to another.

The method of FIG. 37 includes closing 3722 the new video file 3710 and deleting 3716 the original video file 3702. The PVR may give the new video file 3710 a filename different from the filename of the original video file 3702, and, to the extent that it does so, then the PVR can be programmed to update the filename field 242 in the show record 240 with the new filename of the new video file 3710. In addition, the PVR also is programmed to update the compression field 279 on the show record 240 with the new compression level resulting from the change in the encoding parameters.

Regarding changing compression levels, our discussion thus far has centered on changes for existing recorded shows. It would be useful also, however, to have ways of changing compression level during recording, if, for example, a need for additional free space is discovered during a check of an estimated storage space requirement. If there were at that time no other useful or desirable way of quickly freeing space for continuing recording, it would be useful to be able to increase compression 'on-the-fly,' so to speak.

Figure 38:
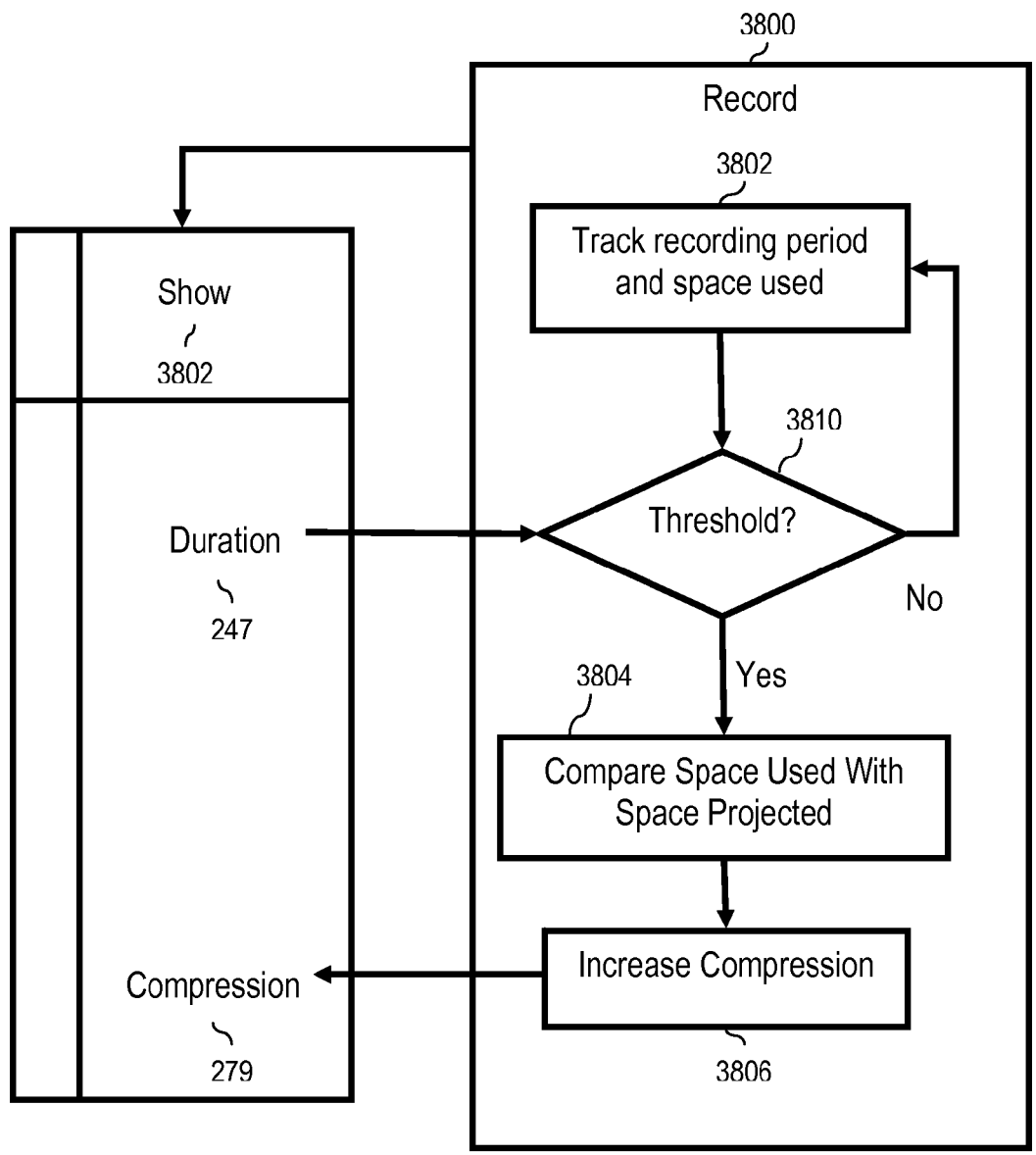
FIG. 38 is a flow chart depicting an exemplary method of increasing compression level while recording a show.

FIG. 38 depicts a method for administration of storage space requirements on a PVR that includes recording 3800 a show 3802 having a compression level 279 and increasing 3806 the show's compression level 279 while recording 3800. The show includes a duration 247 and increasing 3806 the show's compression level includes tracking 3802 a recording period for the show and tracking actual storage space used during the recording period. When the tracked recording period is at least equal to a space check threshold multiplied by the duration 3810, the method of FIG. 38 proceeds to compare 3804 the storage space used with an amount of storage space projected to be used during the tracked recording period. If the storage space used is greater than the storage space projected to be used, the method increases 3806 the show's compression level.

Figure 39:
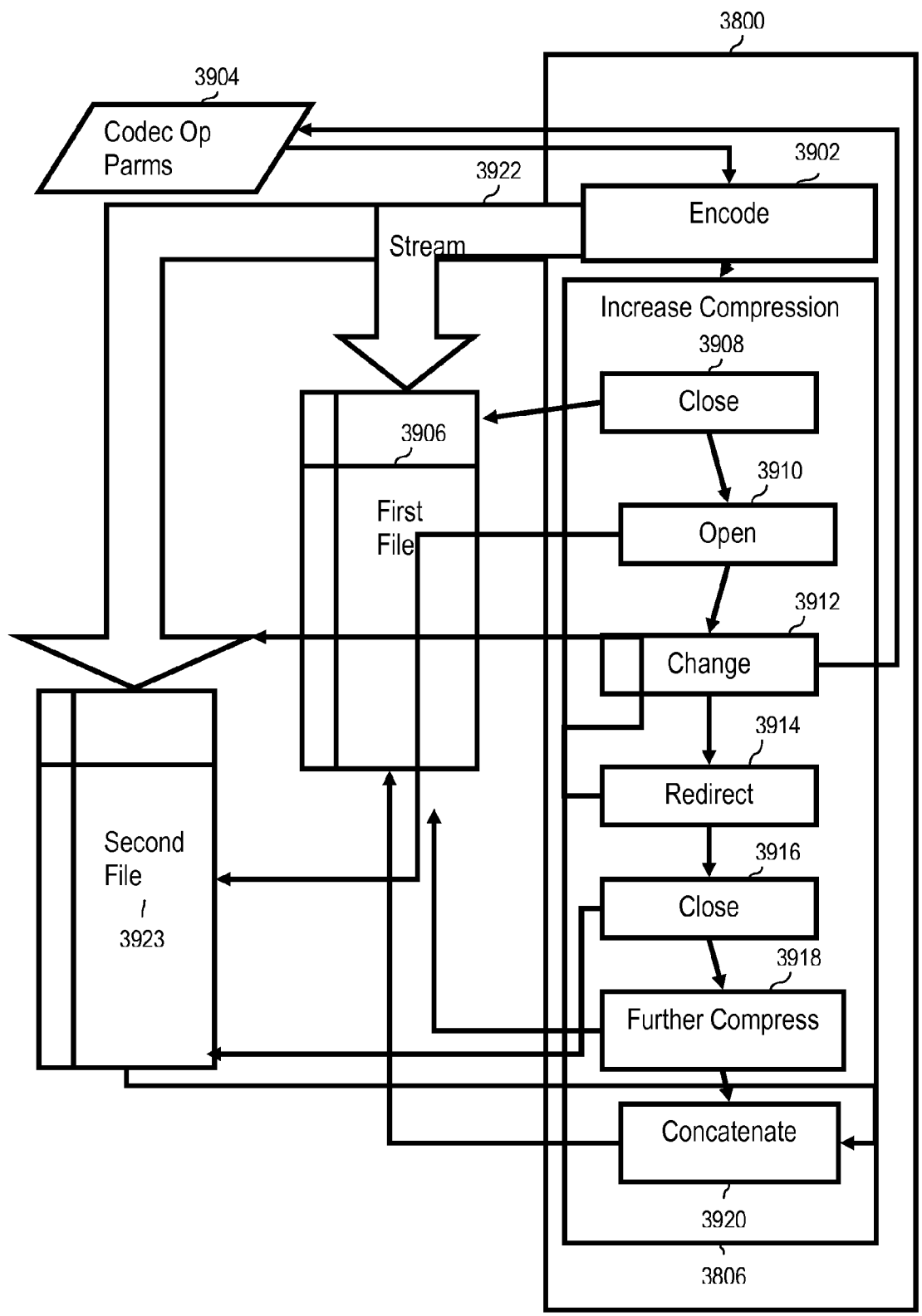
FIG. 39 is a flow chart depicting an exemplary method of increasing compression level while recording a show.

FIG. 39 depicts a more detailed exemplary method of increasing 3806 a show's compression level during recording. The method of FIG. 39 includes recording 3800 a show includes encoding 3902 a video stream 3922 through a codec (not shown) to a first video file 3906. The encoding 3902 is carried out in dependence upon values of factors affecting compression level, that is, in dependence upon codec operating parameters 3904. In the method of FIG. 39, increasing 3806 the show's compression level includes closing 3908 the first video file 3906, opening 3910 a second video file 3923, and changing 3912 the values of the codec operating parameters 3904, thereby changing the compression level of the second video file with respect to the first video file.

More particularly, the codec operating parameters are changed so as to increase the compression level. Again with reference to FIG. 10b, consider an example in which the first video file is encoded with codec operating parameters that effect the compression level identified by record 606 in table 602. That is, the codec is an MPEG codec set to encode an MPEG-2 video file having a frame rate of 30 frames per second, a resolution of 352×240, and so on, all resulting in a compression level of 320:1 with respect to raw NTSC video. Changing 3912 the values of the codec operating parameters 3904 to increase the compression level from 320 to 1280 then includes calling the codec API with the new operating parameters of record 608, that is, in this example, changing the resolution to 180×120.

The method of FIG. 39 includes calling the codec API with a filename for the second video file, thereby redirecting 3914 the video stream 3922 to the second video file 3923. The method also includes closing 3916 the second video file 3923 at the end of the show and further compressing 3918 the first video file 3906 to the compression level of the second video file. The first video file 3906 is stored at its original compression level. If the show as a whole is to be effectively compressed so that it can be decoded for display through a single codec, it is useful to convert the entire show, including the first portion of the show stored in the first video file to the new higher compression level of the second video file.

Alternatively, it is possible within the scope of the present invention to leave a single show fragmented among more than one video file, each video file having different encoding parameters. PVRs implementing this alternative then would need to expand the data structures representing shows (see FIG. 3) to include file-related information, such as file name and compression level, for each file comprising a show. Such PVRs will need to be programmed to change files, change parameters, and perhaps even change codecs to decode, during display, a show comprising more than one video file.

Among embodiments that leave a show fragmented among more than one video file, recording is simplified by reducing, or even eliminating, the need to further compress the first video file to the compression level of the second video file and concatenate the two files. On the other hand, decoding a show for display is easier if the show is encoded at record time into a single video file, because there is no need during playback to track and change video files, change codec parameters, or change codecs. In addition, further compressing the first video file at record time increases the amount of free space made available by changing to a higher compression level. Some increases in compression level, such as, for example, changes in audio quality, have no effect on video playback quality, although they may affect other aspects of playback. Nevertheless, leaving the show fragmented in more than one file having more than one compression level may affect display quality if the show is later replayed, changing display quality when playback changes from the first video file to the second video file, particularly when changes in resolution or frame rate were required in order to effect a particular increase in compression level.

The exemplary method of FIG. 39 includes further compressing 3918 the first video file 3906 and concatenating 3920 the second video file 3923 to the first video file 3906. Concatenating the video files typically includes calls to codec APIs to effect orderly changes in sequence headers, GOP headers, and so on. Although we refer in this specification to concatenating the two video files, readers of skill in the art will recognize that in fact such concatenating may include combining through a codec two source streams from the first video file and the second video file into a target stream directed to a third video file.

We have now discussed in this disclosure several ways of further compressing or increasing compression of shows in PVRs. Many ways of further compressing or increasing compression of shows in PVRs will occur to those of skill in the art, and all such ways are well within the scope of the present invention.

Messaging

Users will operate the PVR controls described above in connection with FIGS. 1a and 1b to control a PVR and to track the operations of a PVR. PVR operations can be so complex, however, that it would be advantageous for users to have improved ways of tracking and controlling PVR operations. It would particularly useful if there were ways for PVRs to utilize means of sending and receiving messages to and from users regarding PVR operations.

Figure 40:
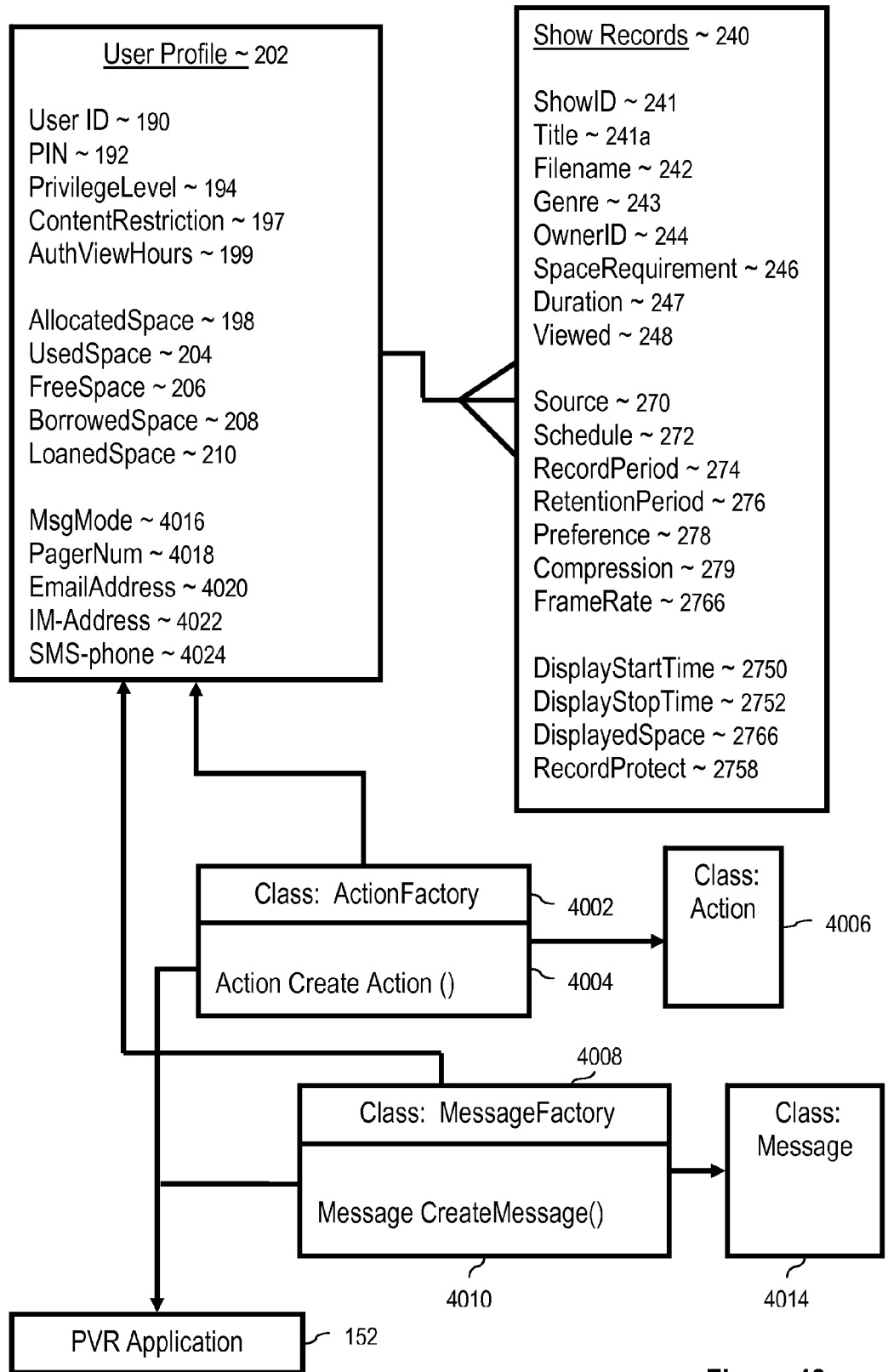
FIG. 40 is a diagram illustrating exemplary relations among classes for actions and messages and data structures for user profiles and show records.
Figure 41:
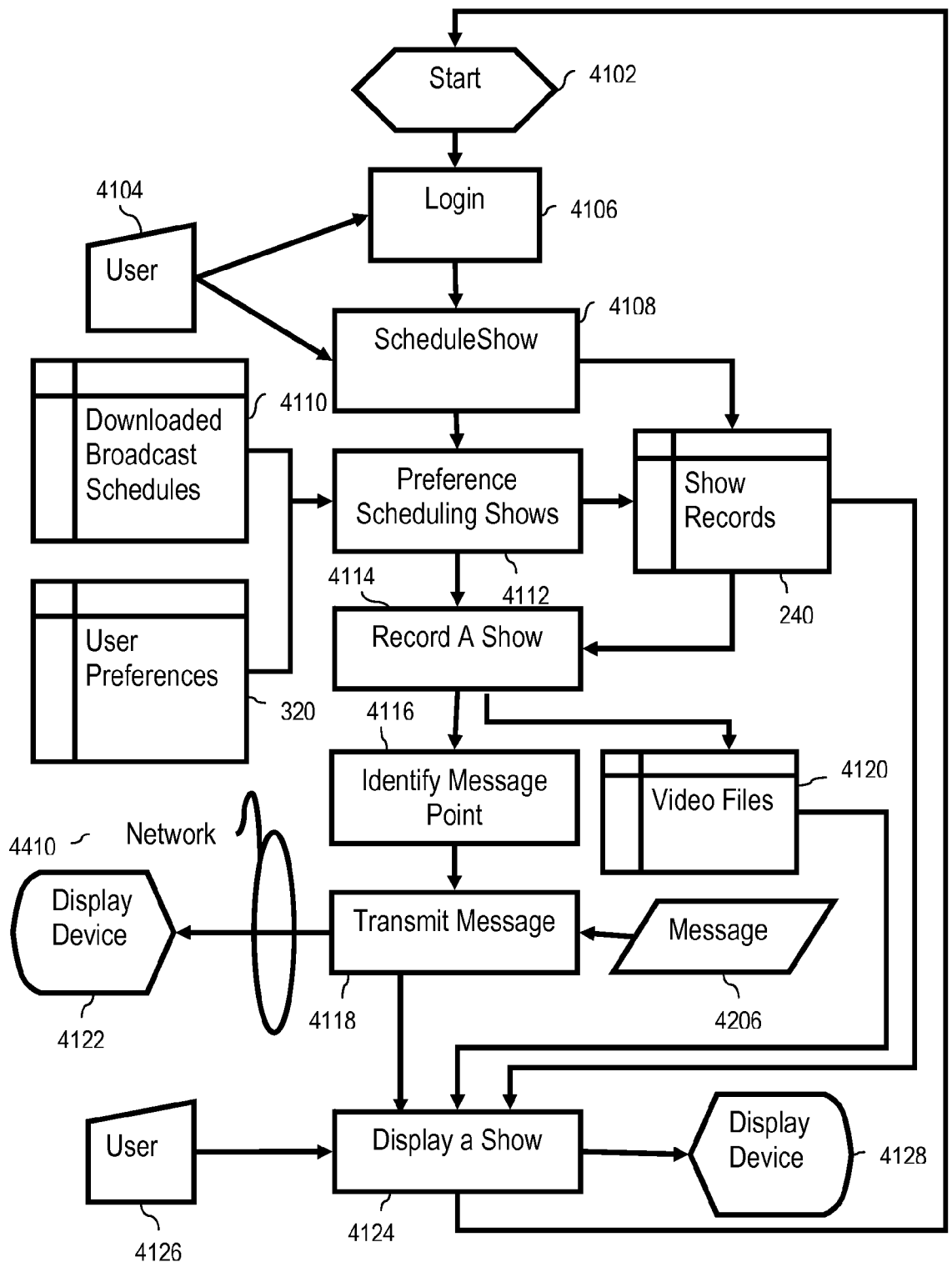
FIG. 41 is a flow chart illustrating a method of personal video recording that includes identifying message points and transmitting messages.

FIG. 41 illustrates in a flow chart a method of controlling operation of a PVR that includes identifying 4116 a message point in operation of a PVR and transmitting 4118 a message. The message typically communicates a description of PVR operations or requests control instructions from a user. The user to whom the message is directed is usually a user identified as having responsibility for a show, that is, in terms of our exemplary data structures, the user identified in the ownerID field 244 in a show record 240 of the kind illustrated in the example data structures of FIG. 40. In our discussion of messaging generally, references to example data structures are usually references to the example data structures of FIG. 40.

Messages have many purposes, are of many types, and have data structures appropriate to their types and purposes. A message point is a point in PVR operations when it is useful to send, or at least consider transmitting, a message of a particular type for a particular purpose.

Some messages are transmitted as 'posts', asynchronous, non-blocking messages. PVR operations do not pause to wait for a response to such messages. Messages transmitted as posts typically include notifications of routine operations, such as, for examples, messages advising that a scheduled show has been recorded on schedule. Some messages are transmitted as 'sends,' synchronous, blocking messages, for which PVR operations are paused for at least some period of time to give a user an opportunity to respond with control instructions, before the PVR proceeds with a previously defined default action. An example of a message that can be sent as a synchronous, blocking message is a message asking for instructions whether to compress a show that has not yet been viewed by its owner in order to make free space available in which to record another show.

In this disclosure, we use with particularity the terms 'send,' 'post,' and 'transmit.' 'Send' generally refers to transmitting to a user a blocking, synchronous message prompting for a response. 'Post' generally refers to transmitting to a user a nonblocking, asynchronous message that does not prompt for a response. 'Transmit' generally refers to the process of conveying or communicating a message. Defining these terms in this way for this discussion allows terminology such as, 'transmit a send message for a message point to a user,' 'the count of the number of times a message associated with a particular message point has been transmitted to a user as a post,' and so on.

Messages can be implemented procedurally, in languages like C, Cobol, or Fortran. Or messages can be implemented as objects in an object-oriented language such as C++ or Java. For procedural languages, the PVR application software itself typically will need to be aware of message attributes, whether a message is blocking or non-blocking, timeout period, message transmission mode, and so on. In object-oriented messages, it is a message class or message object itself that typically knows the message attributes, insulating the application level from message details.

Many PVR applications (152 on FIG. 2*a*) are implemented in an event-driven fashion, but for convenience of explanation, FIG. 41 uses an exemplary control loop to illustrate several typical operations of a PVR. The method of FIG. 41 includes logging in 4106 a user 4104. The method of FIG. 41 includes scheduling 4108 a show 240 in response to user direction 4104. The method also includes preference scheduling 4112 a show in dependence upon downloaded broadcast schedules 4110 and user preferences 320. The method includes recording 4114 a show 240 in a video file 4120. The illustrated method includes identifying a message point 4116 and transmitting a message 4118. The method of FIG. 41 includes displaying 4124 upon a display device 4128 a show 240 from a video file 4120 as instructed by a user 4126.

Transmitting a message 4118 can be carried out in a variety of ways. FIG. 41 notes a networked message 4410, and many messages will be transmitted across networked means of data communications, including, for example, as will be discussed in more detail below, pager messages, instant messaging using instant messaging protocols, email, and messages using 'SMS,' the 'Small Message Service' protocol. Many messaging protocols support two-way messaging, so that PVRs according to embodiments of the present invention can both transmit information to users and receive controlling responses from users.

The identified message point 4116 in the method of FIG. 41 is inserted after recording steps (4112, 4114) and before a display step 4124. Message points, however, can be inserted anywhere in PVR operations. Here are several examples of messages of several types and purposes, inserted at various exemplary message points in PVR operations:

Example message: "Recorded 'TitleOfShow' on schedule." This message has a message point in PVR operations just after the PVR records the show identified in the message. The PVR application obtains the title of the show from the title field 241*a* in the show record 240 and inserts the title as a substring in the main message test string. This message is implemented as a 'post,' asynchronous, non-blocking, not requesting a control response from the user to whom the message is directed.

Example message: "Preference recorded comedy genre show 'Friends'" This message has a message point in PVR operations just after the PVR records the show identified in the message. The PVR application obtains the title of the show from the title field 241*a* in the show record 240 and inserts the title as a substring in the main message test string. The PVR application software obtains the genre of the show from the genre field 243 in the show record 240. This message is implemented as a 'post,' asynchronous, non-blocking, not requesting a control response from the user to whom the message is directed.

Example message: "Borrower 'SoAndSo' viewed a show recorded in space borrowed from you. X megabytes of your loaned space has been repossessed." This message has a message point in PVR operations just after the PVR displays the show to the borrower. The PVR application obtains the identity of the borrower and the loan amount X from a loan record (230 on FIG. 3). The message is transmitted to the lender identified in the loan record. The message can include the title of the show, which is also on the loan record, in our example data structures at least, but this PVR assumes that the lender does not care what the borrower is watching as long as the lender's loaned space is returned in due course. This message is implemented as a 'post,' asynchronous, non-blocking, not requesting a control response from the user to whom the message is directed.

Example message: "Cannot detect your cable box." This message is directed to a user identified in a user profile 202 as having administrative privileges or to a user identified in a PVR profile 300 as being responsible for PVR operations. This message has a message point in PVR operations just after a PVR boots. This message is implemented as a 'post,' asynchronous, non-blocking, not requesting a control response from the user to whom the message is directed. This does not mean that the user will take no action. In likelihood, the user will reboot the cable box or phone the cable company. But the PVR will not synchronously block operations during the message to wait for user action.

Example message: "Non-conflictive schedule change: 'Buffy, The Vampire Slayer' is rescheduled to 8:00 p.m. The new schedule presents no conflicts with other shows. Recording will proceed at the new time." This message has a message point in PVR operations just after the PVR downloads a broadcast schedule from a content source and compares the broadcast schedule to the recording schedules 272 in the show records 240. The message is directed to the user identified in the ownerID field 244 in the show record 240. The title 241*a* also is from the show record. This message is implemented as a 'post,' asynchronous, non-blocking, not requesting a control response from the user to whom the message is directed.

Example message: "Conflicting schedule change: 'Buffy, The Vampire Slayer' is rescheduled to 8:00 p.m. The new schedule conflicts with your scheduled recording of "Dukes of Hazzard." You have thirty seconds to respond. Receiving no response, the default procedure is to record the 'Dukes of Hazzard.' Should the recording schedule default to 'Dukes of Hazzard?' Your response (Y/N): _____." This message has a message point in PVR operations just after the PVR downloads a broadcast schedule from a content source and compares the broadcast schedule to the recording schedules 272 in the show records 240. The message includes a default action, in this example, recording the show originally scheduled for the slot in question. The message is directed to the user identified in the ownerID field 244 in the show record 240 for either show, because the same user 'owns' both shows. There are two titles concatenated into the message, both from the title fields 241*a* in the respective show records 240 for the two shows. There are two schedules, one for each show, but they are either identical or overlapping, so that this particular example message only includes one of them, but it can be read by the PVR from either schedule field 272 in the show record 240 for either show. This message is implemented as a 'send,' synchronous and blocking during the timeout period of thirty seconds.

Example message: "Conflicting schedule change: 'Buffy, The Vampire Slayer' is rescheduled to 8:00 p.m. The new schedule conflicts with Mary Jones' scheduled recording of "Dukes of Hazzard." You have thirty seconds to respond. Receiving no response, the default procedure is to record 'Buffy, The Vampire Slayer.' Should the recording schedule default to 'Buffy, The Vampire Slayer?' Your response (Y/N): _____." This message has a message point in PVR operations just after the PVR downloads a broadcast schedule from a content source and compares the broadcast schedule to the recording schedules 272 in the show records 240. In this example, there are two owners, one for 'Buffy,' another for 'Dukes.' The message is directed to the owner having the higher privilege level. The message includes a default action, in this example, recording the show belonging to the user having the higher privilege level. The PVR reads the owners' privilege levels from field 194 in their respective user profiles 202. There are two titles concatenated into the message, both from the title fields 241*a* in the respective show records 240 for the two shows. There are two schedules, one for each show, but they are either identical or overlapping, so that this particular example message only includes one of them, but it can be read by the PVR from either schedule field 272 in the show record 240 for either show. This message is implemented as a 'send,' synchronous and blocking during the timeout period of thirty seconds. This message resolves a conflict among users on the basis of privilege level. There are many, many ways of resolving such conflicts, as will occur to those of skill in the art, and all such ways are well within the scope of the present invention.

Example message: "'Owner,' who presently is not authorized to borrow your storage space, asks permission to borrow 5 megabytes from you. Timeout is thirty seconds. Default is 'No.' Your current free space is 125 megabytes, enough for about 10 hours of recording. Lend 5 megabytes to 'Owner?' Your response (Y/N): _____." This message has a message point in PVR operations just after at the beginning of a recording step when a comparison of the owner's free space and the storage space requirement for a show evidence a deficit. The proposed loan amount, 5 megabytes, is the deficit amount. This message is directed to a selected prospective lender. The lender is selected, for example, by the prospective borrower, in this example, 'Owner,' or, for another example, by the PVR according to which user has the most free space at the moment. There are many ways to select a prospective lender, and they are all well within the scope of the invention. This message is implemented as a 'send,' synchronous and blocking during the timeout period of thirty seconds, having a default action of refusing the loan.

Example message: "'Junior' has authorized viewing hours beginning at 6:30 p.m. Junior is requesting a logon to watch television at 6:15 p.m. Timeout on this message is thirty seconds. Default is 'No.' Allow login? Your response (Y/N): _____." This message has a message point in PVR operations during a logon process, such as the one depicted at reference 4106 in FIG. 41. The message is directed to a user identified in a user profile as having administrative privileges. The PVR reads the authorized viewing hours, for example, from a user profile field such as AuthViewHours 199 in user profile 202 on FIG. 40. This message is implemented as a 'send,' synchronous and blocking during the timeout period of thirty seconds, having a default action of refusing the logon.

Example message: "'Junior' has a viewing restriction that excludes the 'Adult' genre. 'Junior' just attempted to schedule a show having the 'Adult' genre. The schedule request was rejected." This message has a message point just after a scheduling step such as the one illustrated at reference 4108 in FIG. 41. The message is directed to a user having administrative privileges. This message is implemented as a 'post,' asynchronous, non-blocking, not requesting a control response from the user to whom the message is directed. This does not mean that the user will take no action. If, for example, the administrator to whom the message is directed is Junior's father or mother, then in all likelihood, quite a lot of action will result.

Example Message:
"You have 'Buffy, The Vampire Slayer' scheduled to record at 7:00 p.m. For this recording there is a deficit in storage space of 10 megabytes. Your action choices are:
Do not record
Repossess loaned space, 10 megabytes available
Borrow space, 25 megabytes available
Delete your other shows, 30 megabytes available
Recover displayed space, 8 megabytes available
Increase compression of other shows
The default is to not record. If you wish an action other than not recording you should logon to your PVR and order the desired action before 7:00 p.m."

This message has a message point in PVR operations some time after the show is scheduled by a user or is scheduled for preference recording by the PVR. Readers will recall from the detailed description above in this disclosure that discovery of a deficit usually occurs just prior to actual recording of a show, and that also would be a good message point for this message. If the message point were just prior to recording, however, then the user would not have hours or even minutes in which to take action. This message is described as a 'post,' asynchronous, non-blocking, not requesting a control response from the user to whom the message is directed.

If this message had a message point just prior to recording, however, then the message would probably be preferred as a 'send,' synchronous and blocking during a timeout period of, for example, thirty seconds, having a default action of not recording, in which case the message text can appear as follows:
"You have 'Buffy, The Vampire Slayer' scheduled to record at 7:00 p.m. For that recording there is a deficit in storage space of 10 megabytes. Your action choices are:
1. Do not record
2. Repossess loaned space, 10 megabytes available
3. Borrow space, 25 megabytes available
4. Delete your other shows, 30 megabytes available
5. Recover displayed space, 8 megabytes available
6. Increase compression of other shows
The default is choice number 1: Do not record. This message times out in thirty seconds. If you wish an action other than the default, please select it now. Your selection (1-6): _____."

There are many ways of implementing messaging. This disclosure focuses somewhat on two-way messaging because it is so useful for messages implemented as 'sends,' synchronous, blocking messages with timeouts and defaults. In implementations of two-way messaging, PVR application software is programmed to 'parse' a response message by extracting from the text of a response message a meaningful token comprising an identifier for a command or an action to be taken by the PVR upon receipt of a response message.

Messages can be transmitted to wireless pagers identified by telephone numbers. Messages can be transmitted by a PVR application over, for example, the Simple Network Paging Protocol or 'SNPP,' version 3 of which is an enhanced, two-way protocol as defined in RFC1861. RFC1861 is an Internet protocol suite specification document promulgated by the Network Working Group in the Internet Engineering Task Force.

Messages to wireless pages also can be transmitted by a PVR application over, for example, WCTP, the 'Wireless Communication Transfer Protocol.' WCTP also is a two-way messaging protocol. WCTP is designed with the particular intention of using HTTP as its transport mechanism. WCTP is an open, non-proprietary industry standard promulgated by members of the PCIA, the Personal Communications Industry Association.

Messages can be transmitted over HTTP through any of a number of proprietary instant messaging protocols, all of which have application programming interfaces ("APIs") available just for this purpose, that is, for use in messaging applications such as PVRs. Examples of such instant messaging protocols having APIs include those available from American On-Line ("AOL"), Microsoft Network ("MSN"), Yahoo, Imici, Inc., and ICQ, Inc. Instant messaging protocols make user presence detection and two-way instant messaging available between a PVR and users' web browsers on their personal computers as well as microbrowsers on mobile or cellular telephones; wireless, web-enabled personal digital assistants ("PDAs") and laptop computers; and other wireless, web-enabled, portable or handheld devices.

Messages can be transmitted by a PVR application through email to any email client, through SMTP, POP, IMAP or other email protocols, to email clients in any kind of client device, personal computers, laptops, handhelds, cell phones, and so on. Email supports two-way communication. In typical embodiments using email for messaging, a PVR application is enabled as an email 'agent,' a software program to which is assigned an ordinary email account on an email service. In this way, the PVR sends and receives email just like any other email user. When the PVR sends a message to a user through email, the user can press the 'Reply' button on the user's email client and respond to the PVR's email.

Messages can be transmitted by a PVR application through a Small Message Service ("SMS") supported by any telecommunications or telephone service. SMS provides a mechanism for transmitting short messages to and from wireless devices. SMS supports the transmission of short text messages from a PVR to a cellular phone, similar to alpha-numeric paging. SMS makes use of a Small Message Service Center or 'SMSC,' which acts as a store-and-forward system for short messages. In contrast to other existing text-message transmission services such as alphanumeric paging, SMS is a reliable system, providing mechanisms to guarantee delivery of text messages to destinations. Additionally, SMS supports several input mechanisms that allow interconnection with different message sources and destinations. A PVR can, for example, function as a so-called 'External Short Message Entity,' or 'ESME,' and transmit SMS messages as HTTP forms or email messages. A PVR can function as a mobile originator, or 'MO,' that is, SMS-enabled client device or, in effect, a cellular telephone. A distinguishing characteristic of SMS is that an active mobile handset, or effectively a PVR, is able to receive or submit a short message at any time, regardless whether a voice or data call is in progress. This latter feature is very useful in PVRs implementing messages as 'sends,' synchronous, blocking messages with timeouts and defaults.

We just explained four means of messaging: paging, instant messaging, email, and SMS. Persons of skill in the art will think of many other ways of implementing one-way or two-way messaging between a PVR and a user, and all such ways are well within the scope of the present invention.

Again referring to FIG. 41, identifying a message point 4116 and transmitting a message 4118 can be carried out as illustrated by the following exemplary snippet of messaging pseudocode:

```
sendMessage(messageString, userID)
{
   boolean success = false;
   // User probably sysadmin from PVR profile
   UserProfile User = getUserProfile(userID);
   switch(User.MsgMode)
   {
      case PAGER:
         success = sendpager(User.PagerNum, messageText);
         break;
      case EMAIL:
         success = sendmail(User.EmailAddress, messageText);
         break;
      case SMS:
         success = sendSMS(User.SMS-phone, messageText);
         break;
      case INSTANT_MESSAGING:
         success = sendIM(User.IM-Address, messageText);
         break;
   } // end switch( )
   return success; // returns true or false for success or failure
} // end sendMessage( )
```

The following two lines of pseudocode identify a message point in PVR operations, a message point from which a message is sent. The exemplary messaging pseudocode set forth above, sendMessage( ), can be invoked by a call from anywhere within the program code comprising a PVR application program by, for example, code similar to the follow snippet of calling pseudocode.

```
String messageString = "Recorded " + Show.title + " on schedule."
sendMessage(messageString, Show.userID)
```

In using source code of the kind illustrated by the snippets just above, the insertion of calling lines similar to the calling pseudocode identifies a message point. Similarly, the PVR's processor's encountering such calling lines as it processes the software comprising a PVR's application program, identifies a message point. The two exemplary lines of calling pseudocode are simple, but they still require the application level of programming to know or determine rather a lot about the messaging process, including knowing the messaging text itself which is built up by concatenation using the '+' operator on the show title and then passed as a parameter to the sendMessage( ) function.

The sendMessage( ) function itself calls getUserProfile( ) to obtain a copy of the user profile of the user identified in the userID parameter. sendMessage( ) then uses a switch statement, switched on User.MsgMode, the field at reference 4016 in the user profile 202 in FIG. 40, to determine what kind of message to send. MsgMode 4016 is a field that stores a messaging mode, that is, an indication whether a user's preferred messaging is by pager, email, instant messaging, SMS, or other messaging means as will occur to those of skill in the art. The exemplary user profile 202 in FIG. 40 also contains fields for pager number 4018 and email address 4020, as well as an instant messaging address 4022, and a separate telephone number for SMS messages 4024. In contrast with the application level, the messaging function sendMessage( ) knows little about the message text itself, merely receiving the message text in the function parameter, 'messageString.'

In effect, in the operation of this pseudocode, the application level decides the message type and the message content, while the messaging function itself, sendMessage( ), simply looks up the messaging mode and sends the message. It would be useful to have a more independent and flexible messaging functionality. The pseudocode snippets set forth above are procedural in orientation, rather than object oriented. For reasons shown in more detail below, object oriented programming may be a promising way of depicting aspects of messaging.

Figure 42:
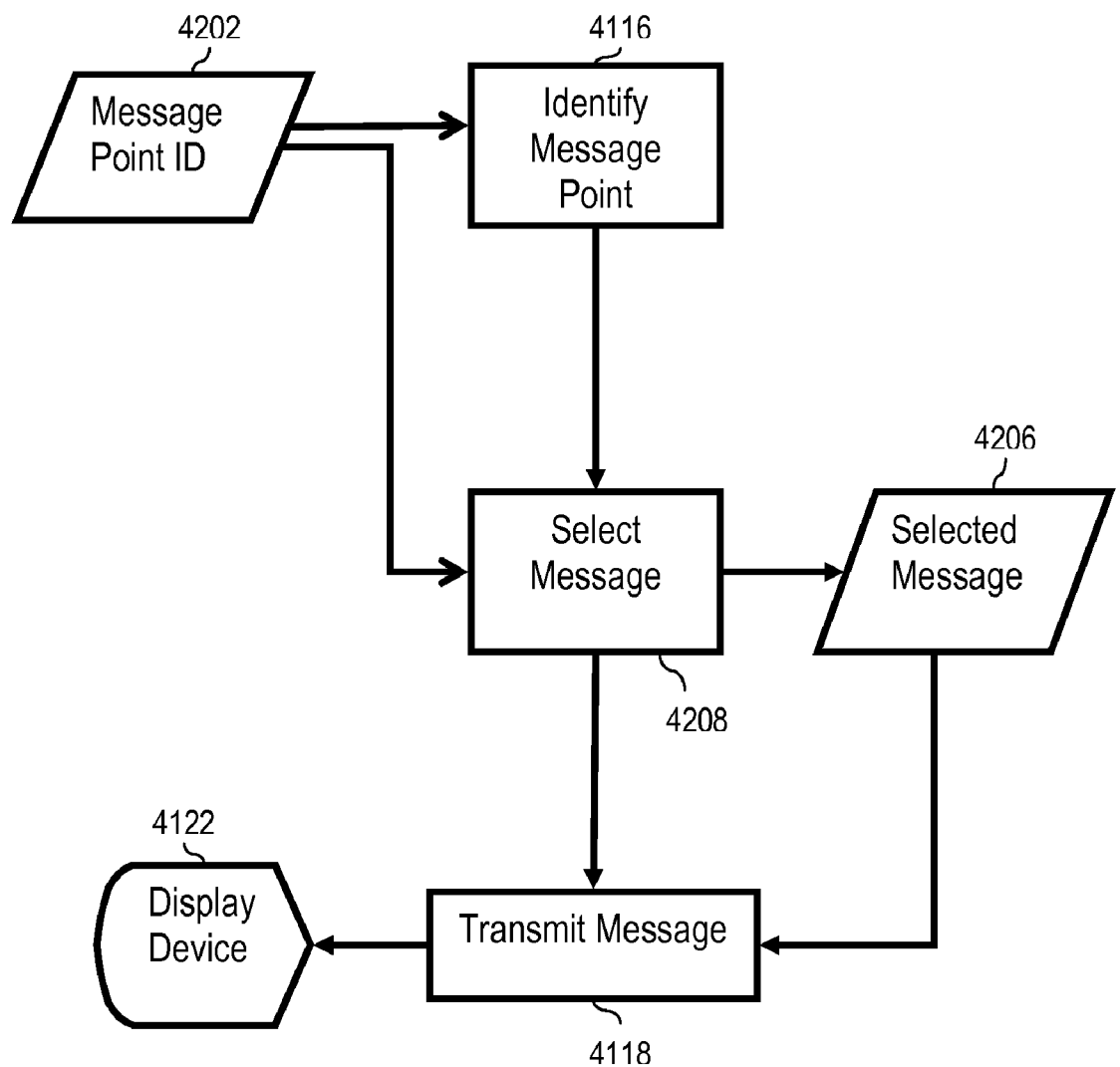
FIG. 42 is a flow chart illustrating a method of identifying message points and transmitting messages.

FIG. 42 illustrates in a flow chart a method of identifying message points 4116 and transmitting messages 4118 in which a message point has an associated message point ID 4202. The method of FIG. 42 then includes selecting 4208, in dependence upon the message point ID 4202, a message 4206 to be sent. In the method of FIG. 42, transmitting 4118 a message includes sending the selected message 4206. Although the method of FIG. 42 can be implemented procedurally in languages like C, Cobol, and Fortran, it is useful to explain the method of FIG. 42 in object-oriented terms. The method of FIG. 42 can be implemented according to the following exemplary pseudocode depicting a concrete message class.

```
//
// message class associated with message point ID "message1"
//
class message1:Message
{
  //
  // send( ) can be a virtual function inherited from an abstract base class
  // if so, override it:
  //
  public int send(userID)
  {
    boolean success = false;
    // User probably sysadmin from PVR profile
    UserProfile User = getUserProfile(userID);
    switch(User.MsgMode)
    {
      case PAGER:
        success = sendpager(User.PagerNum, messageText);
        break;
      case EMAIL:
        success = sendmail(User.EmailAddress, messageText);
        break;
      case SMS:
        success = sendSMS(User.SMS-phone, messageText);
        break;
      case INSTANT_MESSAGING:
        success = sendIM(User.IM-Address, messageText);
        break;
    } // end switch( )
    return success; // returns true or false for success or failure
  } // end send( )
} // end class message1
```

The object-oriented function, that is, the member method, message1.send( ), like the procedural pseudocode function sendMessage( ), accepts a message text string and a user ID as parameters and relies on the calling application code for the message text. A message point for message.sent( ) can be identified by including or encountering the following exemplary pseudocode.

```
Message m = MessageFactoryOne.createMessageObject
(MessagePointID = "MessagePoint1");
m.setMessage("System Error Message: Cannot detect your cable box.");
m.send(userID);
```

In this example, the member methods setMessage( ) and send( ) are initially declared in an abstract class for messages, as depicted in the pseudocode snippet just following this paragraph. The abstract class effectively defines the application interface for concrete message classes that inherit from the abstract class. In fact, this is our definition of these terms: Abstract base classes are not instantiated into objects. Abstract base classes are used in this disclosure only to define interfaces. Concrete classes are classes for instantiation. This is pseudocode, of course, in which we are free to use a variety of common conventions from C, C++, Java, and other sources, so long as our usage is helpful to our readers. It may be worthwhile to point out, however, that 'abstract base class' is C++ terminology for a class whose interface declarations are designed to be inherited by concrete derived classes or 'subclasses.' In Java, such a structure would be called an 'interface' that a Java class 'implements.' In our pseudocode, we use 'abstract base class' because 'interface' has many more alternative meanings depending on context. Here is our exemplary abstract base class for messages:

```
//
// abstract class for messages, declaring the messaging interface
//
class Message
{
  private String messageText;
  //
  // declare virtual function, define in subclasses
  //
  public abstract int send( );
  //
  // in-line declaration and definition of setMessage( )
  // available to all subclasses
  //
  public void setMessage(String messageString)
  {
    messageText = messageString;
  }
}
```

In addition, in this example, the PVR's application code does not know exactly which message class is actually sending any particular message. The member method MessageFactoryOne.createMessageObject( ) is a factory method in a factory class that creates a message object and returns to the calling application code a reference or a pointer to a message class object that will carry out the actual task of sending a particular message. Here is exemplary pseudocode describing a message factory class including a message factory method called createMessageObject( ):

```
//
// Message Factory Class - Example Number One
//
// Defines a parameterized factory method for creating message objects
//
class MessageFactoryOne
{
  public static Message createMessageObject(MessagePointID)
  {
    Message aMessage = null; // establish pointer or reference for new
        object
    switch(MessagePointID)
    {
      case "MessagePoint1": aMessage = new message1; break;
      case "MessagePoint2": aMessage = new message2; break;
      ... ... ...
      case "MessagePointN−1": aMessage = new messageN−1; break;
```

```
        case "MessagePointN": aMessage = new messageN; break;
    } // end switch( )
    return aMessage;
    } // end createMessageObject( )
} // end class MessageFactoryOne
```

The factory method createMessageObject( ) is said to be 'parameterized' in the sense that it accepts a parameter, in this example, the message point ID 'MessagePointID,' and then determines which of many message classes to instantiate and return in dependence upon the parameter. About a dozen different example messages are described above in this disclosure, and a PVR according to embodiments of this invention can have concrete message classes for all those exemplary messages and as many others as persons of skill in the art can design.

We mentioned above that the PVR's application code does not know exactly which message class is actually sending any particular message. Attentive readers will have noticed, however, that MessageFactoryOne implements a one-to-one correspondence between the message point ID and the message type or message class. In this sense, message type and message class are substantially synonymous. This one-to-one correspondence between message point and message type is not required, it is well within the scope of the invention, and it is useful for purposes of explanation. Later we will show how to add program logic to the factory class to usefully decouple the one-to-one relationship between message point ID and message type.

The member method message1.send( ) can operate quite like the procedural function sendMessage( ), with the application level building the message text and the messaging software itself used only to transmit the message. The object-oriented approach, however, can bring more flexibility. Consider the following concrete message class in which the message class itself does the work of building the message text, greatly relieving the burden from the application level which now needs only to identify a message point and call a send( ) method with appropriate parameters.

```
//
// message class associated with message point ID "message2"
//
// message subclass for conflictive changes in show schedule
//
class message2:Message
{
    // override the send( ) function, inherited from the abstract base class
    public int send(showID-1, showID-2)
    {
    boolean success = false;
    FirstShow = getShow(ShowID-1);
    SecondShow = getShow(ShowID-2);
    User = getUser(FirstShow.ownerID); //same ownerID on both shows
    messageText = FirstShow.title + " , originally scheduled for " +
        FirstShow.schedule +
        ", now conflicts with scheduled recording of" +
        SecondShow.title + " at " + SecondShow.schedule +
        ". Unless you change the schedule, your PVR will
        record " + SecondShow.title + ".";
    switch(User.MsgMode)
    {
        case PAGER:
            success = sendpager(User.PagerNum, messageText);
            break;
        case EMAIL:
            success = sendmail(User.EmailAddress, messageText);
            break;
        case SMS:
            success = sendSMS(User.SMS-phone, messageText);
            break;
        case INSTANT_MESSAGING:
            success = sendIM(User.IM-Address, messageText);
            break;
    } // end switch( )
    return success; // returns true or false for success or failure
    } // end send( )
} // end class message2
```

The following lines of pseudocode, inserted in PVR application code, comprise an exemplary identification of a message point and transmission of a message. Using MessageFactoryOne with respect to a message point identified as 'MessagePoint2,' these lines transmit a message using a message object instantiated from the message class 'message2.'

```
Message  m=MessageFactoryOne.createMessageObject
    ("MessagePoint2");
m.send(ShowID-1=Show-1.showID,  ShowID-2=Show-
    2.showID);
```

In this example, the PVR application code has no knowledge of the message text and no knowledge which message class will actually be used to transmit the message. The application code, upon discovering a conflict in schedule, simply sets the showID parameters from the respective show records, identifies a message point in its call to createMessageObject( ), and then calls the send( ) member method. By operation of createMessageObject( ) in MessageFactoryOne, the returned message object 'm' is in fact a message object instantiated from message class 'message2.'

Figure 43:
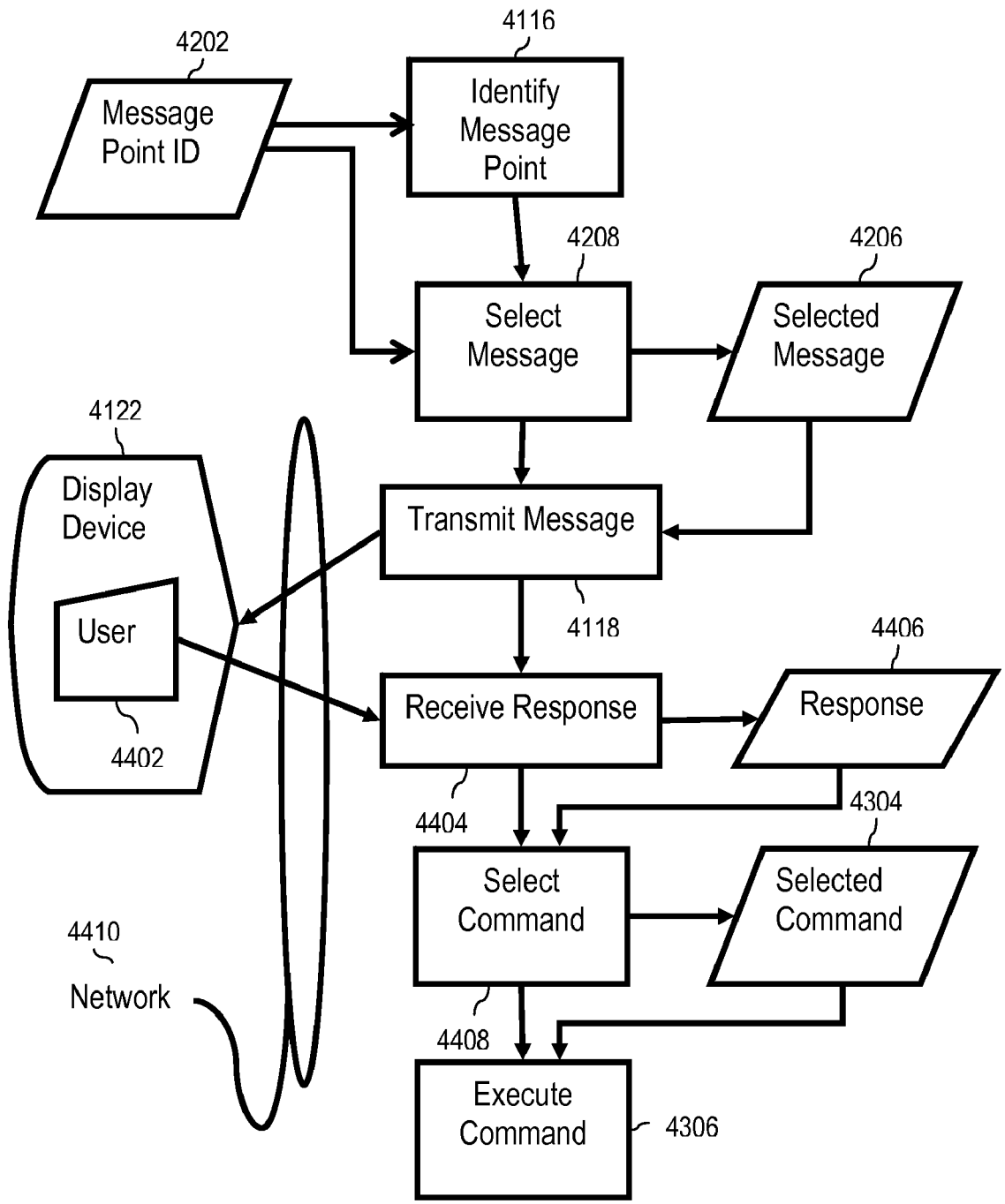
FIG. 43 is a flow chart illustrating a further method of identifying message points and transmitting messages that includes receiving responses.

Because PVRs according to the present invention often support not only one-way messaging, but also two-way messaging, it is useful to be able to select actions or commands in dependence upon users' responses to messages from a PVR. FIG. 43 illustrates in a flow chart a method of identifying message points 4116 in which a message point has an associated message point ID 4202 and the method includes selecting 4208 a message 4206 in dependence upon the message point ID 4202. The method includes transmitting messages 4118. The method of FIG. 43 also includes receiving 4404 responses 4406 to messages 4206, and selecting 4408, in dependence upon a response 4406, a command 4304 to be executed. The method includes executing 4306 the selected command 4304.

One example of how to transmit messages 4118 and receive responses 4404 is set forth in the following pseudocode for a message class for handling the kind of example message described above in which a user is prompted to select a method of making available more storage space for recording a show.

```
//
// message class "message3"
//
// a derived concrete message class for
// making available more storage space
//
class message3:Message
{
    // override the send( ) function, inherited from the abstract base class
    public int send(showID, deficit)
    {
        int success = 0;
        int TimeOutPeriod = 30000; // milliseconds, i.e., 30 seconds
        int response;
```

```
            Show = getShow(showID);
            User = getUser(Show.ownerID);
            messageText = "You have" + Show.title + scheduled to record
                at " + show.schedule + ". For this recording there is a
                deficit in storage space of " + deficit + "megabytes.
                Your action choices are:
                1. Do not record
                2. Repossess loaned space, 10 megabytes available
                3. Borrow space, 25 megabytes available
                4. Delete your other shows, 30 megabytes available
                5. Recover displayed space, 8 megabytes available
                6. Increase compression of other shows
                The default is choice number " + default + ". This
                message times out in " + TimeOutPeriod + " seconds.
                If you wish an action other than the default, please
                select it now. Your selection (1-6): ____
        switch(User.MsgMode)
        {
            case PAGER:
                success = sendpager(User.PagerNum, messageText);
                break;
            case EMAIL:
                success = sendmail(User.EmailAddress, messageText);
                break;
            case SMS:
                success = sendSMS(User.SMS-phone, messageText);
                break;
            case INSTANT_MESSAGING:
                success = sendIM(User.IM-Address, messageText);
                break;
        } // end switch( )
        if(success) // message sent
        {
            // sleep for 30 seconds
            sleep(TimeOutPeriod);
                // then return user's response;
                return(response = getResponse( ));
        }
            else // message failed
            return success; // returns 0 if failure
        } // end send( )
} // end class message3
```

The following lines of pseudocode, inserted in PVR application code, identify a message point, that in operation of MessageFactoryOne, results in utilization of message class 'message3.'

Message  m=MessageFactoryOne.createMessageObject
        ("MessagePoint3");
    ActionID=m.send(ShowID, DeficitAmount);

In this example, the PVR application code has no knowledge of the message text and no knowledge which message class will actually be used to transmit the message. The application code, upon discovering a the existence of a deficit, sets the showID parameter from the pertinent show record and the DeficitAmount parameter from the calculation of the deficit, identifies a message class with a call to createMessage Object( ), and then calls the send( ) member method. In this example, the send( ) method implements two-way messaging and returns a user's response as an action ID.

The method of FIG. 43 includes receiving 4404 responses 4406 to messages 4206, and selecting 4408, in dependence upon a response 4406, a command 4304 to be executed. The action ID returned in response to message3.send( ) is an example of receiving 4404 a response to a message 4206. A way of selecting 4408, in dependence upon such a response 4406, a command 4304 to be executed is illustrated by the following pseudocode:

Action a=ActionFactory.createActionObject (actionID);
    a.takeAction(showID);

The member method ActionFactory.createActionObject (actionID) is a factory method defined in the following pseudocode for an exemplary action factory class:

```
//
//  Action Factory Class
//
//  Defines a parameterized factory method for creating action objects
//
class ActionFactory
{
    public static Action createActionObject(actionID)
    {
        Action anAction = null;  // establish pointer or reference for
        new object switch(actionID)
        {
            case 1: anAction = new Action1; break;
            case 2: anAction = new Action2; break;
            ... ... ...
            case N-1: anAction = new ActionN-1; break;
            case N:   anAction = new ActionN; break;
        } // end switch( )
        return anAction;
    } // end createActionObject( )
} // end class ActionFactory
```

The exemplary member method ActionFactory.createActionObject(actionID) is a parameterized factory method that functions by creating a new concrete action class object selected in dependence upon the action ID provided as a parameter. Set forth below are examples of action classes, one abstract, several concrete, that are useful, for example, in carrying out actions or commands selected by users in response to messages, such as, for example, responses to messages transmitted by message3.send( ).

```
//
//   abstract action class
//
class Action
{
    //
    //  declare virtual function, define in subclasses
    //
    public abstract boolean takeAction(showID) == 0;
}
```

The next example class set forth just below is a pseudocode example of a concrete class having a member method that carries out the action associated with the first choice presented to the user in message3.send( ). That is, the following example class is designed to carry out the default action of not recording the show in question.

```
//
// concrete action class for action 'Do not record'
//
class Action1:Action
{
    //
    // define virtual function from abstract Action class
    //
    public boolean takeAction(showID)
    {
        boolean success = false;
        return(success = deleteShow(showID));
    }
}
```

The next example class set forth just below is a pseudocode example of a concrete class having a member method that carries out the action associated with the second choice presented to the user in message3.send( ). That is, the following example class is designed to carry out the action of repossessing loaned space in order to make available free space for recording the show in question.

```
//
// concrete action class for action 'repossess loaned space'
//
class Action2:Action
{
    //
    // define virtual function from abstract Action class
    //
    public boolean takeAction(showID)
    {
        boolean success = false;
        // find show record (or show object) based on showID
        Show = findShow(showID);
        // repo space based on loan records having
        // user ID from Show.ownerID in LenderID field
        return(success = repossessSpace(Show.ownerID));
    }
}
```

The next example class set forth just below is a pseudocode example of a concrete class having a member method that carries out the action associated with the third choice presented to the user in message3.send( ). That is, the following example class is designed to carry out the action of borrowing space in order to make available free space for recording the show in question.

```
//
// concrete action class for action 'Borrow'
//
class Action3:Action
{
    //
    // define virtual function from abstract Action class
    //
    public boolean takeAction(showID)
    {
        boolean success = false;
        // find show record (or show object) based on showID
        Show = findShow(showID);
        // find user profile based
        User = findUserProfile(Show.ownerID);
        // calculate deficit
        Deficit = Show.SpaceRequirement – User.FreeSpace;
        // borrow deficit amount
        return(success = borrowSpace(User, Deficit));
    }
}
```

The following is a pseudocode example of a concrete class having a member method that carries out the action associated with the fourth choice presented to the user in message3.send( ). That is, the following example class is designed to carry out the action of deleting previously recorded shows in order to make available free space for recording the show in question. Action4.takeAction( ) proceeds by finding the first show owned by the same owner that has already been viewed and deleting it.

```
//
// concrete action class for action 'Delete shows'
//
class Action4:Action
{
```

-continued

```
    //
    // define virtual function from abstract Action class
    //
    public boolean takeAction(showID)
    {
        boolean success = false;
        // find show record (or show object) based on showID
        Show = findShow(showID);
        // find user profile based
        User Owner = findUserProfile(Show.ownerID);
        boolean thisShowViewed = false;
        // find first viewed show with same ownerID
        while(thisShowViewed == false)
        {
            NextShow = findNextShow(Show.ownerID);
            if(NextShow == NULL) break;
            thisShowViewed = NextShow.Viewed;
        }
        // NextShow now point to or references a viewed show
        if(thisShowViewed == TRUE)
        {
            Owner.FreeSpace += NextShow.SpaceRequirement;
            deleteShow(NextShow);
            success = true;
        }
        return success;
    }
}
```

The following is a four-line pseudocode example that gathers into one place for convenient reference all the lines of exemplary pseudocode set forth above that are needed to identify a message point for prompting a user to select a method of making available more storage space for recording a show, obtaining a response from the user, and taking action according to the response.

Message m=MessageFactoryOne.createMessageObject ("message3");
 ActionID=m.send(ShowID, DeficitAmount);
 Action a=ActionFactory.createActionObject (actionID);
 a.takeAction(showID);

It should be clear to our readers by now that, with reference to the method of FIG. 43, for example, the four lines of pseudocode set forth just above, operating in coordination with the object-oriented classes described above, illustrate a method of identifying message points 4116 in which a message point has an associated message point ID 4202. In this example, the message point is the location in a PVR's application code of the line:

Message m=MessageFactoryOne.createMessageObject ("MessagePoint3");

The message point ID is the parameter 'MessagePoint3.' The four example lines of pseudocode illustrate also a method of transmitting messages 4118, through the call to m.send( ), as well as a method of receiving 4404 responses 4406 to messages 4206, in the return code, the parameter named 'actionID.'

The four example lines illustrate also a way of selecting 4408, in dependence upon a response 4406, a command 4304 to be executed. That is, the call to createActionObject( ), parameterized with 'actionID,' select, create, and return to the application level an action object called 'a.' The action object contains the 'command to be executed,' a member method called 'takeAction( ).' The call to the member method takeAction( ) executes 4306 the selected command 4304 within the meaning of the method of FIG. 43.

Machine Learning for Messaging

Depending on how actively a user uses a PVR, it is possible for a PVR to generate many messages to a user. Many such messages are fairly routine, notices that scheduled recordings occurred on time, that changes in schedule have been made with no problems, and so on. For these reasons it would be useful to be able to cull or filter or limit or screen in some way the number of messages rather than always sending the same message for the same message point.

In other circumstances regarding messages prompting for decisions, a user can repeatedly select some choice other than a default, in which case, it would be useful for the default to be changed. When the same default is taken repeatedly, it could be useful to change the message type from a blocking message prompting for a response to a posting, merely advising a user that the default action was taken without prompting for a response. In all these circumstances, with respect to limiting the number of messages, changing defaults, and changing message types, it would be useful if the PVR itself could learn how to make such changes based upon historical behavior of users.

PVRs comprising computers are machines capable of 'machine learning' in dependence upon proper programming. Machine learning is often referred to as pattern recognition or data classification. The terms "pattern recognition" and "classification" are substantially synonymous because the underlying problem of pattern recognition is deciding how to classify elements of data as either belonging or not belonging to a pattern. In embodiments of PVRs according to the present invention, classifications include, for example:

Whether message 137 ought to be classified as 'to be sent' or 'not to be sent.'

Whether message 137 ought to be classified for transmission as a blocking send or a non-blocking post.

Whether command number 438 ought to be classified as a default in connection with message 137.

In addition to classification, machine learning includes training. Training comprises mapping known inputs to known outputs. Mappings are the basis for classification. In the case of PVR messaging, the known inputs are messaging inputs including message types sent to users prompting for responses associated with particular commands. In this object-oriented discussion, a 'message type' is identified by a message class name. The known outputs are messaging outputs, that is, results of PVR operations regarding messaging, including, for example, frequencies or counts of message points, whether messages are transmitted when message points are encountered and counts of how many times messages are transmitted, whether messages are transmitted as sends or posts, users' responses to messages, which command a user chooses and how often, and whether a user takes the default for a send and how often. Mappings include statistical descriptions of relations between the messaging inputs and messaging outputs. An example of a mapping is 'User SoAndSo, in response to message 745 takes the default at the rate of 45%.'

PVRs according to embodiments of the present invention carry out frequent classification operations. Some kind of classification typically is carried out every time a message point is encountered during normal operation. For every message point, a PVR typically carries out classifications such as determining whether to transmit a message, whether to transmit a post or a send, which commands to include, which command is to be the default, and so on. Training, on the other hand, occurs less often. A training routine can be scheduled hourly, daily, weekly, monthly, or at any time that makes sense in terms of overall PVR performance. Training can be run at midnight or 4:00 a.m., when most users are asleep and there is little chance that execution of a training routine will slow normal PVR operations. Because classification occurs often and training need not occur often, readers will observe in this disclosure a design bias, or strategy, rather, in favor of offloading complexity from classification to training.

Figure 45:
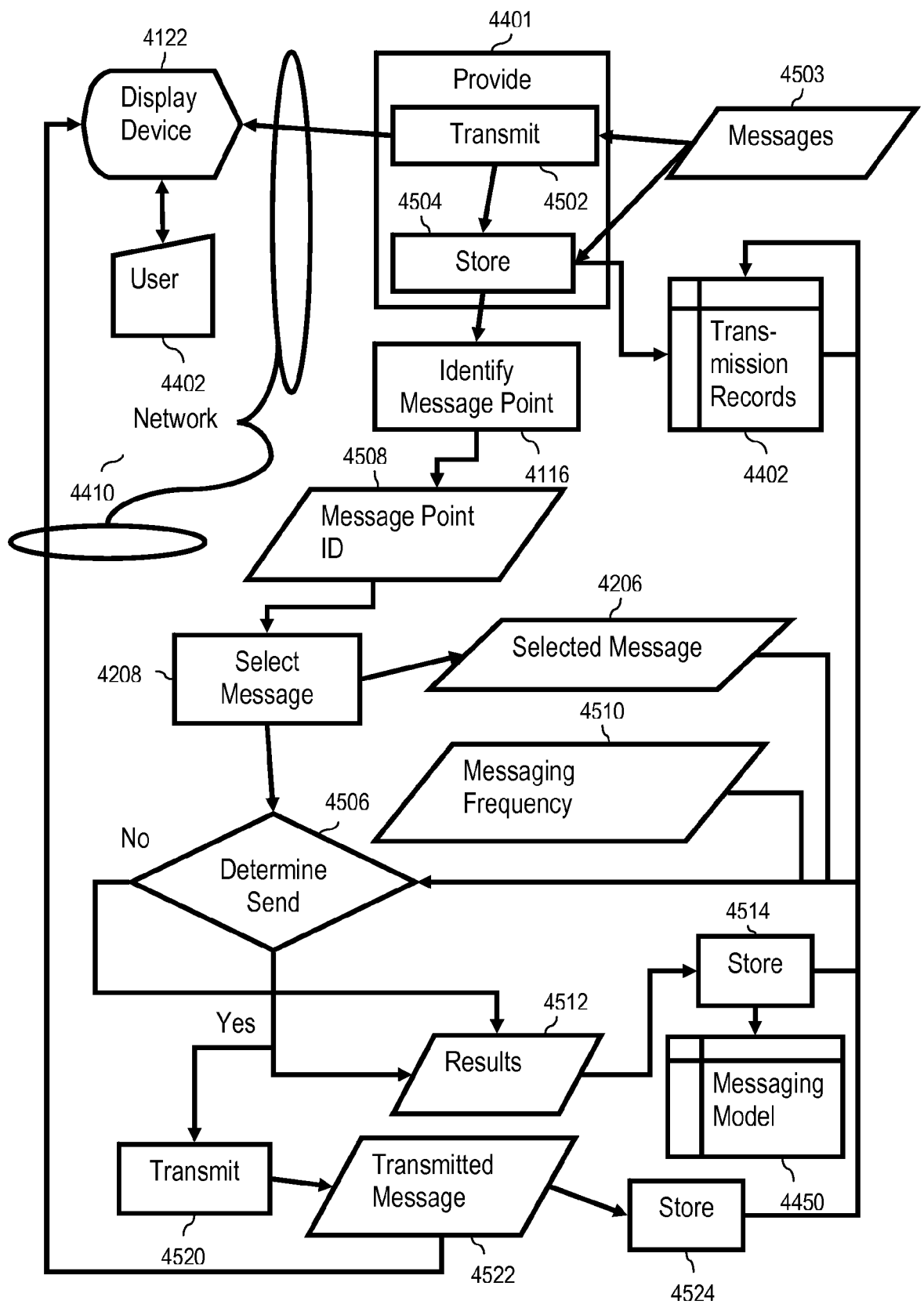
FIG. 45 is a flow chart depicting an exemplary method of machine learning for control of a personal video recorder.

FIG. 45 sets forth a flow chart depicting an exemplary method of machine learning for control of a personal video recorder ("PVR") that includes providing 4401 records 4402 of transmissions of messages; identifying 4116 a message point in operation of a PVR; selecting 4208, in dependence upon the message point, a message 4206 to be sent; and determining 4506 in dependence upon the records 4402 of transmissions of messages whether to transmit the selected message. In the method of FIG. 45, identifying a message point associates with the message point a message point ID 4508.

Machine learning as it is practiced in embodiments of the present invention depends on training mappings of historical data. The records 4402 of transmissions of messages comprise the historical data needed for training mappings for machine learning. In exemplary PVRs embodying the method of FIG. 45, providing records of transmissions of messages includes transmitting 4502 messages to users 4402 and storing 4504 records 4402 of transmissions of messages.

Figure 44:
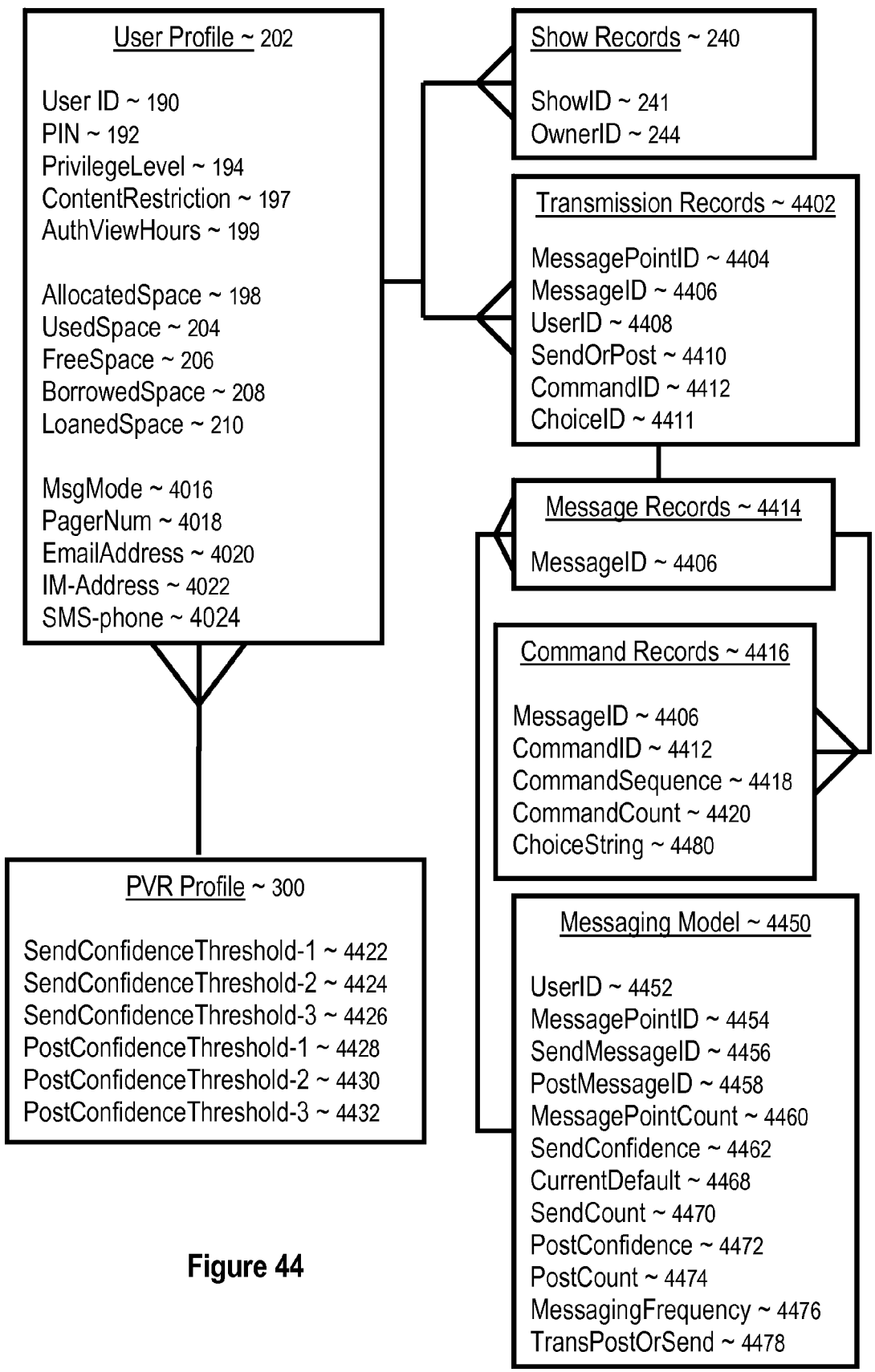
FIG. 44 depicts data structures in records useful in various exemplary embodiments for messaging.

'Storing' in this context means storing computer data in data structures in computer memory representing particular transmissions of particular messages to particular users. The transmission record data structure 4402 illustrated in FIG. 44 is an example of a structure useful in various embodiments of the present invention for storing records of transmissions of messages. The example transmission records 4402 of FIG. 44 include data elements identifying a message point 4404 in connection with which a message was transmitted, a messageID 4406 identifying a particular form of message transmitted, a userID 4408 identifying the user to whom a message was transmitted, an indication 4410 whether the message was transmitted as a send or a post, and a commandID 4412 identifying the command chosen by the user if the message was a send.

Our example PVR implements the convention of treating command choice number 1 as the default, so there is no need for a separate data element indicating whether the default was taken. If the value of commandID 4412 is '1,' then the user took the default. This kind of data structure will work if the PVR accepts that commandIDs are not unique. A unique identification of a command would require both the commandID and the messageID with which the command is associated. Commands identified in this way may not be very reuseable.

It may be more flexible to use a sequence indication, such as CommandSequence 4418, to indicate the choice order of commands in a message, including which one is the default. The PVR can still adopt the command having the sequence number '1' as the default, but now an additional data elements is needed in the transmission records to describe which sequence number was chosen by the user, a data element such as, for example, ChoiceID 4411.

In the method described with reference to FIG. 45, determining 4506 whether to transmit the selected message often includes determining whether to transmit the selected message in dependence upon a messaging frequency 4510 with which the message is transmitted to a user. In such embodiments, the messaging frequency typically is defined, for example, with respect to the number of times an associated message point is encountered in PVR operations. That is, for example, a messaging frequency of '1' means transmit a message every time a corresponding message point is encountered. A messaging frequency of '5' means transmit a message every fifth time a corresponding message point is encountered. And so on.

The method according to FIG. 45 includes recording 4514 a result 4512 of determining 4516 whether to transmit the selected message 4206. If the selected message is not transmitted, then determining whether to transmit the message includes incrementing a message point count 4460, for statistical purposes, recording messaging outputs for later use in training.

Similarly, if the selected message is not transmitted, then determining whether to transmit the message includes incrementing a frequency supporting count such as a send count 4470 or a post count 4474, for use in determining whether to transmit a selected message. In particular, PVRs increment such counts (4470, 4474) until the counts are equal to a messaging frequency, such as MessagingFrequency 4476, and then reset to zero. If a pertinent messaging frequency 4476 is, for example, set to '5,' indicating that a message is only to be transmitted on each fifth occurrence of its associated message point, then the process of determining whether to transmit that message includes comparing a message count (4470, 4474) for the message model 4450 identified by the messageID (4456, 4458) of the particular message in question. If the message count is less than the messaging frequency, the PVR increments the message count and does not transmit the message. If the message count is equal to the messaging frequency, the PVR resets the message count to zero and transmits the message.

If the PVR transmits the message, that is, if determining whether to transmit a selected message results in a determination that the message is to be transmitted, then the PVR transmits 4520 the selected messages to a user 4402 and stores 4524 a record representing the transmission of the transmitted message 4522 in the transmission records 4402. The method illustrated in FIG. 45 often in fact includes transmitting 4520 to a user 4122 the selected message 4206 and storing 4524 in the records 4402 of transmissions of messages a record representing the transmission of the transmitted message, the stored record having the form, for example, of the transmission records illustrated at reference 4412 in FIG. 44. Transmitting a message to a user 4402 comprises transmitting the message to a display device 4122 identified in a user profile 202 as, for example, a pager number 4018 utilized because the user's asserted preferred messaging mode 4016 is set to 'pager.'

Figure 46:
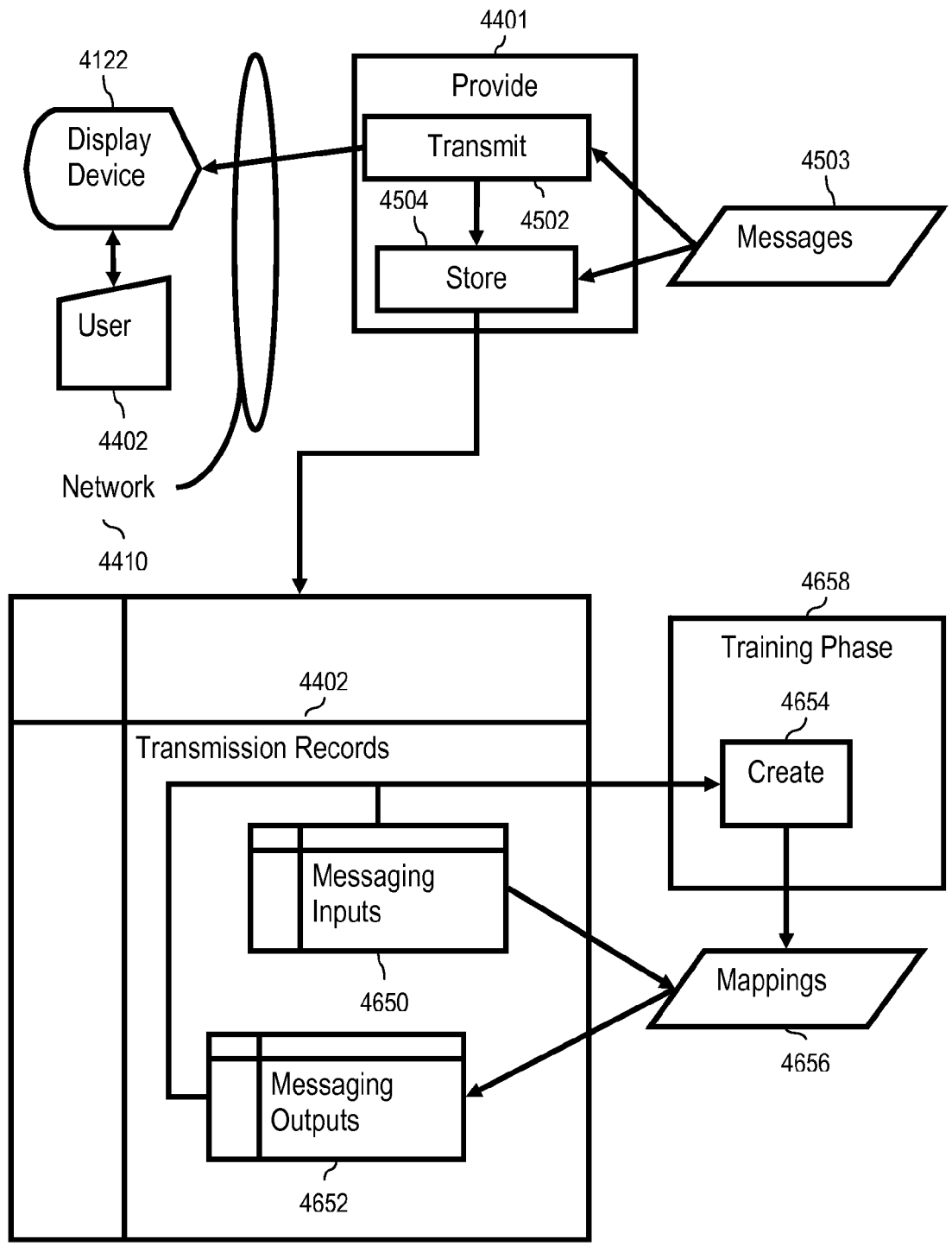
FIG. 46 is a flow chart depicting a further exemplary method of machine learning for control of a personal video recorder, including training and mappings.

FIG. 46 sets forth a flow chart depicting a further exemplary method of machine learning for control of a personal video recorder ("PVR") in which records 4402 of transmissions of messages include messaging inputs 4650 and messaging outputs 4652. The method illustrated in FIG. 46 includes creating 4654 mappings 4656 from messaging inputs to messaging outputs.

Examples of messaging inputs 4650 useful in PVRs that implement methods of the kind illustrated in FIG. 46 include several data elements shown in the example data structures of FIG. 44. Such data elements, include, for example, message identifications (reference 4406 in transmission records 4402), message point identifications 4404, user identifications 4408 for users to whom messages are sent, indications 4410 whether messages are sends or posts, and command identifications 4412 for commands associated with prompts for choices in messages.

Examples of messaging outputs 4652 useful in PVRs that implement methods of the kind illustrated in FIG. 46 include several data elements shown in the example data structures of FIG. 44. Such data elements, include, for example, message point counts (4460 in messaging model 4450). Messaging outputs include data elements such as message counts, like those shown at references 4470 and 4474 on FIG. 44. Such counts comprise relative indications whether messages are transmitted when message points are encountered. Messaging outputs include data elements indicating users' responses to messages, such as, for example, the field CommandID 4412 in the transmission records 4402, indicating that the user identified by userID 4408 chose commandID 4412 in response to messageID 4406.

Examples of mappings 4656 useful in PVRs that implement methods of the kind illustrated in FIG. 46 include several data elements shown in the example data structures of FIG. 44. Such data elements, include, for example, confidence ratings (4462, 4472 in messaging model 4450), messaging counts (4470, 4474), messaging frequencies 4476, and indications 4478 whether to transmit sends or posts at message points.

In fact, the creation of mappings is an important component of the training phase of machine learning in typical embodiments of the present invention. More particularly, exemplary PVRs according the present invention calculate a mapping element, such as, for example, a SendConfidence 4462 by first scanning through the transmission records and counting as a first count the total number of send messages that have been transmitted to a particular user having a particular userID, for a particular message point, that resulted in the user's choosing the default, indicated by TransmissionRecord.CommandID==1 (reference 4412) or by TransmissionRecord.ChoiceID==1 (reference 4411). The PVR then makes a second count of all the send messages to the same user for the same message point, regardless whether the default was taken. (These two counts are often developed in the same scan through the transmission records.)

The PVR then calculates SendConfidence 4462 by dividing the first count by the second count. SendConfidence 4462, in this example therefore, represents for a particular messaging model 4450, the proportion of times the default is taken for send messages to a particular user identified by userID 4452 from a particular message point identified by MessagePointID 4454.

The messaging model records 4450, in this example, are repositories of mapping data elements combined with data elements identifying particular messaging model. Each messaging model, that is, each messaging model record 4450, aids message classification for a particular message point for a particular user. That is, in exemplary PVRs using data structures similar to those of FIG. 44, there is a separate messaging model for each combination of users to whom messages are transmitted and messaging points in connection with which messages are transmitted. In other words, a unique key for the messaging model records 4450 is a combination of MessagePointID 4454 and userID 4452.

The phrase 'message classification' appeared in the paragraph just above, and it may be useful for readers' understanding to reiterate and expand upon classification. As described above, machine learning comprises two principal phases: training and classification. The phrase 'message classification' as used in this disclosure refers to decision-making regarding messaging in the classification phase of the machine learning cycle. Message classification is decision making for messages regarding, for example: whether a message is to be transmitted at a message point; if a message is to be transmitted, is it to be a send or a post; if it is a send, then which command choice are included and which one is the default; and so on.

Exemplary PVRs according to embodiments of the present invention, in their training phases, typically also count post messages and store the counts as mapping data elements such as PostConfidence 4472 in the messaging models 4450 on FIG. 44. The example PostConfidence 4472 is a count in a particular messaging model 4450 of the messages posted to a particular user, identified by userID 4452, from a particular message point identified by MessagePointID 4454.

Another exemplary mapping data element in our exemplary messaging models is MessagingModel.MessagingFrequency 4476. Messaging frequency in this example refers to how often a message is to be transmitted when encountering a particular message point. A value of '1' in MessagingFrequency 4476, for example, can indicate that a message of some kind, either a post or a send, is to be transmitted every time the message point identified by MessagePointID 4454 is encountered in PVR operations. A value of '5' in MessagingFrequency 4476, for example, can indicate that a message is to be transmitted every fifth time a particular message point is encountered, and so on.

PVRs according to this kind of embodiment set a messaging frequency by comparing messaging counts or confidence ratings to thresholds. In the present example, the PVR during training 4638, as part of creating 4654 mappings 4656, compares a confidence rating (4472, 4462) for a messaging model 4450 with a corresponding set of confidence thresholds (4422-4432) in a PVR profile record 300. In this example, the thresholds are stored at the PVR level. In some embodiments, thresholds are set at the user level or even in messaging models themselves. Any storage arrangement for threshold parameters, as will occur to those of skill in the art, is well within the scope of the invention.

In this example, if a messaging model is currently functioning as a send, that is, with TransPostOrSend 4478 set to 'send,' then the PVR compares SendConfidence 4462 with the send confidence thresholds (4422-4426). SendConfidenceThreshold-1 4422, SendConfidenceThreshold-2 4424, and SendConfidenceThreshold-3 4426, are set respectively to '5,' '10,' and '20.' If SendConfidence exceeds SendConfidenceThreshold-1, then the PVR changes MessagingFrequency from '1' to '5' and thereafter transmits messages for the message point identified in MessagePointID only upon every fifth occurrence of the message point. If SendConfidence exceeds SendConfidenceThreshold-2, then the PVR changes MessagingFrequency from '5' to '10' and thereafter transmits messages for the message point identified in MessagePointID only upon every tenth occurrence of the message point.

Readers lulled almost to sleep by the repetitive nature of the last two sentences will want to raise their heads for the next one. If SendConfidence exceeds SendConfidenceThreshold-3, then the PVR changes MessagingFrequency from '10' to '1,' changes TransPostOrSend from 'send' to 'post,' and thereafter transmits messages for the message point identified in MessagePointID upon every occurrence of the message point.

Continuing with this example, when a messaging model is functioning as a post, that is, with TransPostOrSend 4478 set to 'post,' then the PVR compares PostConfidence 4472 with the post confidence thresholds (4428-4432). PostConfidenceThreshold-1 4428, PostConfidenceThreshold-2 4430, and PostConfidenceThreshold-3 4432, are set respectively to '5,' '10,' and '20.' If PostConfidence exceeds PostConfidenceThreshold-1, then the PVR changes MessagingFrequency from '1' to '5' and thereafter transmits messages for the message point identified in MessagePointID only upon every fifth occurrence of the message point. If PostConfidence exceeds PostConfidenceThreshold-2, then the PVR changes MessagingFrequency from '5' to '10' and thereafter transmits messages for the message point identified in MessagePointID only upon every tenth occurrence of the message point. If PostConfidence exceeds PostConfidenceThreshold-3, then the PVR changes MessagingFrequency from '10' to '20' and thereafter transmits messages for the message point identified in MessagePointID upon every twentieth occurrence of the message point.

It is possible, and well within the invention, for a PVR to carry out comparisons of confidence ratings with confidence thresholds every time a message point is encountered. Training a messaging model by mapping confidence ratings to thresholds through messaging frequency, however, makes classification processing faster because, upon encountering a message point, the PVR needs only to operate on values within the messaging model for the message point. That is, rather than carrying out comparisons with thresholds, the PVR needs only compare messaging frequency with a message count. As described earlier, if the count is less than the frequency, increment the count and do not transmit. If the count is equal to the frequency, clear the count and transmit the message. This is a particular example of the design strategy mentioned earlier in favor of offloading complexity from classification to training.

Another exemplary mapping data element in our exemplary messaging models is Command.CommandSequence 4418 in the command records 4416 in FIG. 44. CommandSequence in this example refers to the order in which a PVR inserts choices for commands into send messages. As noted earlier, the example PVRs under discussion define choice number '1' as the default choice to be executed in the absence of a user response. Absence of a user response is defined as a timeout on a send message. In exemplary PVRs according to embodiments of this invention, a count, such as CommandCount 4420, of the number of times a command is chosen in response to a particular message identified by messageID 4406, is maintained separately from the command sequence. CommandSequence 4418 is calculated for each command during training. More particularly, during training, a PVR according to this kind of exemplary embodiment, scans through all the command records 4416. The PVR sorts the command records having the same MessageID 4406 according to CommandCount 4420 and then assigns incrementing values to CommandSequence beginning with '1' and continuing through the number of commands having the same MessageID. That is, the command having the highest value of CommandCount is set to CommandSequence=1, and CommandSequence==1 defines the default command for the message identified by the same MessageID 4406.

It is useful to note that although CommandSequence 4418 in this example is calculated for each command during training, CommandCount 4420 is incremented only for the chosen or defaulted command when a particular message is transmitted. Command sequence calculation or updating is a voluminous task applied to all command records as part of training. Incrementing CommandCount 4420 is a quick single step applied to a single command record when a particular message is transmitted. This is yet another example of a design strategy that favors offloading complexity from classification to training.

Figure 47:
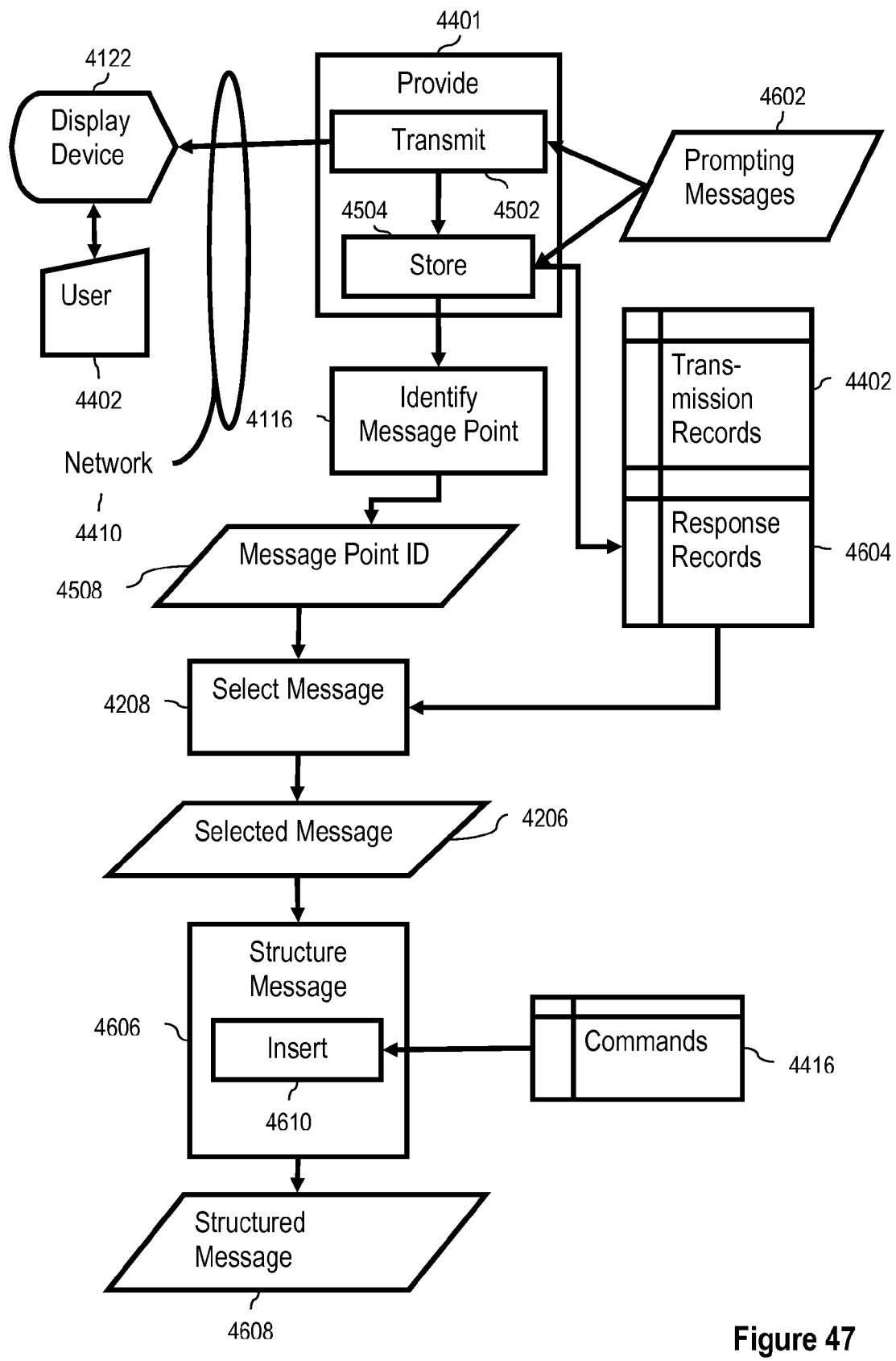
FIG. 47 is a flow chart depicting a still further exemplary method of machine learning for control of a personal video recorder, including structuring messages with inserted command choices.

FIG. 47 sets forth a flow chart depicting a further exemplary method of machine learning for control of a personal video recorder ("PVR") in which providing 4401 records of transmissions of messages includes transmitting 4502 users 4402 messages prompting for responses identifying commands. In the method of FIG. 47, providing records of transmissions of messages includes storing 4504 records 4402 of transmissions of messages, including storing records of responses 4604. In the method of FIG. 47, selecting 4208 a message to be transmitted includes selecting a message to be transmitted in dependence upon the records 4604 of responses to messages.

The following factory class illustrates in pseudocode an example of selecting a message to be transmitted in dependence upon records of responses to messages. In this example, fields such as MessagingModel.TransPostOrSend 4478 are previously set by a training routine operating, as described in detail above, in dependence upon historical records of message transmission such as for example records structured as illustrated by the data structures in FIG. 44. Selecting a message to be transmitted occurs at a message point. Within our terminology of machine learning, such selecting of a message comprises classification rather than training.

```
//
//   Message Factory Class - Example Number Two
//
//   Defines a parameterized factory method for creating message objects
//
class MessageFactoryTwo
{
    public static Message createMessageObject(MessagePointID)
    {
        MessagingModel = findMessagingModel(MessagePointID);
        if(MessagingModel.TransPostOrSend == 'Send')
        {
            if(MessagingModel.SendCount <
            MessagingModel.MessagingFrequency)
            {
                MessagingModel.SendCount += 1;
                return NULL; // no message until messaging frequency
                is satisfied
            }
            else // if(SendCount >= MesssageFrequency)
            {
                MessagingModel.SendCount = 0;
                MessageID = MessagingModel.SendMessageID;
            }
        }
        else /* if Post */ {
            if(MessagingModel.PostCount <
            MessagingModel.MessagingFrequency)
            {
                MessagingModel.PostCount += 1;
                return NULL; // no message until messaging frequency
                is satisfied
            }
            else // if(PostCount >= MesssageFrequency) {
                MessagingModel.PostCount = 0;
                MessageID = MessageModel.PostMessageID;
            }
        };
        switch(MessageID)
        {
            case "message1": aMessage = new message1; break;
            case "message2": aMessage = new message2; break;
            ... ... ...
            case "messageN-1": aMessage = new message3; break;
            case "messageN": aMessage = new message3; break;
        } // end switch( )
        return aMessage;
    } // end createMessageObject( )
} // end class MessageFactoryTwo
```

In this example, if a training scan through historical records set TransPostOrSend 4478 to 'send,' then MessageID is set to the message ID of a send message identified in SendMessageID 4456, and the message selected by the switch( ) statement and returned by the return statement is a send message. If the training scan through historical records set TransPostOrSend 4478 to 'post,' then MessageID is set to the message ID of a post message identified in PostMessageID 4458, and the message selected by the switch( ) statement and returned by the return statement is a post message.

At this point in our discussion, it is useful to compare MessageFactoryOne and MessageFactoryTwo. Earlier in our discussion of MessageFactoryOne, we noted its one-to-one correspondence between message point and message type and commented that later we would show how to add program logic to the factory class to usefully decouple the one-to-one relationship between message point ID and message type. In fact, this line of pseudocode in MessageFactoryTwo.createMessageObject( ), by use of TransPostOrSend 4478, effectively decouples the one-to-one correspondence between message point ID and message type:

if(MessagingModel.TransPostOrSend=='Send') { ... }

In MessageFactoryTwo.createMessageObject( ), one cannot identify a single message type that will be transmitted as a result of encountering any particular message point. On the contrary, when application code asks MessageFactoryTwo for a message object for a particular message point, in use of the particular example code and data structures set forth in this disclosure, createMessageObject( ) can return either of at least two message objects depending on whether the subject message is to be transmitted as a send or a post. This present messaging model, particularly as depicted in the data structure at reference 4450 in FIG. 44, is capable of choosing among two alternative messages for each message point. There is no limitation to only two choices in the scope of the present invention, however. Persons of skill in the art will define messaging models capable of choosing among more than two message classes for each message point, and all such messaging models are well within the scope of the present invention.

The method described with reference to FIG. 47 includes structuring 4606 the selected message in dependence upon the records 4604 of responses to messages. In the method of FIG. 47, structuring 4406 the selected message 4206 includes inserting 4610 in the selected message choices for a set of sequenced commands 4416. The following message class illustrates in pseudocode an example of structuring a selected message in dependence upon records of responses to messages, including inserting message choices for commands. In particular, this example illustrates a selected send message prompting a user to choose a way of making available more storage space for recording.

```
// message class associated with message ID "message4"
//
// message subclass for making available more storage space
//
class message4P:Message
{
    // override the send( ) function, inherited from the abstract base class
    public int send(showID, deficit, MessageID)
    {
        int MaxChoiceNum = 1;
        int success = 0;
        int TimeOutPeriod = 30000; // milliseconds, i.e., 30 seconds
        int response;
        Show = getShow(showID);
        User = getUser(Show.ownerID);
        messageText = "You have" + Show.title + scheduled to record
            at " + show.schedule + ". For this recording there is a
            deficit in storage space of" + deficit + "megabytes.
            Your action choices are:\n"
        // Commands 4416 in this example are indexed or sorted, first,
        // on MessageID 4406, and, second, on CommandSequence 4418
```

-continued

```
      Command = findFirstCommand(MessageID);
      while(CommandID != NULL)
      {
         messageText = messageText +
               itoa(Command.CommandSequence) +
               Command.ChoiceString + '\n';
         MaxChoiceNum += 1;
         Command = findNextCommand(MessageID);
      }
      messageText = messageText +
            "The default is choice number " + default + ". This
            message times out in " + TimeOutPeriod + " seconds.
            If you wish an action other than the default, please
            select it now. Your selection (1-" +
            itoa(MaxChoiceNum) + "): ____."
      switch(User.MsgMode)
      {
         case PAGER:
            success = sendpager(User.PagerNum, messageText);
            break;
         case EMAIL:
            success = sendmail(User.EmailAddress, messageText);
            break;
         case SMS:
            success = sendSMS(User.SMS-phone, messageText);
            break;
         case INSTANT_MESSAGING:
            success = sendIM(User.IM-Address, messageText);
            break;
      } // end switch( )
      if(success) // message sent
      {
         sleep(TimeOutPeriod); // sleep for 30 seconds
         // then return user's response:
         response = getResponse( );
      }
      else return success; // returns 0 for failure
      // if message was a post, no need to return an actionID,
      // because no action was prompted for or chosen:
      // indicate a Post by returning NULL
      MessagingModel = findMessagingModel(messageID);
      if(MessagingModel.TransPostOrSend == 'Post')
         return NULL;
      else return response;
   } // end send( )
} // end class message4
```

To explain operation of this pseudocode, assume that showID identifies a show titled "Buffy, The Vampire Slayer" scheduled to record at 5:00 p.m. with a deficit of 5 megabytes, a default of choice number 1 and a timeout period of thirty seconds. Assume that there are six commands identified by command records 4416 for the message identified by MessageID, the commands indexed on sequence number and having respectively the following ChoiceStrings 4480:

Do not record

Repossess loaned space, 10 megabytes available

Borrow space, 25 megabytes available

Delete your other shows, 30 megabytes available

Recover displayed space, 8 megabytes available

Increase compression of other shows

Then, based on these assumptions, the example method send( ) transmits the following message text:

"You have Buffy, The Vampire Slayer scheduled to record at 5:00 pm. For this recording there is a deficit in storage space of 5 megabytes. Your action choices are:

1. Do not record
2. Repossess loaned space
3. Borrow space
4. Delete your other shows
5. Recover displayed space
6. Increase compression of other shows The default is choice number 1. This message times out in thirty seconds. If you wish an action other than the default, please select it now. Your selection (1-6): ____."

The example method 'send( )' returns an integer representing the user's choice, '1' if the user takes the default and does not record, '2' if the user chooses to repossess loaned space, '3' if the user chooses to borrow space, and so on.

The example method 'send( )' operates in a method according to FIG. 47 to selected messages in dependence upon records 4604 of responses to messages, including inserting 4610 in a selected message choices for a set of sequenced commands 4416. In this example, 'send( )' operates in dependence upon records of responses in the sense that send( ) steps from command record to command record in an indexed sequence generated at training time from historical message transmission records, including historical records of a user's responses to each of the commands for a particular message, all as identified, for example, in fields such as those at references 4412 and 4411 in exemplary transmission records 4402 on FIG. 44. In this example, the 'set' of commands is the set of commands identified by command records having the same value of MessageID 4406.]

For further explanation of machine learning for messaging, we present the following example use case. Consider the example of a PVR that has a messaging model 4450 having the following values:

UserID 4452=='Junior'
MessagePointID 4454=='MessagePoint4'
SendMessageID 4456=='message4S'
PostMessageID 4458=='message4P'
MessagePointCount 4460==37
SendConfidence 4462==0.0
CurrentDefault 4468=='Command 435'
SendCount 4470==0
PostConfidence 4472==5
PostCount 4474==0
MessagingFrequency 4476==1
TransPostOrSend 4478=='Post'

Assume that the pertinent thresholds are set as:

SendConfidenceThreshold-1 4422==0.25 // every fifth message point
SendConfidenceThreshold-2 4424==0.50 // every tenth message point
SendConfidenceThreshold-3 4426==0.95 // change to posts
PostConfidenceThreshold-1 4428==25 // every fifth message point
PostConfidenceThreshold-2 4430==50 // every tenth message point
PostConfidenceThreshold-3 4432==100 // every twentieth message point An example PVR is programmed so that it transmits, upon encountering MessagePoint4, posts of message4P, incrementing PostCount 4474 when it does so. The PVR's training routine periodically calculates PostConfidence 4472, and when PostConfidence exceeds 25, the PVR sets MessagingFrequency to '5'. Similarly, when PostConfidence exceeds 50, the PVR sets MessagingFrequency to '10.' When PostConfidence exceeds 100, the PVR sets MessagingFrequency to '1' and TransPostOrSend to 'Send.'

Our example PVR is programmed so that it transmits, now that TransPostOrSend is set to 'Send,' upon encountering MessagePoint4, sends of message4S, incrementing SendCount 4470 when it does so. The PVR's training routine periodically calculates SendConfidence 4462, and when SendConfidence 4462 for a current default choice 4468 exceeds 0.25, the PVR sets MessagingFrequency to '5'. Similarly, when SendConfidence exceeds 0.50, the PVR sets MessagingFrequency to '10.' When SendConfidence exceeds 0.95, the PVR sets MessagingFrequency to '20.'

The following is a four-line pseudocode example that identifies a message point for prompting a user to select a method of making available more storage space for recording a show, obtaining a response from the user, and taking action according to the response.

```
Message m = MessageFactoryTwo.createMessageObject
("MessagePoint4");
if(((ActionID = m.send(ShowID, DeficitAmount)) != NULL)
{
    Action a = ActionFactory.createActionObject (actionID);
    a.takeAction(showID);
}
```

In this example, the example PVR identifies a message point identified as 'MessagePoint4.' The PVR application software calls factory method createMessageObject( ) in the message factory class 'MessageFactoryTwo.' The member method createMessageObject( ) returns a message object, 'm'. The factory method decides which message is to be transmitted, if any.

The PVR applications software next calls the message object member method m.send( ) which may, or may not, send a message. Which message to send is decided by the factory. In this example, it is the message object that decides whether to send a message, returning NULL if no message is sent:

```
if(MessagingModel.TransPostOrSend == 'Send') {
    if(MessagingModel.SendCount <
MessagingModel.MessagingFrequency) {
        MessagingModel.SendCount += 1;
        return NULL;   // no message until messaging frequency is satisfied
    }
    else // if(SendCount >= MesssageFrequency) {
        MessagingModel.SendCount = 0;
        MessageID = MessagingModel.SendMessageID;
    }
}
else /* if Post */ {
    if(MessagingModel.PostCount <
MessagingModel.MessagingFrequency)
    {
        MessagingModel.PostCount += 1;
        return NULL;   // no message until messaging frequency is satisfied
    }
    else // if(PostCount >= MesssageFrequency) {
        MessagingModel.PostCount = 0;
        MessageID = MessageModel.PostMessageID;
    }
};
```

That is, the message object in this example will not send a message if a pertinent messaging count is less than the governing messaging frequency. In addition, the message object member method m.send( ) returns a NULL if the message transmitted is a post, there being no need to execute and action in response to the message if there is no response to the message because no response was prompted for or sought:

```
if(MessagingModel.TransPostOrSend == 'Post')
    return NULL;
```

Which is the reason for the proviso in our current four-line pseudocode example that:

```
if(((ActionID = m.send(ShowID, DeficitAmount)) != NULL)
{
    Action a = ActionFactory.createActionObject (actionID);
    a.takeAction(showID);
}
```

That is, there is no need to take action if the message was transmitted as a post. In fact, there is no action to be taken. Notice, however, that the four-line snippet includes a provision for a send despite the fact that a send may not occur. That is, the application level code includes a provision for sending or posting because the application level code has no idea which will occur, if either. At this point, in other words, the application level is completely decoupled from the messaging subsystem comprises of factory classes, message classes, and action or commend classes. The application level is privileged to simply insert at any message point, four line of code similar to those described above, insert the message point ID in the call to the factory method, compile, and run. The application level has no idea whether a message will be sent. If a message is sent, the application level will not know what kind of message it is.

The operation of our four-line pseudocode example evolves dramatically as parameters change in the course of machine learning. When our use case begins operation, the example PVR always transmits a send message requesting a response choosing one of six alternative ways for to make available additional storage space for recording. As training routines are applied, the sequence in which the six alternative are presented, including which one is the default, change over time. When one default is taken long enough to raise the SendConfidence past the first SendConfidenceThreshold, the PVR ceases to send messages on every occurrence of the MessagePoint4 and begins to transmit sends only on every fifth occurrence of the message point.

If the default is taken long enough, the PVR changes to messaging with posts instead of sends, taking a default action, and merely advising the user that the PVR has taken the default action. As PostConfidence increases through training, the PVR transmits posts less often, eventually transmitting post messages to the user only on every twentieth occurrence of the message point. Through all of these dramatic changes in PVR performance, from prompting sends and command choices on every occurrence of a message point to merely advisory posts on every twentieth occurrence of the message point, the application code identifying the message point remains unchanged. That is, these lines of code:

```
Message m = MessageFactoryTwo.createMessageObject
("MessagePoint4");
if(((ActionID = m.send(ShowID, DeficitAmount)) != NULL)
{
    Action a = ActionFactory.createActionObject (actionID);
    a.takeAction(showID);
}
``` inserted at a message point, then remain completely unchanged throughout all PVR operations and yet have all the varying effects described above, through PVR machine learning, training and classification, in accordance with various embodiments of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A system of machine learning for control of a personal video recorder ("PVR"), the system comprising:
   a processor;
   a recording medium;
   a personal video recorder application program recorded in the recording medium, the personal video recording application program comprising program instructions executable by the processor, the program instructions comprising program instructions to,
   provide records of transmissions of messages, including program instructions to transmit messages to users including messages prompting for responses identifying commands;
   store records of transmissions of messages including program instructions to store records of responses to messages, the records of transmissions of messages include messaging inputs and messaging outputs, the messaging inputs including message identifications, message point identifications, user identifications for a user to whom messages are transmitted, indications whether messages are sends or posts, and command identifications for commands associated with prompts for choices in messages, the messaging outputs including message point counts, message counts, and indications of users' responses to messages;
   create mappings from messaging inputs to messaging outputs, the mappings including confidence ratings, messaging counts, messaging frequencies, and indications whether to transmit sends or posts at message points;
   identify a message point in operation of a PVR;
   select, in dependence upon the message point, a message to be transmitted;
   determine in dependence upon the records of transmissions of messages whether to transmit the selected message, including program instructions to determine whether to transmit the selected message in dependence upon a frequency with which the message is transmitted to a user, the frequency defined with respect to a count of the number of times an associated message point is encountered in PVR operations;
   record a result of determining whether to transmit the selected message;
   structure the selected message in dependence upon the records of responses to messages, including inserting in the selected message choices for a set of sequenced commands;
   transmit to a user the selected message; and
   store in the records of transmissions of messages a record representing the transmission of the transmitted message.

2. A computer program product of machine learning for control of a personal video recorder ("PVR"), the computer program product comprising:
   a non-transitory recording medium having program instructions encoded therein, the program instructions to,
   provide records of transmissions of messages, including the program instructions to transmit messages to users including messages prompting for responses identifying commands;
   store records of transmissions of messages including the program instructions to store records of responses to messages, the records of transmissions of messages include messaging inputs and messaging outputs, the messaging inputs including message identifications, message point identifications, user identifications for a user to whom messages are transmitted, indications whether messages are sends or posts, and command identifications for commands associated with prompts for choices in messages, the messaging outputs including message point counts, message counts, and indications of users' responses to messages;
   create mappings from messaging inputs to messaging outputs, the mappings including confidence ratings, messaging counts, messaging frequencies, and indications whether to transmit sends or posts at message points;
   identify a message point in operation of a PVR;
   select, in dependence upon the message point, a message to be transmitted;
   determine in dependence upon the records of transmissions of messages whether to transmit the selected message, including the program instructions to determine whether to transmit the selected message in dependence upon a frequency with which the message is transmitted to a user, the frequency defined with respect to a count of the number of times an associated message point is encountered in PVR operations;
   record a result of determining whether to transmit the selected message;
   structure the selected message in dependence upon the records of responses to messages, including the program instructions to insert in the selected message choices for a set of sequenced commands;
   transmit to a user the selected message; and
   store in the records of transmissions of messages a record representing the transmission of the transmitted message.

* * * * *